(12) United States Patent
Keramati et al.

(10) Patent No.: US 11,995,380 B2
(45) Date of Patent: May 28, 2024

(54) SYSTEM AND METHOD FOR HEAT EXCHANGER SHAPE OPTIMIZATION

(71) Applicants: Hadi Keramati, Waterloo (CA); Feridun Hamdullahpur, Waterloo (CA)

(72) Inventors: Hadi Keramati, Waterloo (CA); Feridun Hamdullahpur, Waterloo (CA)

( * ) Notice: Subject to any disclaimer, the term of this patent is extended or adjusted under 35 U.S.C. 154(b) by 0 days.

(21) Appl. No.: 18/309,064

(22) Filed: Apr. 28, 2023

(65) Prior Publication Data
US 2023/0351065 A1    Nov. 2, 2023

Related U.S. Application Data

(60) Provisional application No. 63/336,472, filed on Apr. 29, 2022.

(51) Int. Cl.
*G06F 30/10* (2020.01)
*G06F 30/27* (2020.01)
*G06F 30/28* (2020.01)

(52) U.S. Cl.
CPC ............. *G06F 30/10* (2020.01); *G06F 30/27* (2020.01); *G06F 30/28* (2020.01)

(58) Field of Classification Search
CPC ........... G06F 30/10; G06F 30/28; G06F 30/27
USPC .......................................................... 703/1
See application file for complete search history.

(56) References Cited

U.S. PATENT DOCUMENTS

2021/0303760 A1*  9/2021  Agonafer ................ G06F 30/23

FOREIGN PATENT DOCUMENTS

CN    110070091 A  *  7/2019  ............. G06K 9/342
CN    110404264 A  *  11/2019  ............. A63F 13/67

OTHER PUBLICATIONS

Reynoso-Jardón, E., et al. "Artificial neural networks (ANN) to predict overall heat transfer coefficient and pressure drop on a simulated heat exchanger." International Journal of Applied Engineering Research 14.13 (2019). pp. 3097-3103. (Year: 2019).*

(Continued)

*Primary Examiner* — John E Johansen
(74) *Attorney, Agent, or Firm* — Bhole IP Law; Anil Bhole; Marc Lampert

(57) ABSTRACT

A system and method for determining a geometry of a heat exchanger including boundary representation of one or more shapes. The method including: receiving input aspects of a design space for a geometry of a heat exchanger, the input aspects including control points in the design space defining the geometry of the heat exchanger; performing iteratively: parametrizing the design space using curves to define surface boundary conditions; determining heat transfer and pressure drop using the parameterized design space; performing reinforcement learning, the reinforcement learning taking the predicted heat transfer and pressure drop as input and determining a cumulative reward towards maximum heat transfer and minimum pressure, where the cumulative reward does not meet one or more predetermined conditions, updating the control points and performing a further iteration, otherwise performing no further iterations; and outputting the heat exchanger geometry represented by the control points in the design space.

20 Claims, 46 Drawing Sheets

FeniCS

Fluent

(56) References Cited

OTHER PUBLICATIONS

Chen, Wei, Mark Fuge, and Jonah Chazan. "Design manifolds capture the intrinsic complexity and dimension of design spaces." Journal of Mechanical Design 139.5 (2017). pp. 1-10. (Year: 2017).*

Schulman, John, et al. "Proximal policy optimization algorithms." arXiv preprint arXiv:1707.06347 (2017). pp. 1-12. (Year: 2017).*

Qian, Xiaoping. "Topology optimization in B-spline space." Computer Methods in Applied Mechanics and Engineering 265 (2013): 15-35. (Year: 2013).*

Hachem, Elie, et al. "Deep reinforcement learning for the control of conjugate heat transfer." Journal of Computational Physics 436 (2021): 110317. (Year: 2021).*

Keramati, Hadi, Feridun Hamdullahpur, and Mojtaba Barzegari. "Deep reinforcement learning for heat exchanger shape optimization." International Journal of Heat and Mass Transfer 194 (2022): 123112. (Year: 2022).*

International Search Report for PCT application No. PCT/CA2023/050574, CIPO, search completed: Jul. 5, 2023, dated Jul. 12, 2023.

Written Opinion of the International Searching Authority for PCT application No. PCT/CA2023/050574, CIPO, opinion completed: Jul. 12, 2023, dated Jul. 12, 2023.

Keramati, Hadi, et al., "Deep convolutional surrogates and freedom in thermal design", Energy and AI, vol. 13, 2023, 100248, ISSN 2666-5468, https://doi.org/10.1016/j.egyai.2023.100248.

Keramati, Hadi, et al., "Deep reinforcement learning for heat exchanger shape optimization", International Journal of Heat and Mass Transfer, vol. 194, Sep. 15, 2022, Article No. 123112, ISSN: 00179310, URL: https://doi.org/10.1016/j.ijheatmasstransfer.2022.123112.

Keramati, Hadi, et al., "Generative Thermal Design Through Boundary Representation and Multi-Agent Cooperative Environment", ICML 2022 Workshop on Machine Learning for Computational Design, Baltimore, Maryland, USA, PMLR 162, 2022, arXiv:2208.07952, https://doi.org/10.48550/arXiv.2208.07952.

* cited by examiner

SYSTEM AND METHOD FOR HEAT EXCHANGER SHAPE OPTIMIZATION

TECHNICAL FIELD

The following relates generally to thermo-fluid simulation and more specifically to a system and method for heat exchanger shape optimization.

BACKGROUND

Engineering design often includes a series of scientific computations and simulations to explore multiple topologies. Such computations and simulations have a wide range of applications in countless industries. Design of heat transfer devices is more complex than structural or aerodynamic design because of the additional convection-diffusion equation and its pertinent boundary interaction. High fidelity simulation used to solve Partial Differential Equations (PDEs) is CPU-intensive, particularly in presence of complex physics.

Advances in Additive Manufacturing techniques allow fabrication of complex geometries which are too challenging using conventional manufacturing methods. Normally, limited number of pre-defined manufacturable shapes are considered for the design purpose. Therefore, shape and Topology Optimization (TO) receive more attention as mathematical methods that optimize geometry. TO has a wide range of industrial applications from structural to biomechanics applications. Various approaches have been used for topology optimization such as density based, phase field, and shape derivative methods. The density-based topology optimization procedure known as the SIMP (Solid isotropic material with penalization) has been used in structural optimization; however, this approach is not practical for thermo-fluid application since a porous medium approach is used for solid distribution. In fluid flow and particularly heat exchanger design, boundary conditions are a significant part of the simulation and it is important to have distinguishable boundaries. Moreover, for several applications, such as those in biomedical engineering, working fluids (e.g. nanofluids) and particular boundary conditions require clear boundaries for implementation.

SUMMARY

In an aspect, there is provided a computer-implemented method for determining a geometry of a heat exchanger comprising boundary representation of one or more shapes, the method comprising: receiving input aspects of a design space for a geometry of a heat exchanger, the input aspects comprising control points in the design space defining the geometry of the heat exchanger; performing iteratively: parametrizing the design space using curves to define surface boundary conditions; determining heat transfer and pressure drop using the parameterized design space; performing reinforcement learning, the reinforcement learning taking the predicted heat transfer and pressure drop as input and determining a cumulative reward towards maximum heat transfer and minimum pressure, where the cumulative reward does not meet one or more predetermined conditions, updating the control points and performing a further iteration, otherwise performing no further iterations; and outputting the heat exchanger geometry represented by the control points in the design space.

In a particular case of the method, the curves comprise composite Bézier curves.

In another case of the method, the heat transfer and pressure drop are determined using average values for heat transfer and pressure drop calculated using computational fluid dynamics (CFD).

In yet another case of the method, the heat transfer and pressure drop are determined using a trained convolutional neural network, the training dataset for the convolutional neural network comprises images obtained during an early stage of optimization using a computation fluid dynamics environment.

In yet another case of the method, the convolutional neural network comprises an Xception network.

In yet another case of the method, the reinforcement learning comprises Proximal Policy Optimization (PPO).

In yet another case of the method, the Proximal Policy Optimization comprises PPO-Clip.

In yet another case of the method, the one or more shapes comprise a plurality of shapes, wherein the Proximal Policy Optimization comprises Multi-Agent Proximal Policy Optimization, and wherein each agent in the Multi-Agent Proximal Policy Optimization takes action on one of the plurality of shapes in the design space.

In yet another case of the method, the one or more predetermined conditions comprise a specified pressure drop, a value for heat transfer effectiveness, specified number of iterations, or a combination thereof.

In yet another case of the method, updating the control points comprises updating a policy for determining the cumulative reward towards maximizing heat transfer and minimum pressure using an Adam optimizer, and updating the control points using the updated policy.

In another aspect, there is provided a system for determining a geometry of a heat exchanger comprising boundary representation of one or more shapes, the system comprising one or more processors and data storage comprising instructions for the one or more processors to execute: an input module to receive input aspects of a design space for a geometry of a heat exchanger, the input aspects comprising control points in the design space defining the geometry of the heat exchanger; a parameterization module to parametrize the design space using curves to define surface boundary conditions; a geometry module to determining heat transfer and pressure drop using the parameterized design space, and perform reinforcement learning, the reinforcement learning taking the predicted heat transfer and pressure drop as input and determining a cumulative reward towards maximum heat transfer and minimum pressure, where the cumulative reward does not meet one or more predetermined conditions, updating the control points and performing a further iteration comprising repeating the parametrization of the design space and determination of the heat transfer and the pressure drop, otherwise performing no further iterations; and an output module to output the heat exchanger geometry represented by the control points in the design space.

In a particular case of the system, the curves comprise composite Bézier curves.

In another case of the system, the heat transfer and pressure drop are determined using average values for heat transfer and pressure drop calculated using computational fluid dynamics (CFD).

In yet another case of the system, the heat transfer and pressure drop are determined using a trained convolutional neural network, the training dataset for the convolutional neural network comprises images obtained during an early stage of optimization using a computation fluid dynamics environment.

In yet another case of the system, the convolutional neural network comprises an Xception network.

In yet another case of the system, the reinforcement learning comprises Proximal Policy Optimization (PPO).

In yet another case of the system, the Proximal Policy Optimization comprises PPO-Clip.

In yet another case of the system, the one or more shapes comprise a plurality of shapes, wherein the Proximal Policy Optimization comprises Multi-Agent Proximal Policy Optimization, and wherein each agent in the Multi-Agent Proximal Policy Optimization takes action on one of the plurality of shapes in the design space.

In yet another case of the system, the one or more predetermined conditions comprise a specified pressure drop, a value for heat transfer effectiveness, specified number of iterations, or a combination thereof.

In yet another case of the system, updating the control points comprises updating a policy for determining the cumulative reward towards maximizing heat transfer and minimum pressure using an Adam optimizer, and updating the control points using the updated policy.

These and other aspects are contemplated and described herein. It will be appreciated that the foregoing summary sets out representative aspects of embodiments to assist skilled readers in understanding the following detailed description.

DESCRIPTION OF THE DRAWINGS

A greater understanding of the embodiments will be had with reference to the Figures, in which.

DETAILED DESCRIPTION

Figure 1:
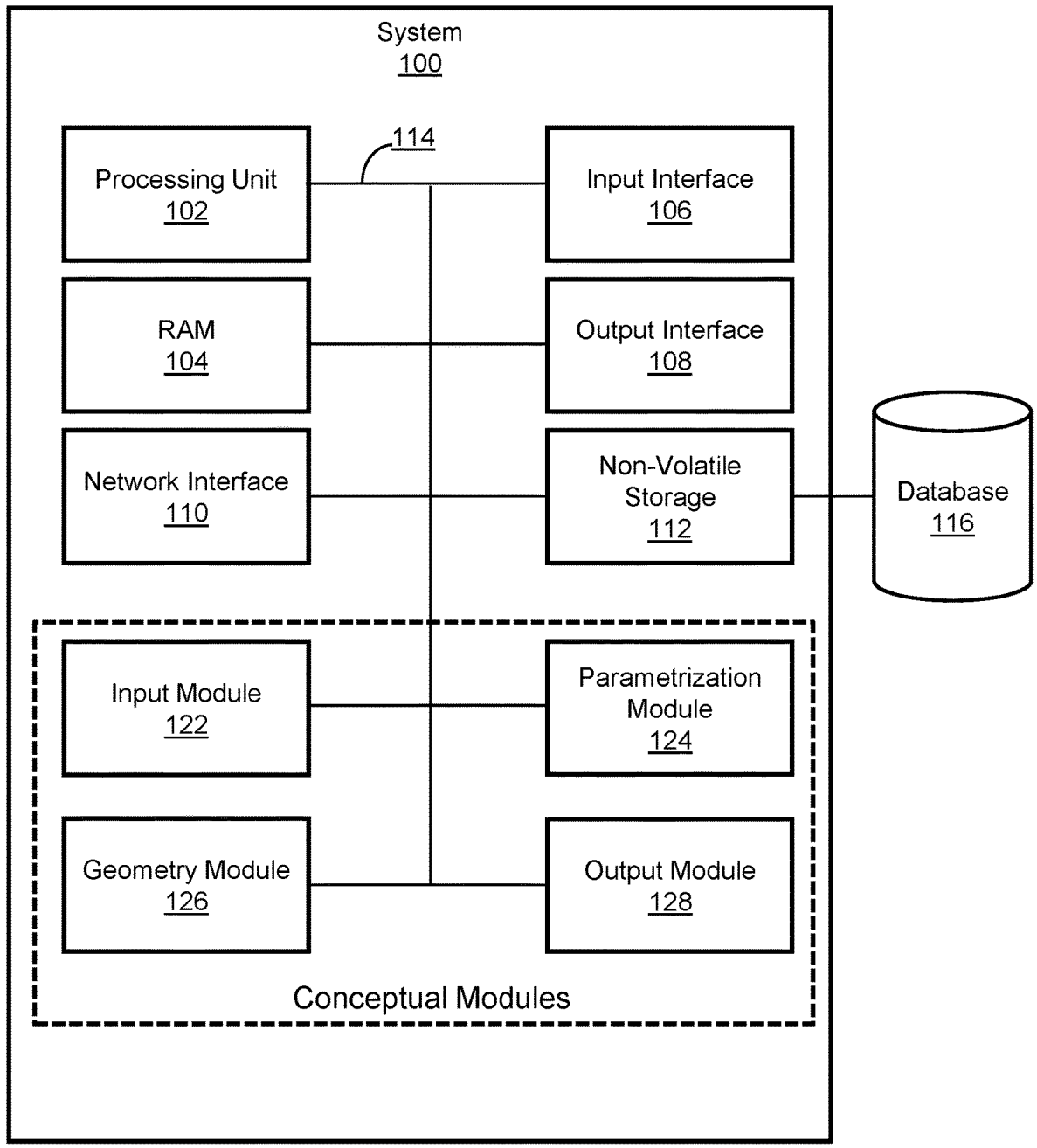
FIG. 1 is a schematic diagram of a system for heat exchanger shape optimization, in accordance with an embodiment.

Embodiments will now be described with reference to the figures. For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

Generally, heat exchanger design is not automated because traditional approaches use a trial and error approach. Part of the necessity to use the extremely inefficient trial and error approach is because of the complexity of modelling heat exchanger surfaces/boundaries. Advantageously, the present embodiments provide an approach to model such surfaces/boundaries with a composite Bézier curve, that allows automatically iterating over solutions to PDEs, and thus, automation of heat exchanger design using a reward function; as described herein. Some approaches have focused on prediction of velocity, pressure, and drag coefficient for constant geometries. In some cases, few geometrical parameters, such as aspect ratio, were considered.

The present disclosure describes embodiments for heat exchanger design which comprise modeling the design by automatically iterating over solutions to PDEs. In embodiments, the PDEs can be solved by a CFD solver, such as the FEniCS™ software program. In other embodiments, the PDEs can be solved using a combination of machine learning models (such as Deep Artificial Neural Networks (DAANs) more commonly referred to as DNNs) and RL; in some cases, along with parallel computing. Parallel training becomes a useful tool with the on-policy algorithm called Proximal Policy Optimization (PPO). The approach described herein can be used to perform CFD using parallel computing in a multiple CFD environment. Spline-based geometry can be used to reduce the dimension of the problem with reducing the design parameters to the number of control points. This approach advantageously provides continuous solid-fluid interface to support shapes beyond Euclidean geometries on which boundary condition could be applied.

The present disclosure provides approaches for prediction of heat transfer and pressure drop from a dataset of shapes generated based on BREP (Boundary Representation). BREP is an approach for representing geometry using limits, such as curves controlled by control points. BREP facilitates boundary condition implementation, which is crucial for thermo-fluid structures where nonlinear PDEs should be solved numerically. Optimized CNN architectures can be used for direct heat transfer and pressure drop estimation of morphable shapes; in contrast to previous approaches performed on constant geometry. Heat transfer and pressure drop can be predicted directly from images without depending on mesh representation. By applying the present embodiments, the time required for domain heat transfer and pressure drop computation, for varied morphable topologies, can be substantially reduced (i.e., from several minutes to a few seconds).

The present inventors show, in one embodiment, that an autonomous agent controlled by the system observes the CFD environment defined in FEniCS™ (a partial differential equation solver), and provides actions to optimize geometry (in an example, the geometry of a fin). Parallel computing has been used for simulation to provide the data required for PPO algorithm. Utilizing the approach of the present embodiments can enable moving surfaces in BREP to be the main optimization variable. The mathematical precise definition of the surfaces controlled by points makes the output geometry an ideal design for manufacturing purposes; particularly in microchannel design. In density-based methods, such as the SIMP method or the Navier-Stokes/Brinkman model, however, the computational domain can be considered a porous media without a clear interface representation of the solid and fluid-structure. The free form nature of density-based methods impose manufacturing challenges particularly in heat exchanger applications. Despite the advancement in the Additive Manufacturing industry, powder and support structure removal, overhang and several other factors limit the freeform optimization. Parametric optimization in combination with reinforcement learning of the present embodiments advantageously alleviates undesirable shapes by considering penalties for certain areas of the design space.

Deep learning is utilized in another embodiment. Deep Learning (DL) and Neural Networks provide predictive models for a wide range of applications. Physics-Informed Neural Network (PINN), for example, has shown promising results as a surrogate model to solve PDEs. The Convolutional Neural Network (CNN) is a class of DL which has gained popularity in recent years with numerous applications. CNN is capable of recognizing features in variable 2D shapes which makes it an appropriate model to predict simulation results of various physical shapes. CNN also benefits from parameter sharing which leads to a smaller number of trainable parameters compared to Fully Connected (FC) Layers. CNN can be used as a surrogate model to predict a steady state laminar velocity profile generated using Lattice Boltzmann Method (LBM); for example, CNN operating on Signed Distance Functions (SDFs) sampled on a 2D grid as the geometry representation. Accelerated Computational Fluid Dynamics (CFD) models using CNN can be used for turbulent flow prediction without the presence of boundaries which results in faster simulation even with fine grids. These models have wide applications in fluid flow prediction particularly in weather forecast where there is no complex boundary condition or complex topology. In some cases, continuous convolutions for Lagrangian fluid simulation without the presence of morphing shapes can be used to utilize the parallel processing power of graphics processing units (GPUs).

U-Net architecture can be used as a tool to reconstruct the CFD results of cylinder flow. Regular CNN can also be used for pressure prediction in flow around a cylinder. CNNs can be applied to two dimensional velocity field estimation of blood flow in artificial lungs. In some cases, time-dependent accelerated CFD can be used to minimize error accumulation that occurs during timesteps of value estimation. Error accumulation in next-step prediction, particularly in turbulent flow, causes distortion from ground truth values after few timesteps. Some approaches use pivotal nodes to summarize information of graphs acquired from mesh representation into a latent vector. This latent vector is used to predict the next-step velocity profile using FC layers. The information can then be decoded through the pivotal nodes to reduce error accumulation and computational cost associated with transient physics prediction.

In design optimization, time-averaged properties are favorable when the physics is time-dependent; which is the case for most optimization problems. Visual Geometry Group (VGG) networks can be used for drag prediction of the shapes generated using a Bézier curve at low Reynolds and steady state condition. FC layers can be used to predict a CFD result for fixed cubic geometry for indoor air flow application. Parameters of the physics can be used as input to the neural network, and fluid variables as the output. This approach has been reported to have an accuracy of less than 12% for thermal distribution.

A convenient way of optimizing the design of complex geometries, while keeping the boundaries distinguishable, is using pixel or voxel-based optimization; which requires high CPU time due to the curse of dimensionality. In thermofluid design, the direction to greater performance is aligned with greater design freedom. Providing freedom in design is, however, computationally demanding and imposes manufacturing challenges. Topological representation using parametric curves reduces the dimension of the optimization problem without sacrificing the resolution of the shape or freedom to change the design. This representation provides exact geometrical definition regardless of the size of discretization in numerical approach. Null space and gradient methods can be used to maintain clear shape boundaries during the shape optimization but has problems with respect to constraint implementation. Other approaches to heat transfer shape optimization generally rely on adjoint method, which computes the derivative of the objective with respect to design variables to specify the direction of the search algorithm which could be trapped in local optimal design candidates.

Reinforcement Learning (RL) can be used as a component of Machine Learning (ML). Many types of algorithms are introduced for classification, regression, clustering, and the like. RL, however, is a real time sequential decision making algorithm that can be applied to numerous real-world applications. Conventional tabular RL is generally only effective for the decision-making problems in which state-action pairs can be approximated and stored in arrays. While it is not hard to store all possible states and actions in memory, it is almost impossible for the RL agent to iterate over all possible states and actions to find optimal solutions for a specific problem. A Deep Neural Network, as described above, acts as an approximator and estimates the values of states or state-actions. In other words, DNNs are predictors used in modern RL as an alternative to the tables to estimate the value functions or a policy. This is useful particularly when the design space suffers from the curse of dimensionality. For heat exchanger design automation and more generally the mechanical design application, the CFD solver is generally the limiting factor for the speed of execution because of the CPU-intensive simulation environment. For the case of the CFD simulation, particularly shape optimization with the curved surfaces, it tends to deal with non-linear data for which classical machine learning approaches tend to fail in practical implementation.

Some approaches have used Geodesic Convolutional Neural Networks (GCNN) to predict the 2D Fluid Dynamics solution from mesh representation of the geometry to perform parametric shape optimization. Aerodynamic shape optimization using degenerate deep RL was performed showing an agent can optimize aerodynamic shapes without any prior knowledge of the final shape. Application of deep RL in a degenerate form to control heat transfer by changing position of the air supply position can be used, for example, for indoor thermal comfort. Controlling Natural convection in a limited 2D square and fixed Prandtl Number can be performed using RL. In some cases, a parallel CFD environment can be used for active flow control.

FIG. 1 shows various physical and logical components of an embodiment of the system 100. As shown, the system 100 has a number of physical and logical components, including a processing unit 102 (comprising one or more processors), random access memory ("RAM") 104, an input interface 106, an output interface 108, a network interface 110, non-volatile storage 112, and a local bus 114 enabling processing unit 102 to communicate with the other components. The processing unit 102 can execute or direct execution of various modules, as described below in greater detail. RAM 104 provides relatively responsive volatile storage to the processing unit 102. The input interface 106 enables an administrator or user to provide input via an input device, for example a keyboard and mouse. The output interface 108 outputs information to output devices, for example, a display. The network interface 110 permits communication with other systems, such as other computing devices and servers remotely located from the system 100, such as for a typical cloud-based access model. Non-volatile storage 112 stores the operating system and programs, including computer-executable instructions for implementing the operating system and modules, as well as any data used by these services. Additional stored data, as described below, can be stored in a database 116. During operation of the system 100, an operating system, the modules, and the related data may be retrieved from the non-volatile storage 112 and placed in RAM 104 to facilitate execution.

The system 100 includes one or more conceptual modules configured to be executed by the processing unit 102. In an embodiment, the modules include an input module 122, a parametrization module 124, geometry module 126, and an output module 128. In some cases, some of the modules can be run at least partially on dedicated or separate hardware, while in other cases, at least some of the functions of some of the modules are executed on the processing unit 102.

Figure 2:
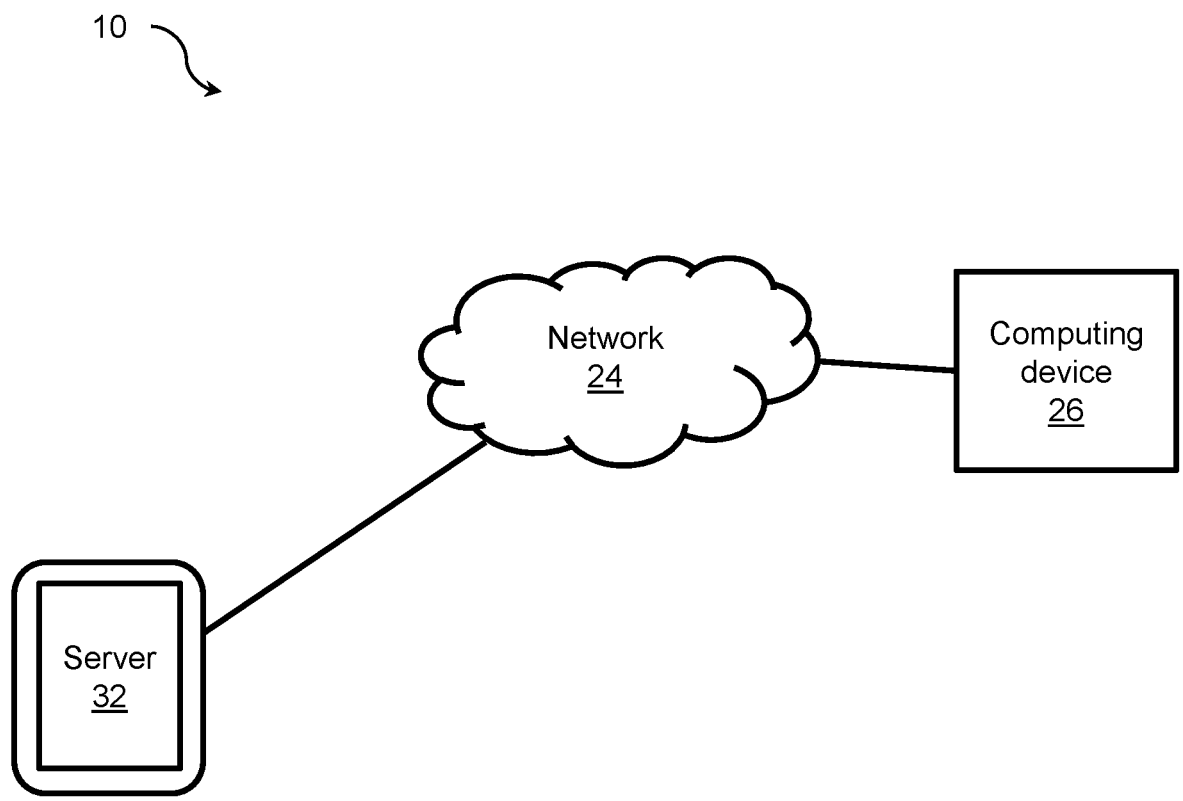
FIG. 2 is a schematic diagram showing the system of FIG. 1 and an exemplary operating environment.

FIG. 2 illustrates an example environment 10 of the system 100 for heat exchanger shape optimization, in accordance with the present embodiments, is shown. In an embodiment, the system 100 is run on a computing device 26 and accesses content located on a server 32 over a network 24, such as the internet. In further embodiments, the system 100 can be run only on the device 26 or only on the server 32, or run and/or distributed on any other computing device; for example, a desktop computer, a laptop computer, a smartphone, a tablet computer, a server, a smartwatch, distributed or cloud computing device(s), or the like. In some embodiments, the components of the system 100 are stored by and executed on a single computer system. In other embodiments, the components of the system 100 are distributed among two or more computer systems that may be locally or remotely distributed.

In some cases, computer-aided design (CAD) software can be used to model and define the parametric geometry, described herein, including lines, surfaces and curves.

Figure 3:
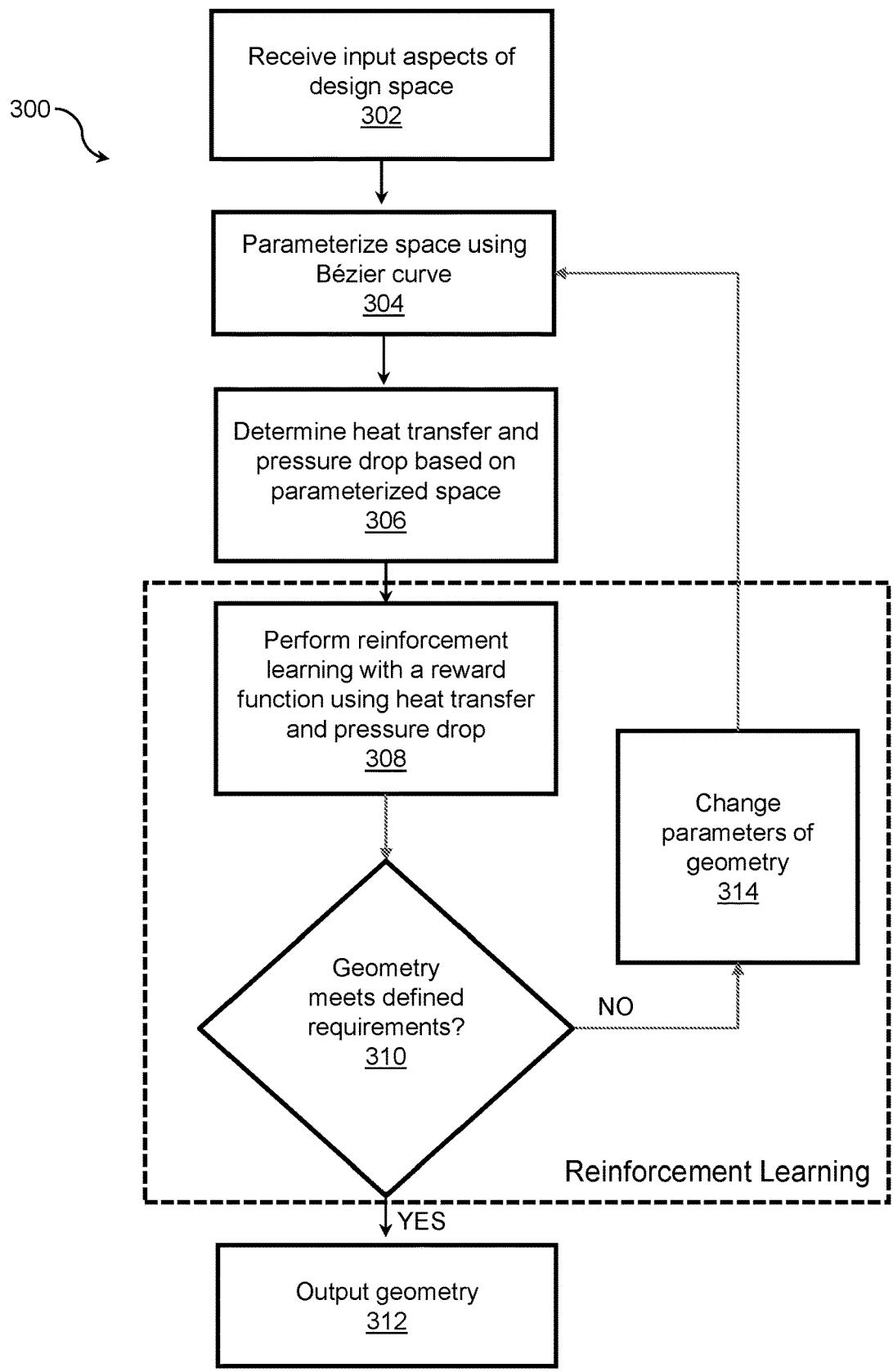
FIG. 3 is a flowchart for a method for heat exchanger shape optimization, in accordance with an embodiment.

FIG. 3 illustrates a flowchart of a method for heat exchanger shape optimization, in accordance with an embodiment.

At block 302, the input module 122 receives input aspects of a design space for the heat exchanger. The input aspects can be received from a user on the input interface 106, stored on the database 116, or from another computing device via the network interface 110. The input aspects can be, for example, initialized control points defining the geometry of the heat exchanger. In some cases, further input aspects can be received, for example, dimensions or area of the heat exchanger, temperature of applicable devices (such as a heat source), and applicable flow conditions of air or water (or the like). The control points are located within the design space and can be initialized using any suitable approach; for example, using a reference geometry or a random geometry.

The system 100 can be used to model conjugate heat transfer of laminar incompressible fluid in the constraint heat exchanger. In an example, a design space is a two dimensional space $D = \overline{\Omega_f} \cup \overline{\Omega_s} \subset \mathbb{R}^2$ occupied by a solid, and an incompressible fluid. In further cases, the design space can be three dimensional.

At block 304, the parametrization module 124 parameterizes the design space using a suitable parametric function, such as Bézier curves or composite Bézier curves (i.e., a Bézier spline). In a particular case, the solid component $\Omega_s$ of the design space can consist of composite Bézier curves controlled by moving control points, which causes incremental changes in the fluid domain $\Omega_f$. Defining geometry using boundary representation (BREP) facilitates implementation of moving boundary conditions during incremental changes.

Curves can be defined as implicit, explicit, or parametric. In a particular case, parametric expression of curves can be used. For example, Bézier curves are parametric curves and composite Bézier curves are piecewise Bézier curves where the initial and final points are joined together to form a continuous geometry. In particular cases, geometries are defined utilizing the composite Bézier curve because its mathematical definition facilitates the implementation of iterative process and defining b-spline kernels for use with Geometric Deep Learning. The present inventors have determined that composite Bézier curves are particularly well-suited for shape optimization because a continuous derivative on the curve is extremely useful for Neumann boundary condition implementation. A Bézier curve with a set of control points $P_i$ with n+1 parameters is defined as:

$$\alpha(u) = \Sigma_{i=0}^n P_i B_{i,n}(u); u \in [0,1] \tag{1}$$

where $B_{i,n}(u)$ is the ith function of degree n defined by Bernstein polynomials:

$$B_{i,n}(u) = n_i u^i (1-u)^{n-i}; i = 0, \ldots, n \tag{2}$$

Figure 4B:
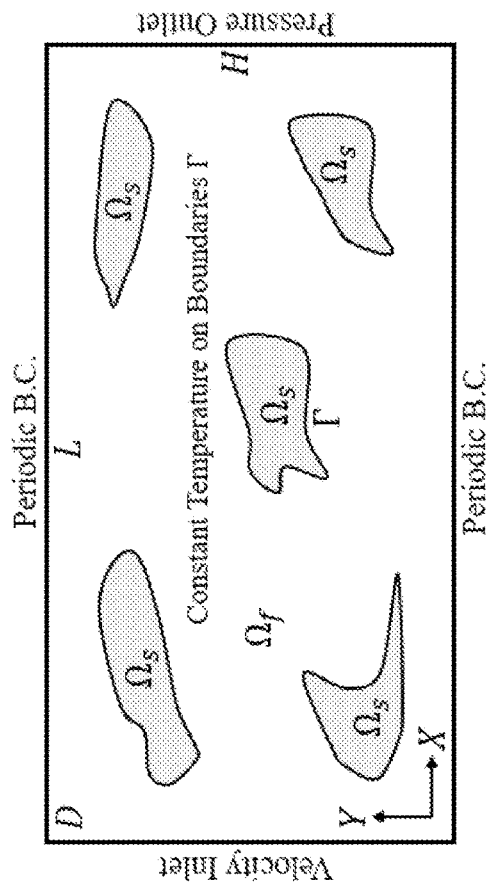
FIG. 4B illustrates an example of a total design space.
Figure 4A:
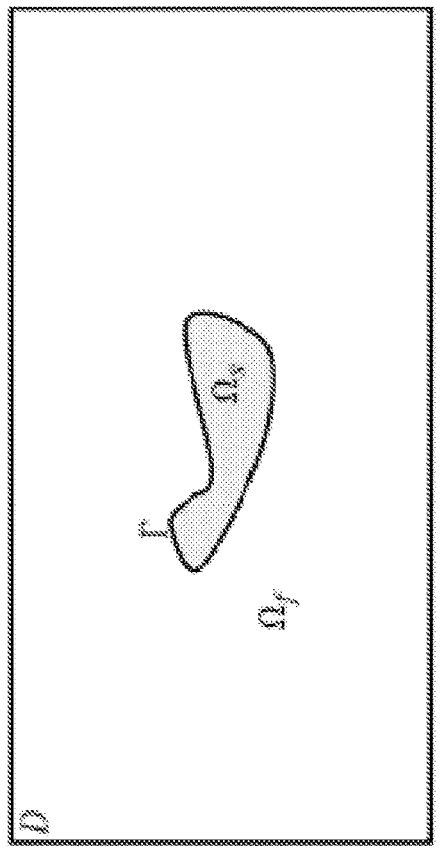
FIG. 4A illustrates an example of a rewarded design space represented by a boundary.

A CFD environment can be provided for the design space; which is shown in the example of FIGS. 4A and 4B. FIG. 4A shows design space exploration with a rewarded design space represented by boundary $\Gamma$ and FIG. 4B shows a BREP for a multi-shape design space. Internal square shows the design space in which the agent receives reward where the rectangle space is the total design space. The ratio of the spaces is shown in FIG. 4B.

At block 306, the geometry module 126 determines (or predicts) heat transfer and pressure drop, taking the geometry (i.e., control points) of the parameterized design space as input.

Figure 5A:
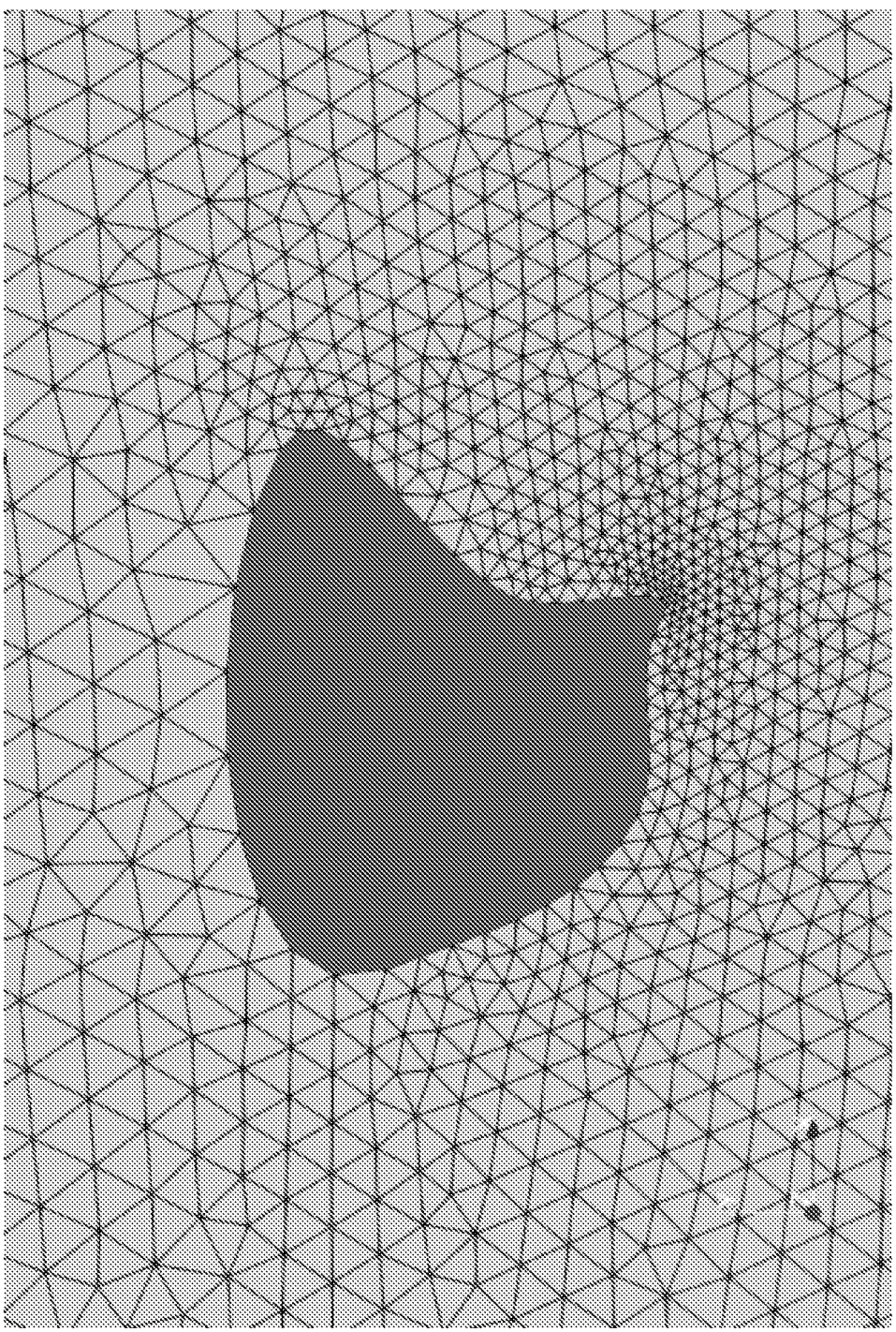
FIG. 5A illustrates an example of body-fitted mesh representation of a heat exchanger geometry for a single shape and FIG. 5B shows an example of body-fitted mesh resolution of a selected geometry in a multi-shape dataset.
Figure 5B:
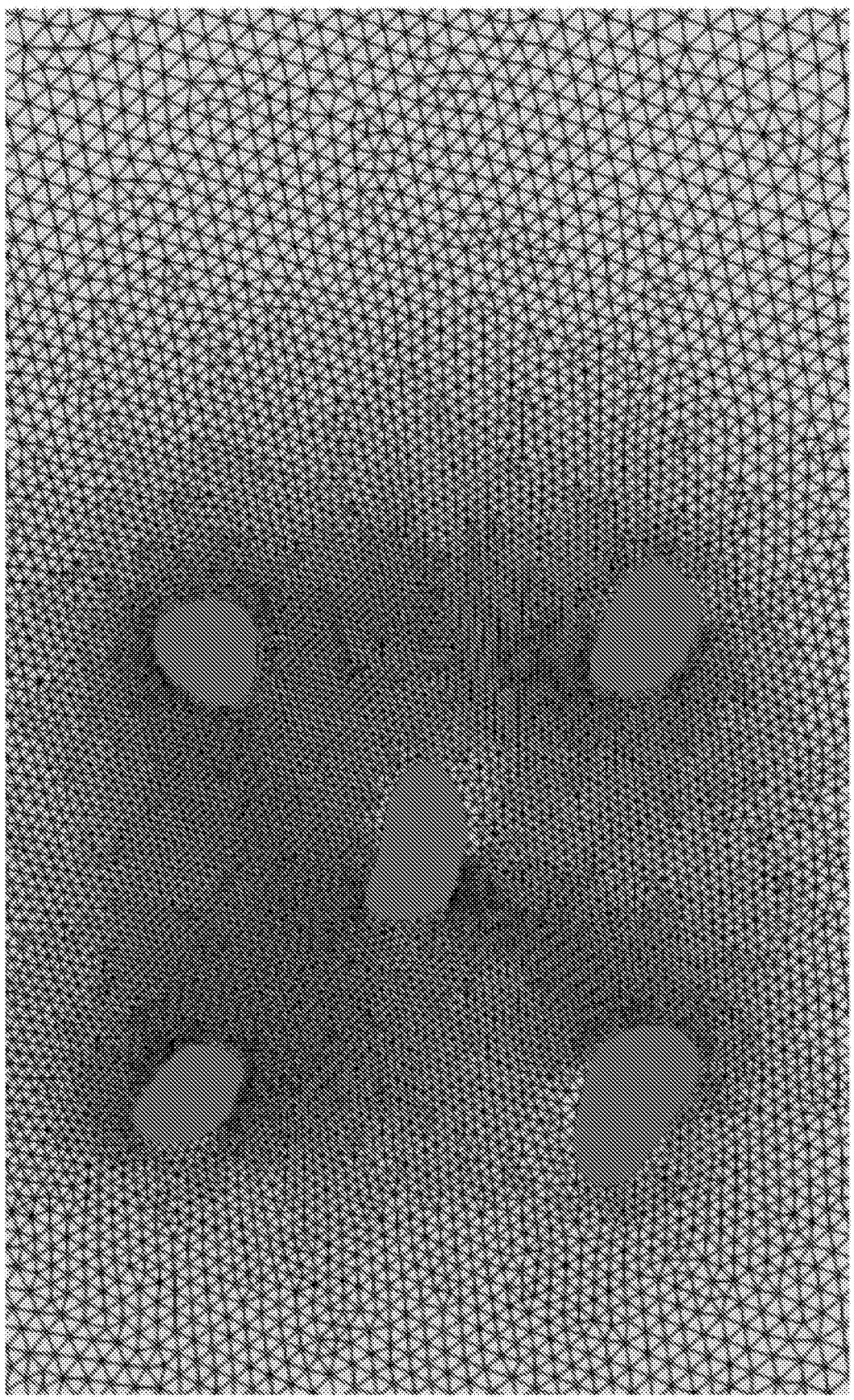

In an embodiment, the geometry module 126 determines the heat transfer and pressure drop of the environment solving the PDEs using any suitable language, for example, utilizing FEniCS. FEniCS is based on the Finite Element Method (FEM) used to solve the governing Equations (3) and (5), below. Body-fitted mesh generation of the geometry can be performed, for example, in GMSH. Mesh representation of a random geometry is shown in FIGS. 5A and 5B. Where FIG. 5A shows an example of body-fitted mesh resolution of a selected geometry for a single shape and FIG. 5B shows an example of body-fitted mesh resolution of a selected geometry in a multi-shape dataset.

Equation (3) and Equation (5) formulate the incompressible Navier-Stokes equation, and convection-diffusion equations (effects of gravity on momentum is considered to be negligible).

$$\begin{cases} \rho \frac{\partial u}{\partial t} + \rho((u \cdot \nabla)u) - \nabla(\sigma_f(u, p)) = 0 & 7 \text{mmin } 7 \text{ mm}\Omega_f \\ \nabla \cdot u = 0 & 12 \text{ mm } 6 \text{ m min } 6 \text{ mm}\Omega_f \\ u = u_0 & 3 \text{ mm } 12 \text{ mm } 6 \text{mm on } 9 \text{ mm}\Omega_{f,in} \\ \sigma_f(u, p) \cdot n = 0 & 7 \text{ mm } 2 \text{ mm on } 9 \text{ mm}\Omega_{f,out} \\ u = 0 & 6 \text{ mm } 16 \text{ mm } 2 \text{ mm on mm}\Gamma \end{cases} \tag{3}$$

where $\sigma_f(u,p)$ is considered as Newtonian fluid:

$$\sigma_f(u, p) = 2\nu e(u) - pI, \; e(u) = \frac{1}{2}(\nabla u + \nabla u^T) \tag{4}$$

In which I is the Identity matrix and $p \equiv p(\Omega_f)$ is the pressure.

$$\begin{cases} \rho c_p \dfrac{\partial T}{\partial t} + \rho c_p (u \cdot \nabla T) - \nabla \cdot (k_f \nabla T) = 0 \; \Omega_f \\ T = T_{in} \; \Omega_{f,in} \\ T = T_0 \; \text{on} \; \Omega_{f,t=0} \\ T_f = T_s \; 4 \text{ mm } 6 \text{ mm } 6 \text{ mm } 6 \text{ mm on } 6 \text{ mm}\Gamma \\ -k_f \dfrac{\partial T_f}{\partial n} = -k_s \dfrac{\partial T_s}{\partial n} \; 6 \text{ mm on } 6 \text{ mm}\Gamma \end{cases} \quad (5)$$

where u is the velocity field, and T is the temperature.

Traditionally, Finite Volume Method (FVM) is used more frequently for CFD computation. Traditional FEM without standardization struggled to solve CFD problems due to the nonlinearity of the convection term, which makes the problem unsymmetrical. FEM can be used because of the geometric flexibility of the method and advancement in computer hardware. In some cases, the present embodiments can use FEM to solve discretized Navier-Stokes equations and convection-diffusion equations along with BDF2 time scheme for Navier-Stokes equations and BDF1 time scheme for convection-diffusion equation. The numerical timestep is considered according to convergence condition by Courant-Friedrichs-Lewy. The weak form of these equations are given in Equation (8).

Periodic boundary condition is implemented in the vertical direction. Dirichlet boundary for the fluid variables $u=u_0=1$ m/s is considered for the inlet flow as well as Neumann boundary for the fluid variables $\sigma_f(u,p) \cdot n = 0$ at the outlet. Isothermal boundary for the inlet temperature and solid-fluid interface is considered $T_{in}=27$, $T_s=177$, respectively.

Heat transfer and pressure drop across the domain are computed by Equation (6) and Equation (7), below. Generally, a final time of the computation is considered to twice the size of the number of timesteps in temporal discretization based on the Courant-Friedrichs-Lewy condition so that the inlet flow travels twice the length of the domain. Average values obtained from Equation (6) and Equation (7) can be computed starting from the physical time when the inlet fluid travels the entire domain to the end of simulation in each environment.

$$Q(\Omega_f, u, T) = \int_{\partial \Omega_f} \rho c_p T u \cdot n \, dy \quad (6)$$

$$DP(\Omega_f, p) = \int_{\partial \Omega_f \cap \partial \Omega_{f,in}} p \, dy - \int_{\partial \Omega_f \cap \partial \Omega_{f,out}} p \, dy \quad (7)$$

In other embodiments, the geometry module 126 can use various convolutional neural network (CNN) architectures to determine the heat transfer and pressure drop of the geometry. Any suitable machine learning approach can be used, ranging from regular CNNs stacked together to develop very deep layers all the way to more complex engineered architecture such as the inception network. Most of these architectures are competitive in benchmark image classification problems. However, their performances in real world predictive tasks can be apart from the benchmark datasets. In an example, Xception network, along with a custom network optimized model, can be used for the present embodiments. Xception architecture consists of a modified version of depthwise separable convolution introduced in the Inception model to work in a series of operation to improve utilization of computing power. The CNN model can be trained using a training dataset consisting of images obtained during an early stage of optimization using the CFD environment. In this way, the training data can include task-aware data from previous determinations of the CFD environment.

In an example, 34,000 images can be generated for a multi-shape case using four and five points for each shape. These images along with their CFD results can be used for training the surrogate model for multiple shapes in the domain. In this example, 90% of the data can be used for training the model and 10% for validation and testing the model. Temperature profile for a collection of random geometries from the multishape dataset can be used for training the Xception network. Unity-based normalization can be used since heat transfer values for five shapes can go above, for example, 1000 watts.

Figure 6A:
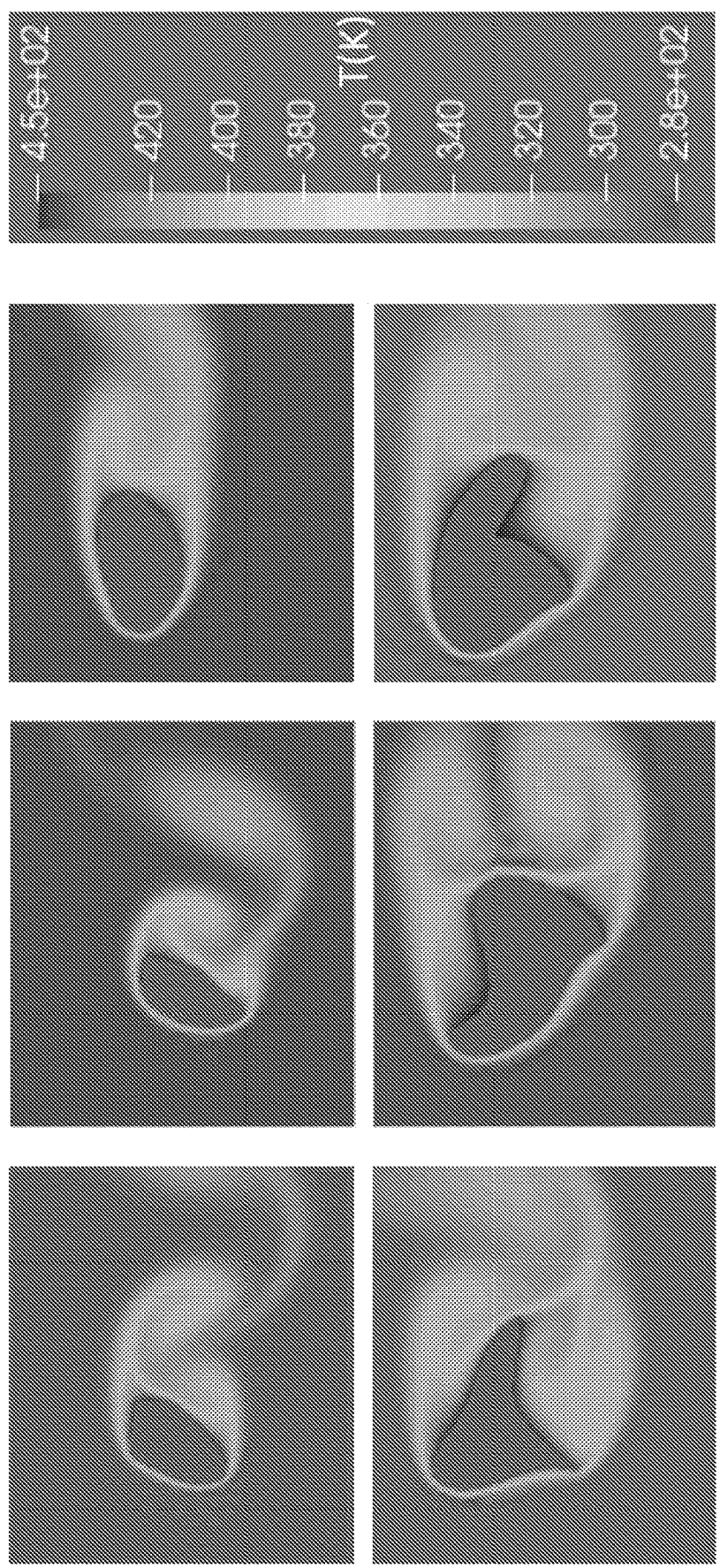
FIG. 6A illustrates an example of a temperature profile of random shapes in an experimental dataset for the case of a single shape inside the domain and FIG. 6B illustrates an example of a collection of random shapes in the experimental dataset for the case with multiple shapes inside the domain.
Figure 6B:
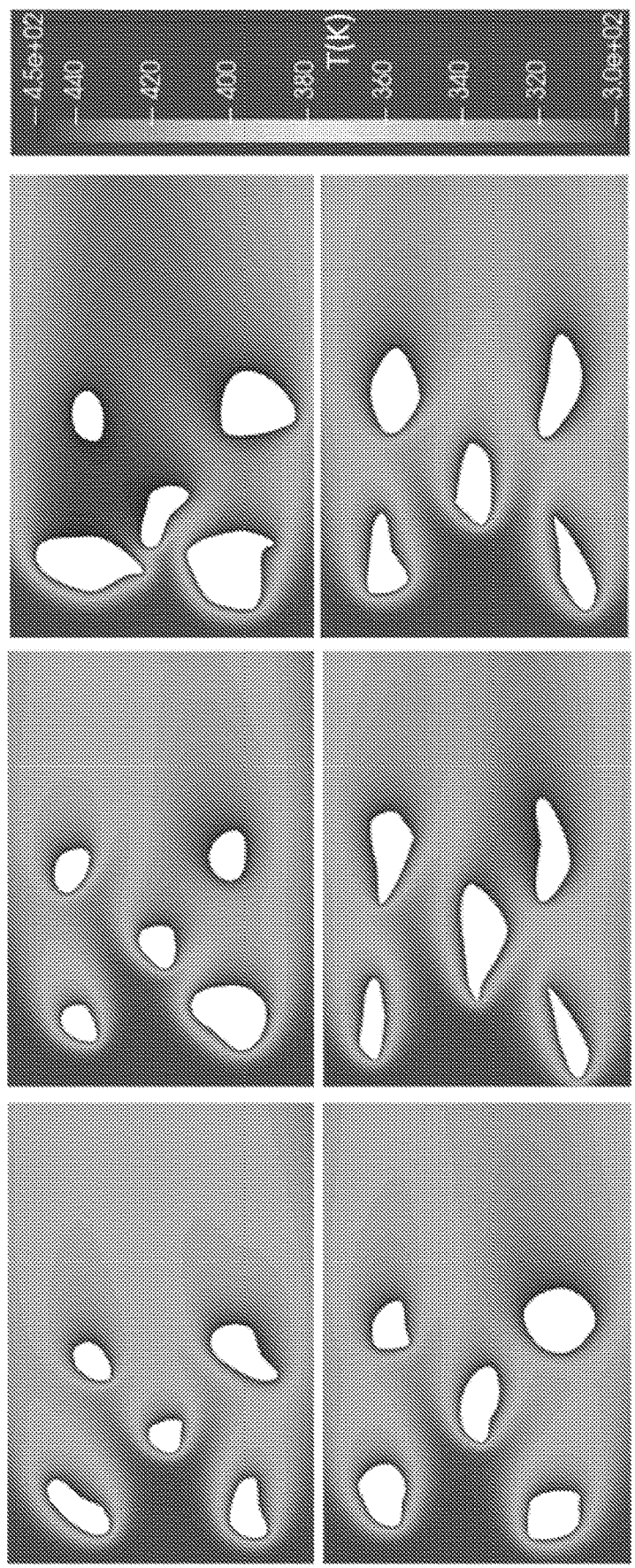

Geometries can be generated using mathematical approaches described herein with respect to spline-based geometry, as in the examples of FIGS. 4A and 4B; which provide 2D space for Eulerian simulation. Mesh generation is based on adaptive method and heuristics. The fluid properties are controlled by Reynolds and Prandtl number which considered to be 100 and 0.7, respectively. Since flow is time-dependent, time-averaged numerical result is considered for a long period of time over the third part of the computation. Temperature profile for some of the shapes at final timestep are shown in the example of FIG. 6A; where 4000 shapes using 4 and 5 control points are generated and saved as images. The size and resolution of the images are considered to be constant with a single channel, and 506×506 pixels. CFD results are saved and labeled accordingly. 70% of the data can be used for training and the remainder for cross-validation and test purposes. FIG. 6A illustrates an example of a temperature profile of random shapes in an experimental dataset for the case of a single shape inside the domain and FIG. 6B illustrates an example of a collection of random shapes in the experimental dataset for the case with multiple shapes inside the domain.

The present inventors conducted example experiments to verify the advantages of the present embodiments. In some of the experiments, a single AMD™ Ryzen™ workstation was used equipped with Ubuntu 20.04 LTS, 16-Core Processor 3.40 GHz CPU, 32.0 GB RAM, and one NVIDIA™ GeForce™ RTX 3080 Graphics Processing Units (GPUs). Python 3.8.9, TensorFlow, and Keras are used for deep learning implementation, as well as Multiprocessing and FEniCS to leverage multiple processors for parallel CFD computing.

Figure 7:
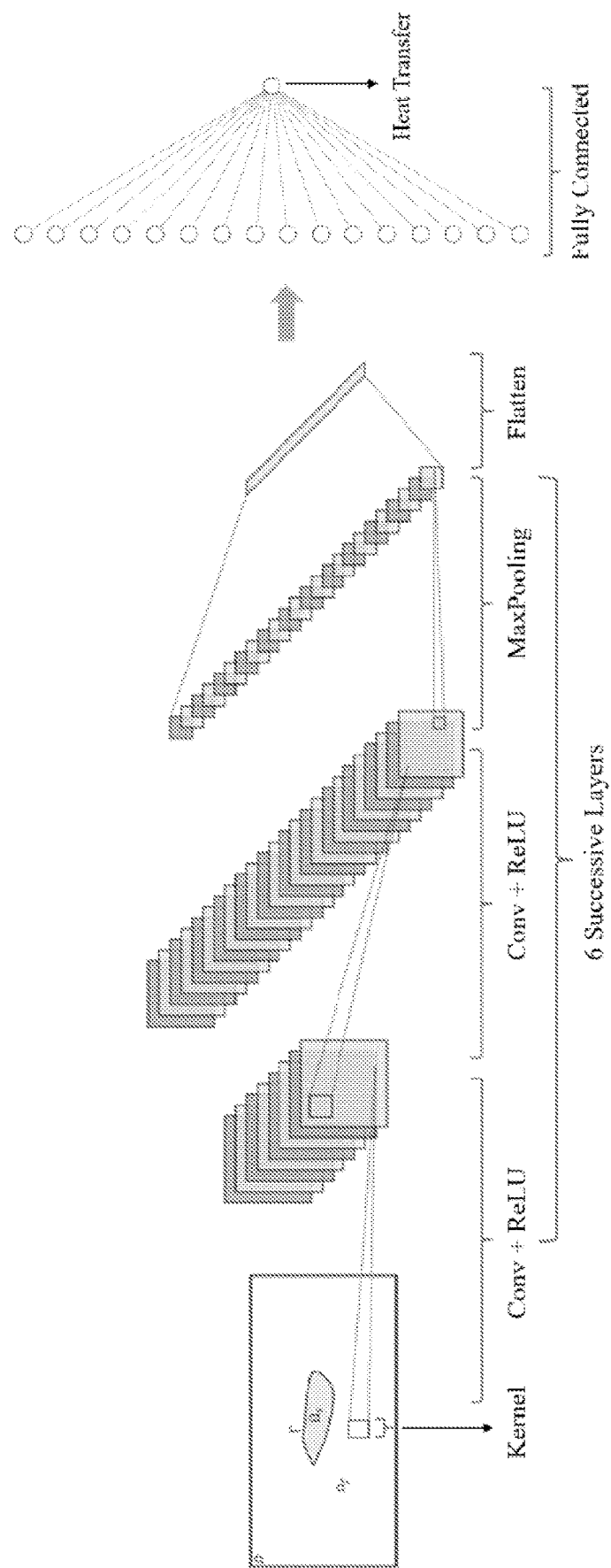
FIG. 7 illustrates an example of a CNN architecture for heat transfer prediction in accordance with the system of FIG. 1.

Hyperparameter tuning in DL models is often performed using either grid search or random search. In the example experiments, random search was used for number of feature extraction layers (3<feature extraction layers <10), number of filters in each layer (8<number of filters <96), and number of FC layers (2<FC layers <5). After few experiments with kernel size for the convolution operators, it was found that changes in accuracy and convergence between 3×3 and 5×5 kernel size are negligible since the location of information is in the center of the image. For efficient use of computation resources, we used 3×3 kernel size for convolutional layers and 2×2 kernel size for maxpooling layers. The schematics of the CNN architecture used for direct heat transfer prediction is shown in FIG. 7. It contains six successive feature extraction layers with two convolutional layers and one max pooling layer in each of them. Total number of trainable parameters for the proposed model is 1,160,305. Architecture of the optimized network is shown in 10. Xception model consists of more than 17 million parameters. Batch size for Xception is considered to be 256 while batch size of 128 leads to the best performance in regular CNN. Training time for heat transfer prediction using regular CNN and Xception network on the experimental setup was 45 minutes and 135 minutes respectively. The same approach was used for pressure drop considering the output neuron as the pressure drop value. Training for pressure drop estimation takes almost one hour for regular CNN and about 170 minutes for the Xception model.

Root Mean Squared Error (RMSE), Mean Square Error (MSE), and Mean Absolute Error (MAE) can be used for loss function definition to evaluate the quality of the machine learning model. In these experiments, MSE was used as given in Equation (8) to quantitatively assess the prediction error of the models. In this equation, $y_i^{prediction}$ is the predicted value, and $y_i^{groundtruth}$ is the value from high fidelity simulation.

$$MSE(y_i^{prediction}, y_i^{groundtruth}) = \frac{\sum_{i=1}^{N}(y_i^{prediction} - y_i^{groundtruth})^2}{N} \quad (8)$$

Figure 8:
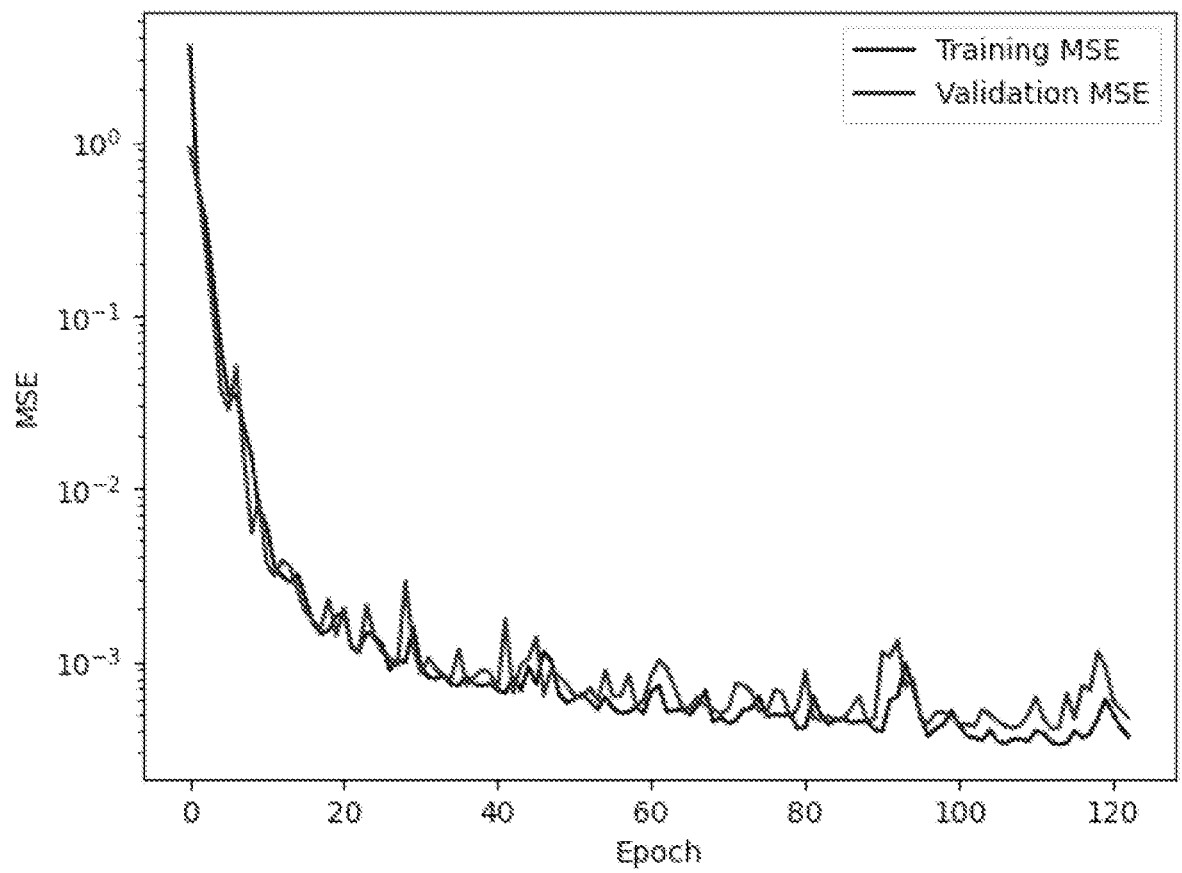
FIG. 8 illustrates an example chart of MSE value as a function of epoch during the training of optimized CNN architecture for heat transfer prediction.
Figure 9:
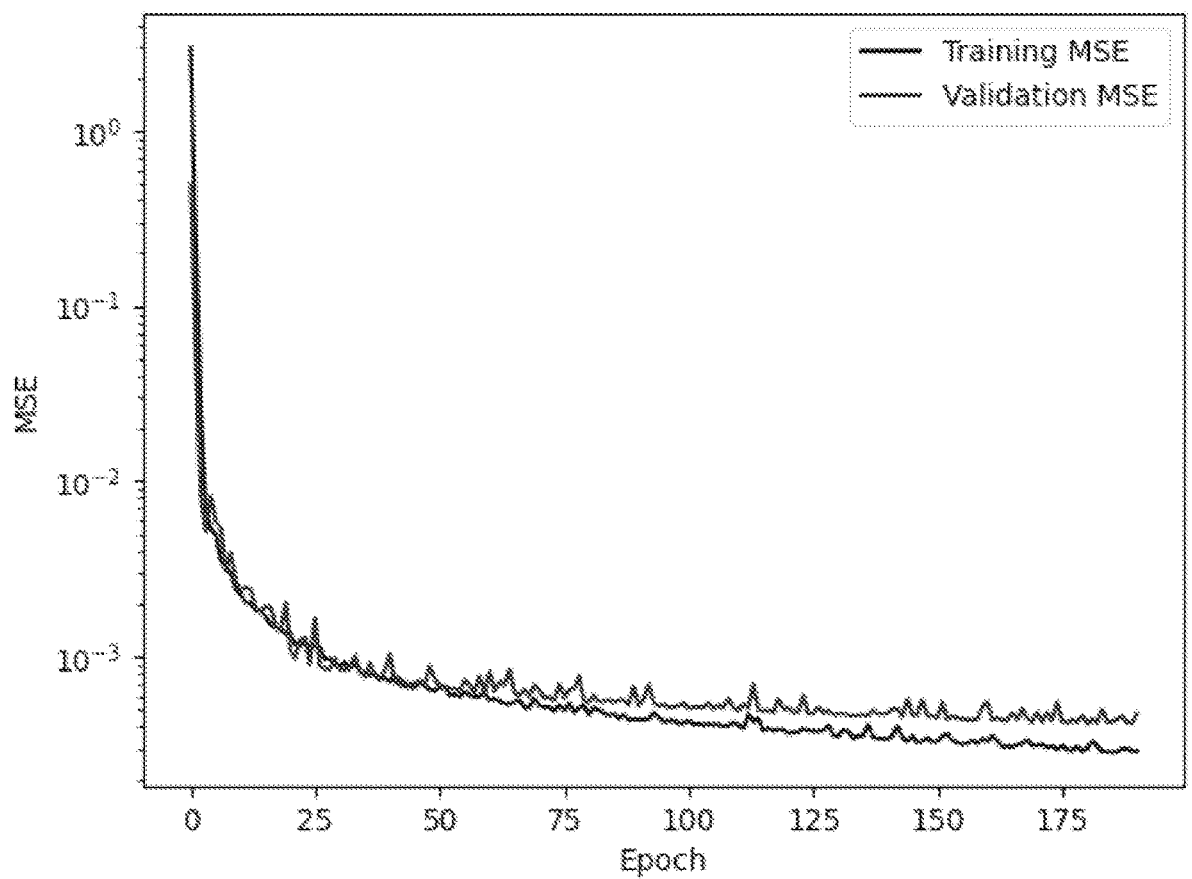
FIG. 9 illustrates an example chart of MSE value as a function of epoch during the training of Xception model for heat transfer prediction.

MSE values for each epoch of training and validation of optimized CNN model and Xception model are shown in FIGS. 8 and 9, respectively. As it can be seen in these figures, Xception model has lower final MSE value. FIG. 8 shows MSE value as a function of epoch during the training of optimized CNN architecture for heat transfer prediction. FIG. 9 shows MSE value as a function of epoch during the training of Xception model for heat transfer prediction.

Figure 10:
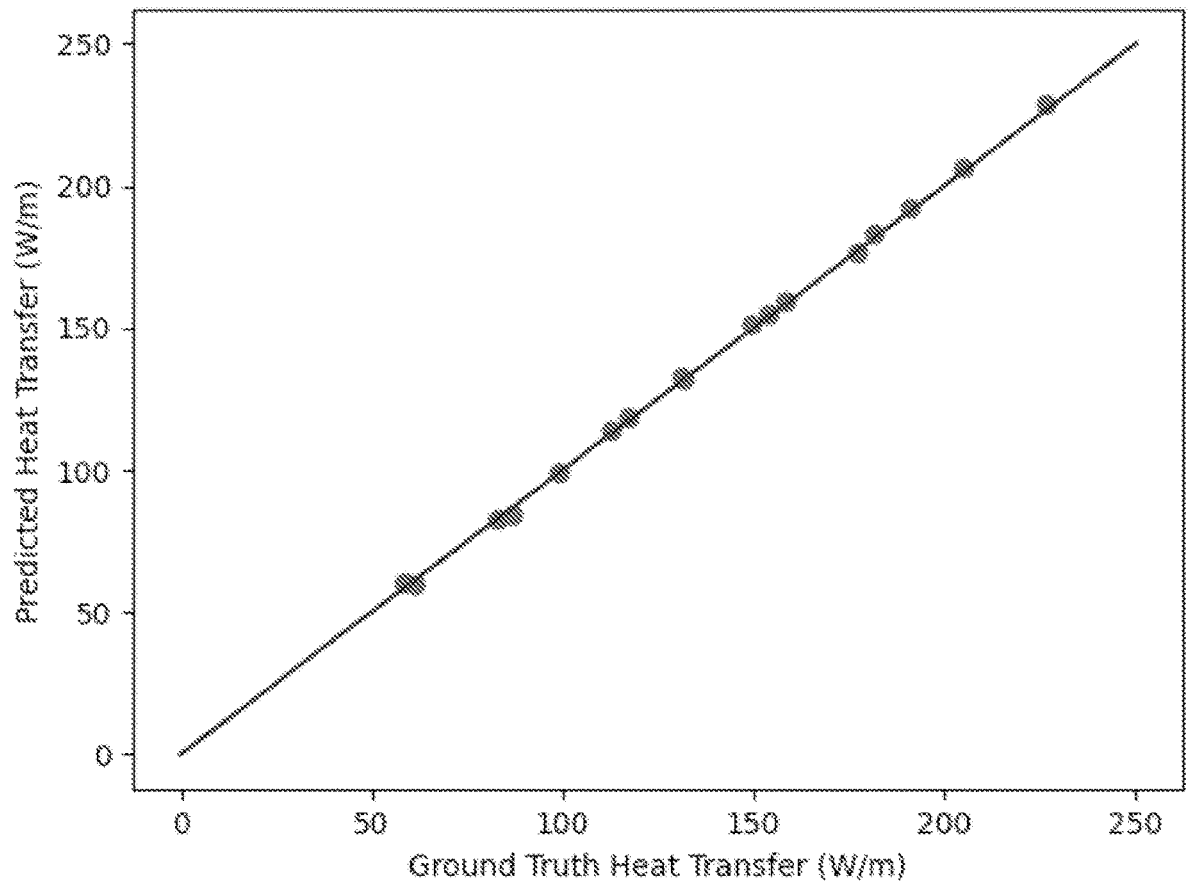
FIG. 10 illustrates an example chart of predicted and ground truth heat transfer using optimized CNN model.
Figure 11:
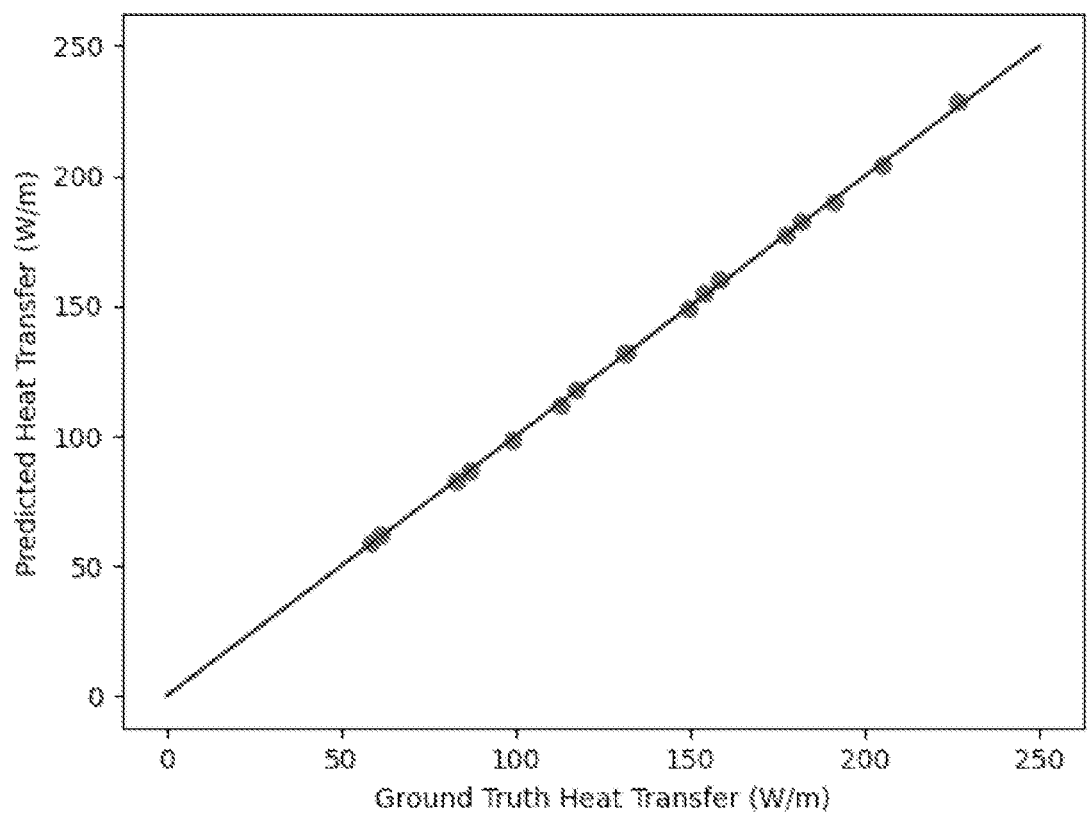
FIG. 11 illustrates an example chart of predicted and ground truth heat transfer using Xception network.
Figure 12:
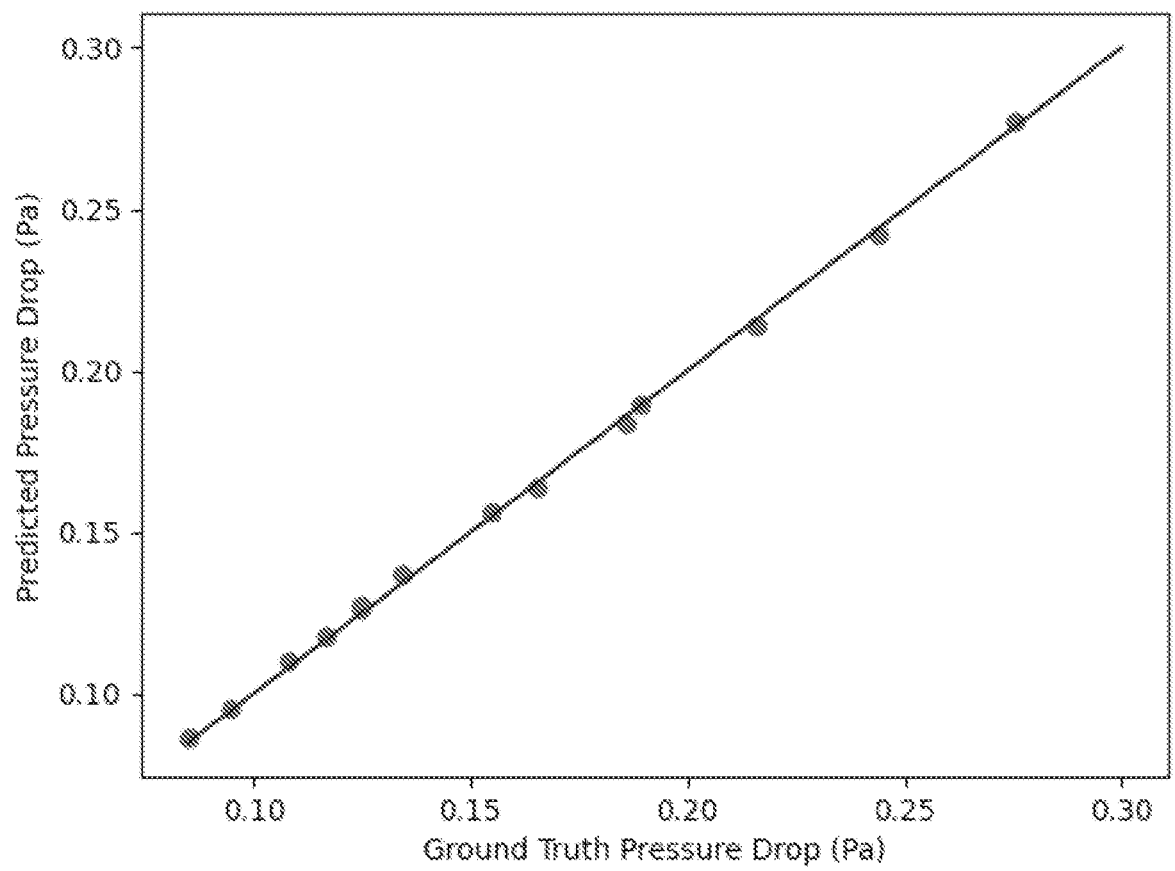
FIG. 12 illustrates an example chart of predicted and ground truth pressure drop using optimized CNN model.
Figure 13:
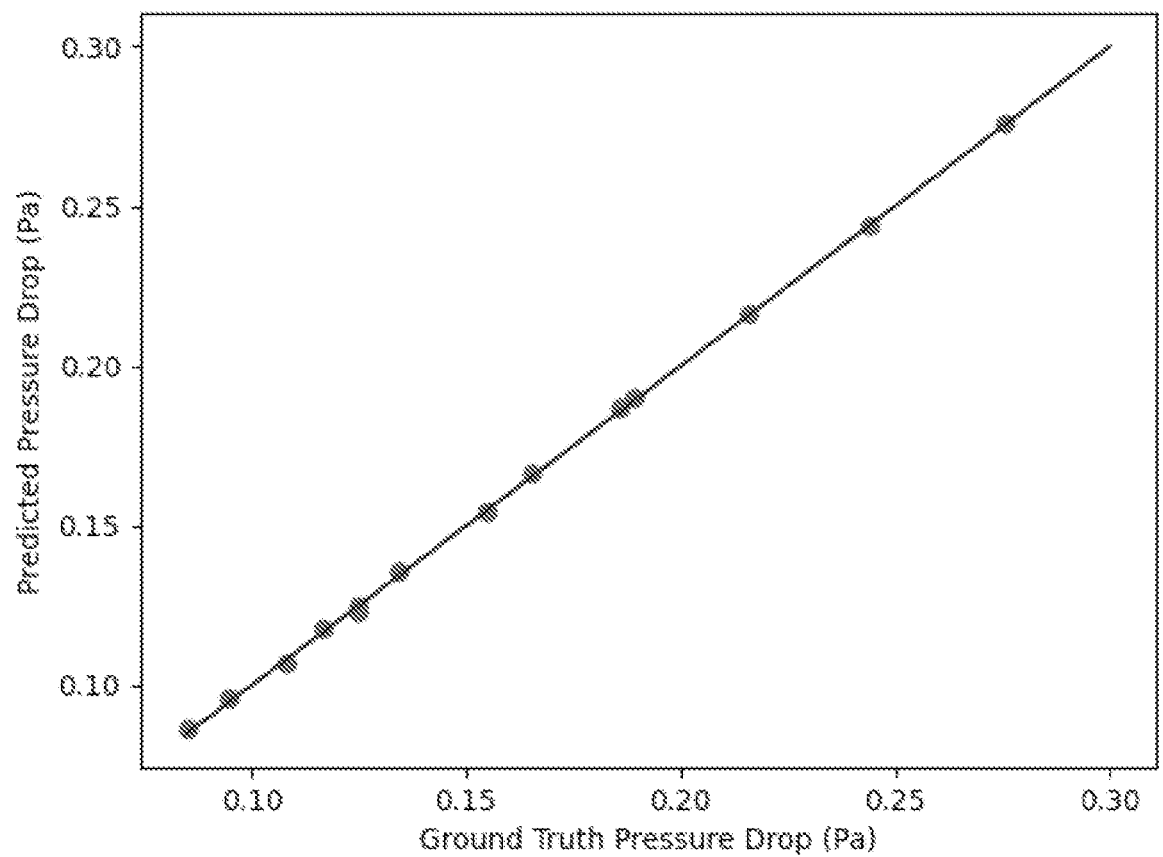
FIG. 13 illustrates an example chart of predicted and ground truth pressure drop using Xception network.

The geometry module 126 can use the optimized model with the regular CNN and Xception model to provide substantially improved predictive results for heat transfer prediction from arbitrary topologies. FIGS. 10 and 11 show predicted and ground truth values for heat transfer of the same shapes in the test dataset using optimized CNN model, and Xception model, respectively. Values in FIG. 11 are closer to the identity line which account for higher accuracy in heat transfer prediction. Higher prediction errors are associated with smaller heat transfer values which are pertinent to smaller shapes. Shapes with larger frontal areas, have higher heat transfer rates which result in lower errors. The trained model generalizes well beyond the training dataset as can be seen from the predicted values from the test dataset. FIG. 12 shows the predicted and ground truth values for pressure drop estimation using optimized CNN. There is a good agreement between predicted values and those from high fidelity simulation. FIG. 13 shows the estimated values for Xception network. It can be seen that Xception works better for both pressure drop and heat transfer prediction. It can be inferred that predicted heat transfer values are closer to the identity line compared to pressure drop values for both models. This is because of the data distribution of pressure values. Even though the same shapes are used for training the CNN model, CFD results in distribution for heat transfer values that are more compact than pressure drop values. The fact that heat transfer and pressure drop can be predicted directly from the BREP saved as images with a small dataset provides substantial improvements to the machine learning-accelerated solutions for thermo-fluid structures with non-linearity.

TABLE 1 shows the average time required for the CNN models and the CFD solver, of the present embodiments, in the example experiment of the single shape case. Regular CNN provides faster computation compared to other methods. CFD solver occasionally fails because of the failure in mesh adaptation during the shape morphing in presence of sharp edges or acute angles. DL-based computation does not require mesh generation and provides more robust algorithm. High fidelity simulation has higher standard deviation in terms of computing time since variation of the shapes causes change in number of meshes which leads to change in computation time.

TABLE 1

| Model | Average computing time |
|---|---|
| CNN | 0.42 seconds |
| Xception | 2.03 seconds |
| High fidelity simulation | 45 minutes |

TABLE 2 shows hyperparameters of the optimized regular CNN to facilitate the reproducibility.

TABLE 2

| Hyperparameter | Value |
|---|---|
| Learning rate | $1 \times 10^{-3}$ |
| Decay | $5 \times 10^{-3}$ |
| Number of Convolution layers | 11 |
| Number of MaxPooling layers | 5 |
| Number of FC layers | 2 |
| Activation function hidden layers | ReLU |
| Activation function output layer | Linear |
| Optimizer | Adam |
| Batch size (N) | 128 |

In TABLE 3 are hyperparameters of the Xception model used in this experiments.

TABLE 3

| Hyperparameter | Value |
|---|---|
| Learning rate | $1 \times 10^{-3}$ |
| Optimizer | SGD |
| Batch size (N) | 256 |

Figure 14A:
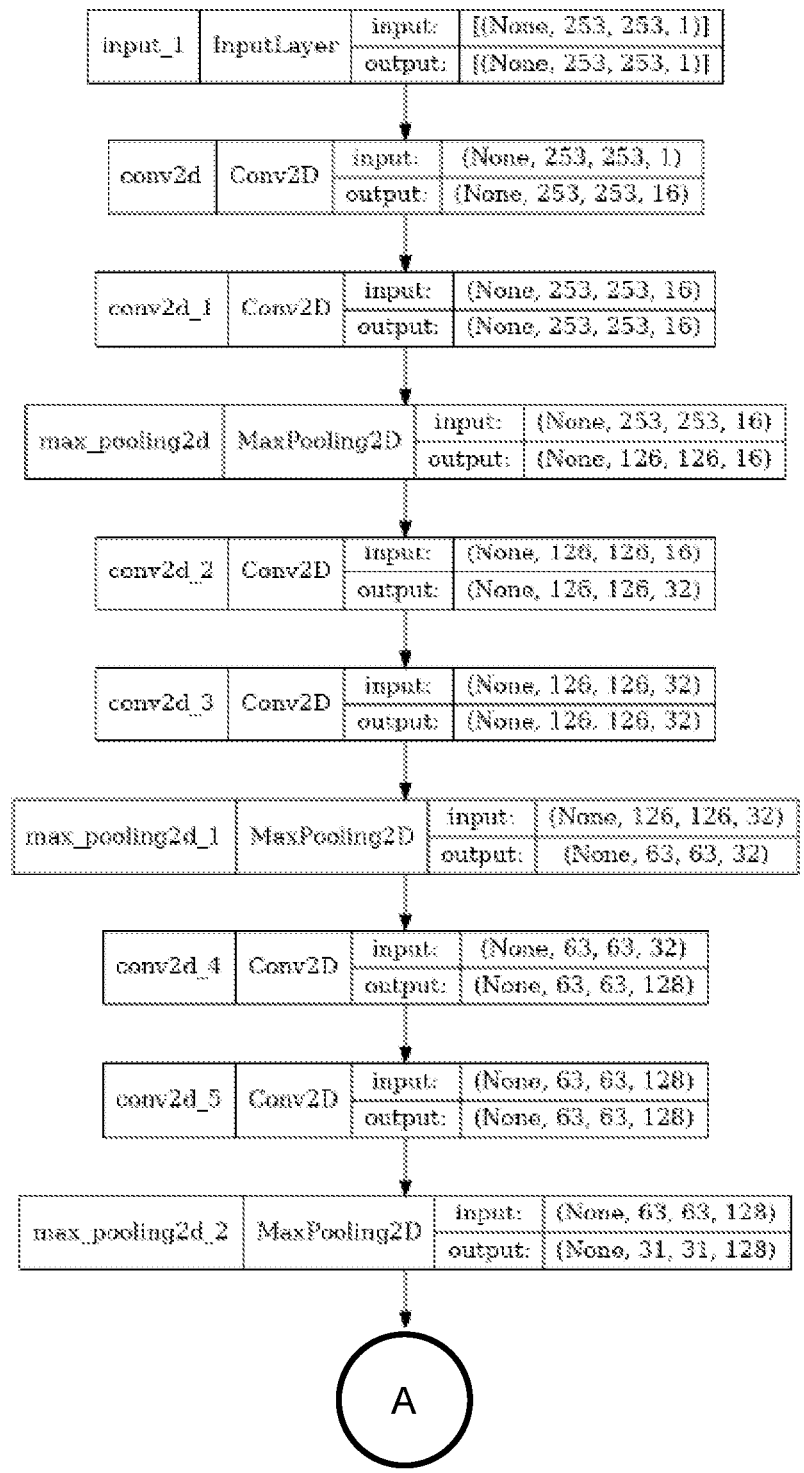
FIGS. 14A and 14B illustrate an example of a network architecture of the optimized CNN.
Figure 14B:
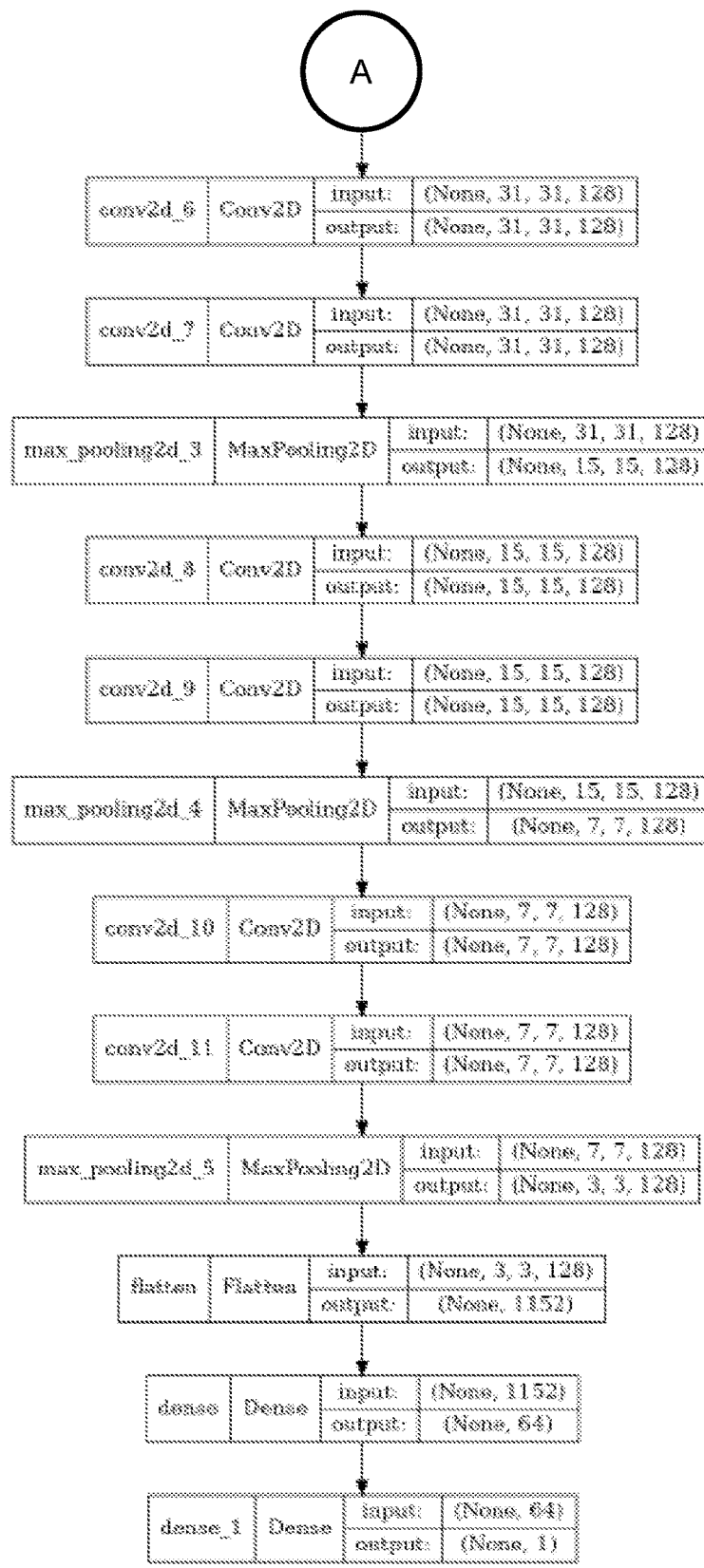

FIGS. 14A and 14B illustrate an example architecture of the optimized CNN used for heat transfer prediction by the geometry module 126, in accordance with the present embodiments. The input image size is downscaled version of the original image by a factor of two with the size of 253×253 pixels. Activation functions for convolutional layers and the fully connected layer are ReLU, and activation function for the output neuron is considered to be linear function.

In some embodiments, convolutional neural networks can be used to predict heat transfer and pressure drop of shapes generated using composite Bézier curve without expensive CFD computation. An optimized CNN network using regular convolutions as well as an Xception model can be deployed to predict heat transfer and pressure drop values with less than 3% error. In the example experiments, the Xception network showed more accurate prediction compared to the regular CNN. Time-averaged CFD results were predicted directly from images of the geometries without using mesh representation. This provides acceleration for heat transfer and pressure drop computation from several minutes to less than two seconds. In some cases, the present embodiments can be used to predict the CFD results directly from morphable CAD file. This provides the opportunity to improve the prediction model to three dimensional BREP-based morphable topologies.

At block 308, reinforcement Learning (RL), such as multi-agent RL, can be used by the geometry module 126 in combination with the CFD solver or ML model described herein, to refine the heat exchanger geometry. RL can be used for sequential decision making processes. In RL, an agent interacting with an environment, learns the optimal policy used for optimal decisions over time. Deep Reinforcement Leaning (deep RL) uses a Deep Neural Network as a predictor for high dimensional action space. Thermal shape optimization problem is a complex task, and tabular methods of Reinforcement learning are generally not effective in predicting the heat transfer and fluid properties. A Deep Neural Network representation of the physics of the CFD environment is required due to the stochastic nature of the design space. Several algorithms can be used for interaction of Neural Network with RL agent; such as Deep Q-Network (DQN) in which Q-value updates are a relation between the predicted and target values derived from the Bellman equation. Approaches can be used for policy gradient updates, such as vanilla policy gradient methods, Trust Region Policy Optimization (TRPO) and Advantage actor-critic (A2C) methods. DQN is not a powerful tool for complex problems, vanilla policy gradient methods exhibit poor robustness; TRPO is complicated to implement particularly when dealing with complicated numerical simulations with the chance of failed meshing or equation solving. In embodiments of the present disclosure, a Proximal Policy Optimization (PPO) algorithm can be used with improved stability of the stochastic policy updates during training and parallel environment implementation. PPO use a clipping ratio to alternate between sampling data through interaction with the environment, and optimizing a surrogate objective function using stochastic gradient ascent. In an example, three fully connected hidden layers with ReLU activation function are used, written in Tensorflow.

Figure 15:
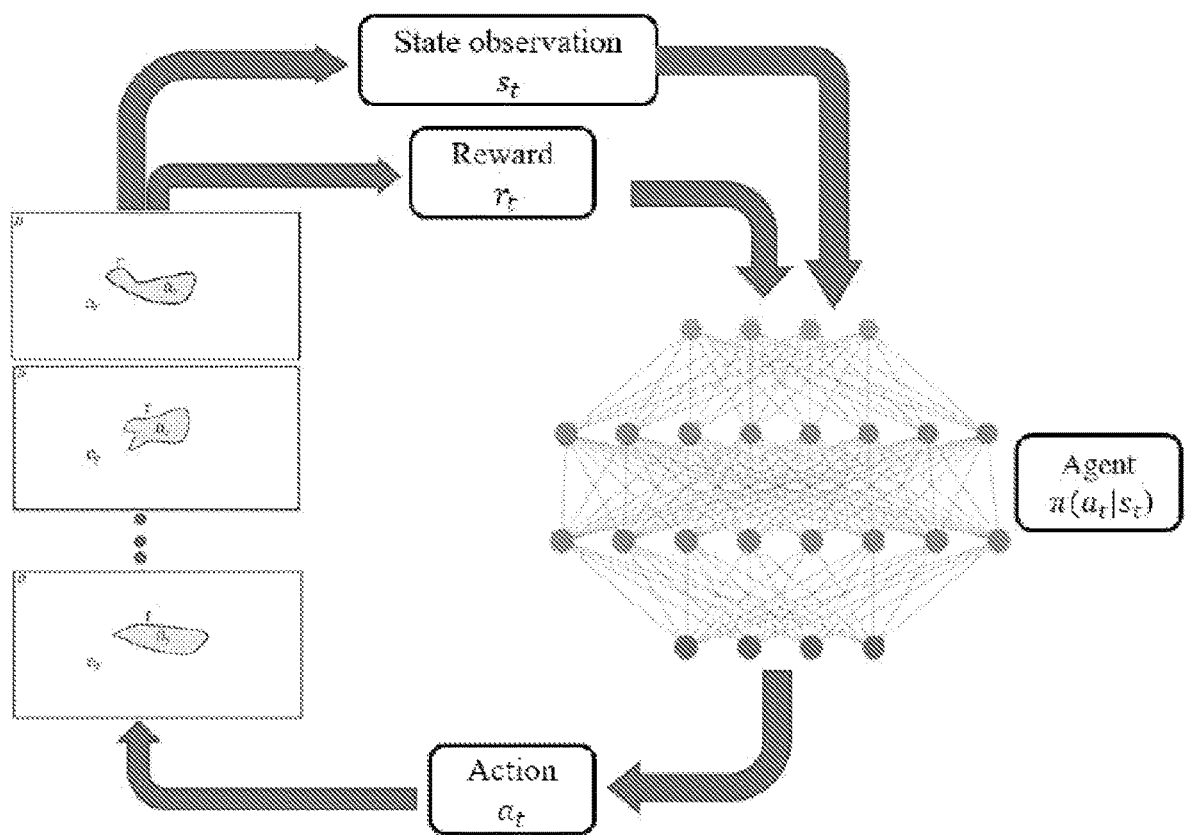
FIG. 15 illustrates an example of deep reinforcement learning workflow with parallel Computational Fluid Dynamics (CFD) environment.

Policy gradient, in accordance with the present embodiments, can use gradient estimator in the form of Equation (9) in combination with gradient ascent shown in Equation (10).

$$\nabla_\theta J(\pi_\theta) = \underset{\tau \sim \pi_\theta}{E} \sum_{t=0}^{T} \nabla_\theta \log \pi_\theta(a_t | s_t) A^{\pi_\theta}(s_t, a_t) \quad (9)$$

where $\pi_\theta$ denote a policy with parameters $\theta$, and $J(\pi_\theta)$ denote the expected finite-horizon undiscounted return of the policy. The gradient of $J(\pi_\theta)$, $\tau$ is a trajectory and $A^{\pi_\theta}$ is the advantage function for the current policy. $a_t \in \mathcal{A}$ and $s_t \in \mathcal{S}$ are action and state from action and state space $\mathcal{A}$ and $\mathcal{S}$ shown in FIG. 15. FIG. 15 illustrates a deep RL workflow with parallel CFD environment.

Gradient ascent updates the policy parameters $\theta$ according to Equation (10).

$$\theta_{k+1} = \theta_k + \alpha \nabla_\theta J(\pi_{\theta_k}) \quad (10)$$

where $\alpha$ is a learning rate and $k \in \{0, 1, 2, \ldots\}$ are the update numbers.

Several different algorithms exist for deep RL implementation among which PPO provides a robust and uncomplicated framework for parallel training. There are two primary policy updates approaches using PPO known as PPO-Penalty and PPO-Clip. In the present embodiments, PPO-Clip policy updates are generally used; which remains stable in case of mesh failure since remeshing process are prone to failure. PPO-Clip updates policies via Equation (11):

$$\theta_{k+1} = \underset{\theta}{\arg\max} \underset{s, a \sim \pi_{\theta_k}}{E} [L(s_t, a_t, \theta_k, \theta)] \quad (11)$$

where L is according to the Equation (12):

$$L(s_t, a_t, \theta_k, \theta) = \min\left(\frac{\pi_\theta(a_t | s_t)}{\pi_{\theta_k}(a_t | s_t)} A^{\pi_{\theta_k}}(s_t, a_t), \text{clip}\left(\frac{\pi_\theta(a_t | s_t)}{\pi_{\theta_k}(a_t | s_t)}, 1-\epsilon, 1+\epsilon\right) A^{\pi_{\theta_k}}(s_t, a_t)\right) \quad (12)$$

where $\epsilon$ is a hyperparameter controlling the correlation between new and old policy. In an example, this hyperparameter can be 0.2. Advantage $A^{\pi_{\theta_k}}(s_t, a_t)$ is according to Equation (13):

$$A^{\pi_{\theta_k}}(s_t, a_t) = \delta_t + (\gamma\lambda)\delta_{t+1} + \ldots + \ldots + (\gamma\lambda)^{T-t+1}\delta_{T-1} \quad (13)$$

where t is the timestep and T is the final time.

$$\delta_t = r_t + \gamma V(s_{t+1}) - V(s_t) \quad (14)$$

where $V(s_t)$ is the estimated value function and $r_t$ is the reward.

Figure 27:
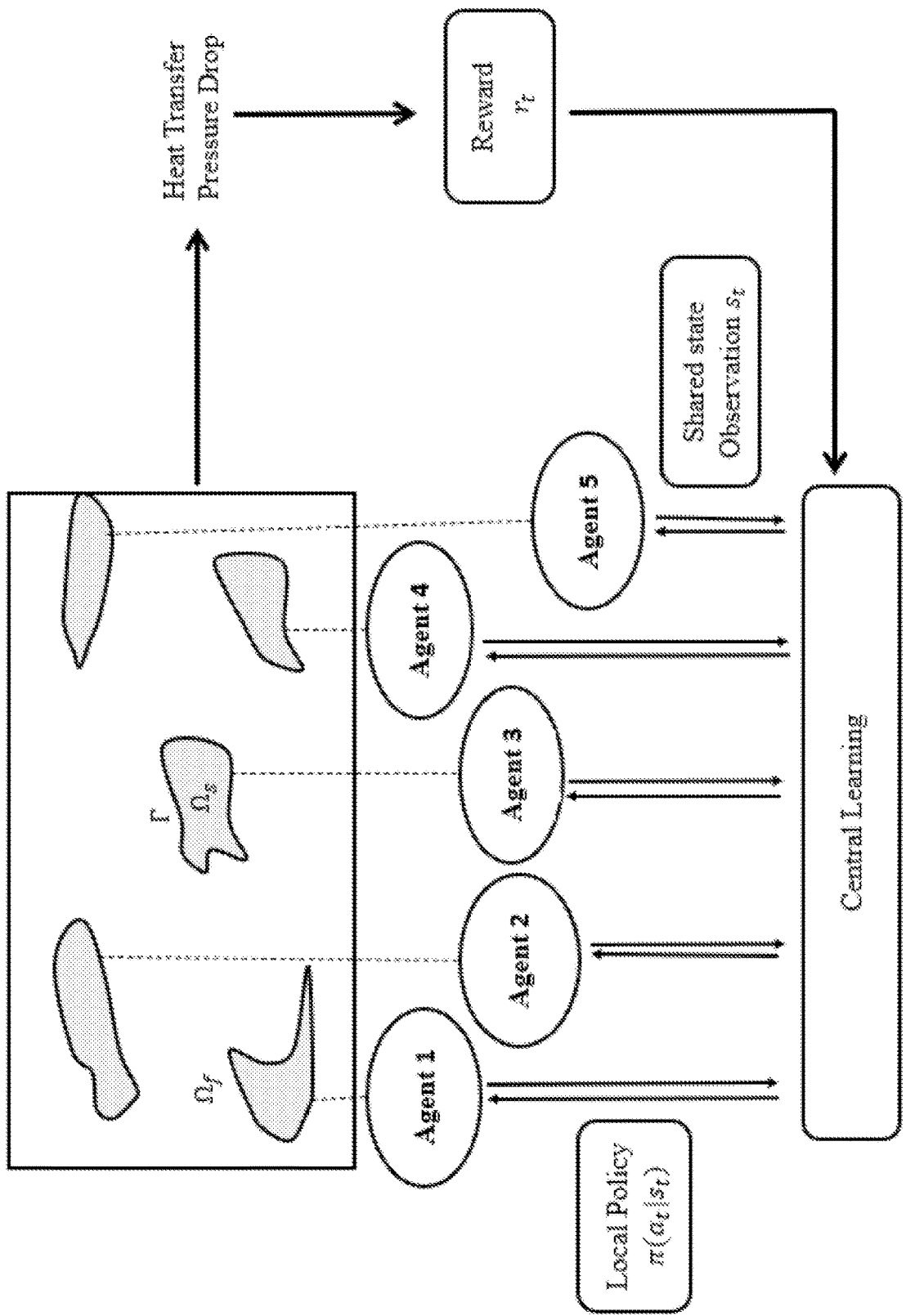
FIG. 27 illustrates an example framework for Multi-Agent Proximal Policy Optimization (MAPPO)

In the present embodiments, multi-agent RL or single-agent RL can be used; where the single-agent RL is generally a simplified case of the multi-agent RL. For example, Multi-Agent Proximal Policy Optimization (MAPPO) can have a value function that receives a global state, which reduces variance for policy learning. Centralized Training and Decentralized Execution (CTDE) with homogeneous agents, can be used, that utilizes parameter sharing. FIG. 27 shows an example framework for MAPPO. Each agent is responsible for geometry of one single shape taking action $\alpha_i$ using shared policy $\pi_\theta$ with parameters $\theta$. The heat transfer domain is a combination of geometries produced by actions $A = (\alpha_1, \ldots, \alpha_n)$ in which n is the number of agents. Each shape is allowed to occupy a rectangle with the size of H/4 and L/3 centered by the initial shape. Therefore, all agents act in the same environment with the same action space.

An ideal fin is expected to cause maximum heat transfer and minimum pressure. The agent is supposed to find an optimal policy that can maximize the discounted cumulative reward. In the present embodiments, reward of the agent can be determined according to Equation (15).

$$r_t = \frac{Q}{\Delta p} \quad (15)$$

In the CFD solver embodiment, the reward can be determined numerically with FEM in CFD environment written in, for example, FEniCS. There are several approaches to optimize the heat exchanger in which the equation given in Equation (15) is used. Reward shaping is a technique used to construct the reward function that can provide a better convergence for the learning process. In CFD, particularly, the interaction between the agent and the environment is expensive due to the fact that solving the Navier-Stocks, convection-diffusion equations, and other governing equations can require extensive processing power and memory. Generally, CFD simulations are expensive and mostly rely on CPU and memory to save cell information rather than GPU. Therefore, receiving proper reward based on the understanding of the environment can speed up the learning. The value of the reward can be multiplied by a constant number based on the physics of the design domain. In embodiments of the present disclosure, the reward can be multiplied by a small number in order to achieve convergence since the pressure drop value is small compared to heat transfer.

At block 310, as part of the reinforcement learning, the geometry module 126 determines if the geometry outputted by the machine learning model meets or exceeds one or more predetermined conditions. In an example, the predetermined conditions can be a specified pressure drop (e.g., 30%) or heat transfer effectiveness (e.g., 90% effectiveness). The predetermined conditions can be received from the user via the input interface 106 or received from any other suitable source. In other cases, other end conditions can be used; for example, a specified number of learning iterations.

At block 314, if the outputted geometry does not meet the predetermined conditions, an action taken by the reinforcement learning agent can be changing the position of the control point represented in Equation (1); i.e., changing the parameters of the geometry, and the parameterization module 124 can repeat a further iteration of the parametrization using these updated control points. The PPO assumes a large trajectory is obtained from the CFD environment through sub-iterations. One epoch is one forward pass and one backward pass of all training data and the PPO does several epochs over training batch during training. An example of the steps of execution performed by the geometry module 126 can be found in Algorithm 1.

---

Algorithm 1

---

Input: Initial control points, initial policy parameters $\theta_0$,
For K = 0, 1, . . . , episode
   Solve Eq. 3 and Eq. 5 using weak form of the equations (given in appendix) by running policy $\pi_k = \pi(\theta_k)$
   Collect a set of trajectories $\mathcal{D}_k = \tau_i$
   Compute reward using Equation (15)
   Update the policy by maximizing the PPO-Clip Objective with Adam optimizer:

$$\theta_{k+1} = \operatorname{argmax}_\theta \frac{1}{|\mathcal{D}_k|T} \sum_{\tau \in \mathcal{D}_k} \sum_{t=0}^{T} L(s_t, a_t, \theta_k, \theta)$$

Update the control points based on the new policy
End for

---

In an example of the deep learning embodiment, DAAN design can include one input layer and three consecutive hidden layer of size 256 each, and one output layer. The classic rectified linear unit (ReLU) function can be used as an activation function applied to hidden layers. The reward function, presented in the Equation (15), can guide the network towards the pressure drop reduction and heat transfer enhancement.

At block 312, if the outputted geometry meets the predetermined conditions, the output module 128 outputs the heat exchanger geometry (such as the control points) to the output interface 108, the database 116, and/or the network interface 110.

In some cases, a parallel environment can be used, for example, running FEM numerical solution in different CPU cores. FIG. 15 shows an example of this workflow configuration. The same random seed can be used for all parallel environments so that shape deformations stay close. In other words, a single agent can learn new policy from a batch of data acquired from parallel CFD computation (i.e. heat transfer and pressure drop). In an example, a batch size of 50 sample processes can be used in this workflow.

Figure 16:
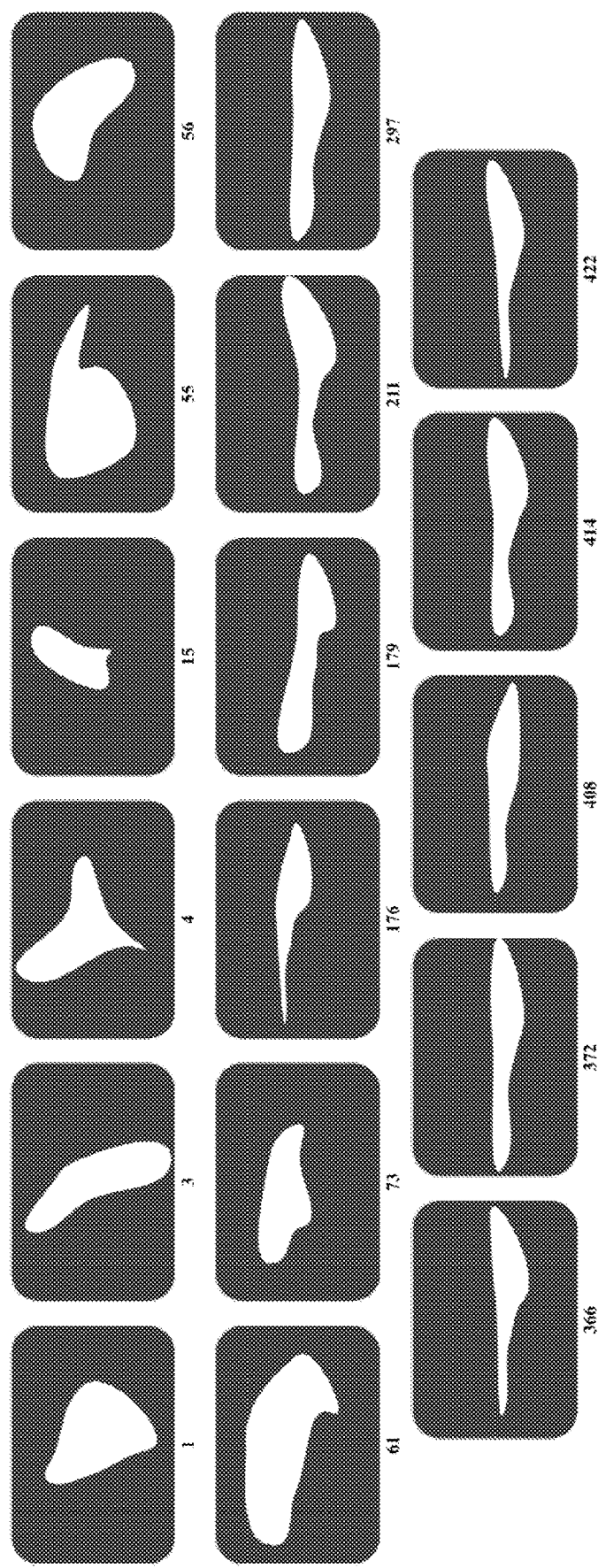
FIG. 16 illustrates an example of shape evolution over 500 episodes of training.
Figure 17:
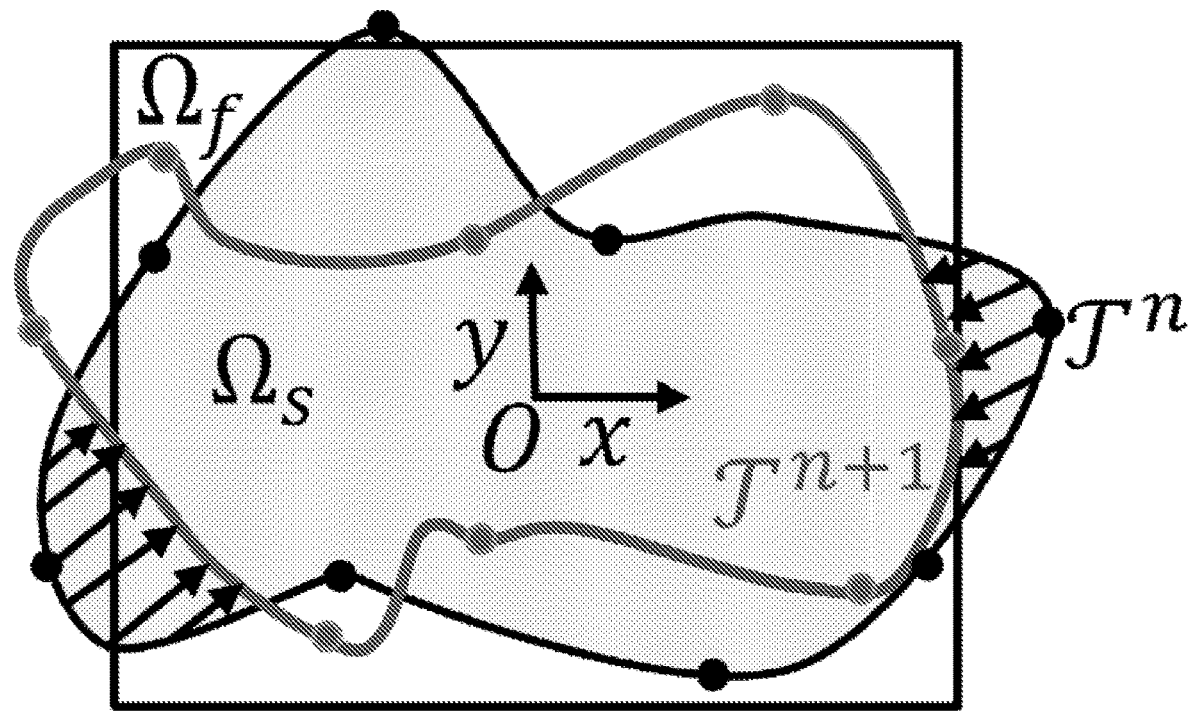
FIG. 17 illustrates an example of geometric control applied to a design domain.

In an example experiment, starting from a reference rectangle fin shape, which is frequently used in HVAC devices, the agent is able to increase heat transfer and reduce pressure drop through a proper trajectory. Shape evolution over 500 episodes of training for 15 DOF at Re=100, Pr=0.05 is shown in FIG. 16. At the beginning of the training, the agent explores wider range of the design space beyond the domain specified in FIGS. 4A and 4B, with the expectation of receiving reward by increasing heat transfer area. However, proper learning is obtained by the agent since reward penalization is considered based on the distance of the control pints from the specified design space according to FIG. 17. FIG. 17 shows geometric control applied to the design domain. It can be inferred from the shape evolution over the training episodes that the agent is on the pass to increase the heat transfer surface while reducing the frontal area that causes pressure drop.

Figure 43:
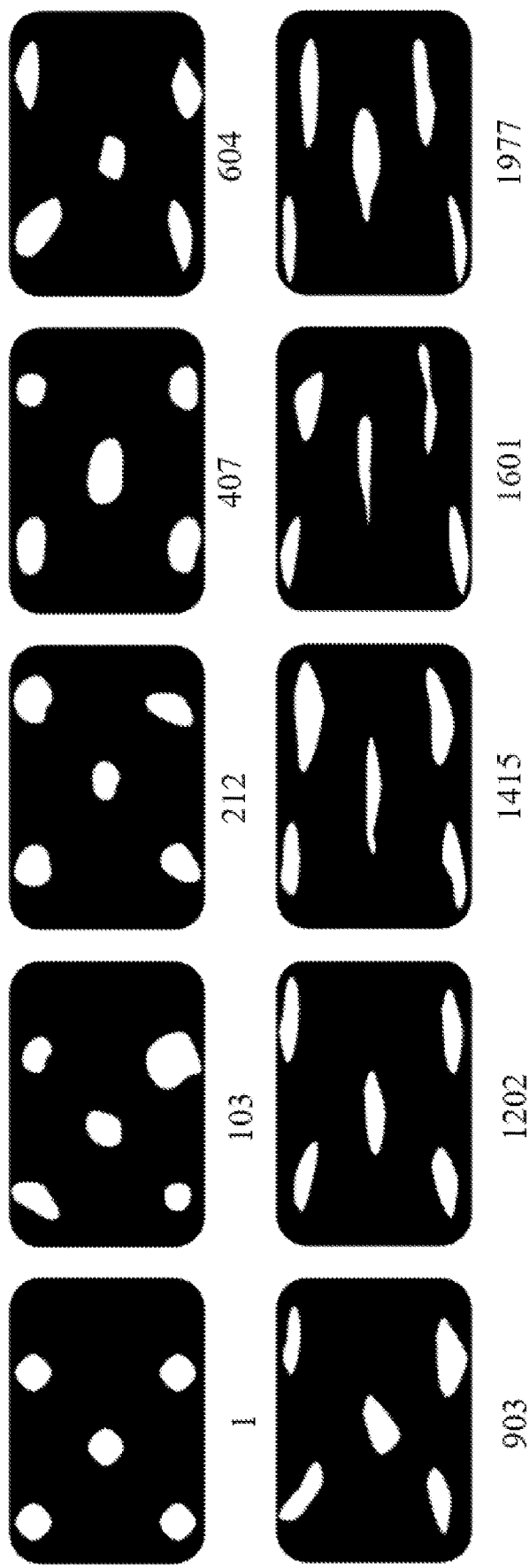
FIG. 43 illustrates an example of shape evolution during a learning process in a multi-agent framework over 1907 episodes of training.

FIG. 43 shows an example of shape evolution of multiple shapes during the learning process of the MARL framework; at Re=10, and Pr=0.7. It can be seen starting from a reference geometry, agents and the policy are used to optimize the shapes. However, agents may fail to establish symmetry in geometry, while the physics of the problem is symmetric since each agent acts independently; and accordingly, in this example, the shapes were selected intentionally with the highest symmetry in the shapes.

Figure 18:
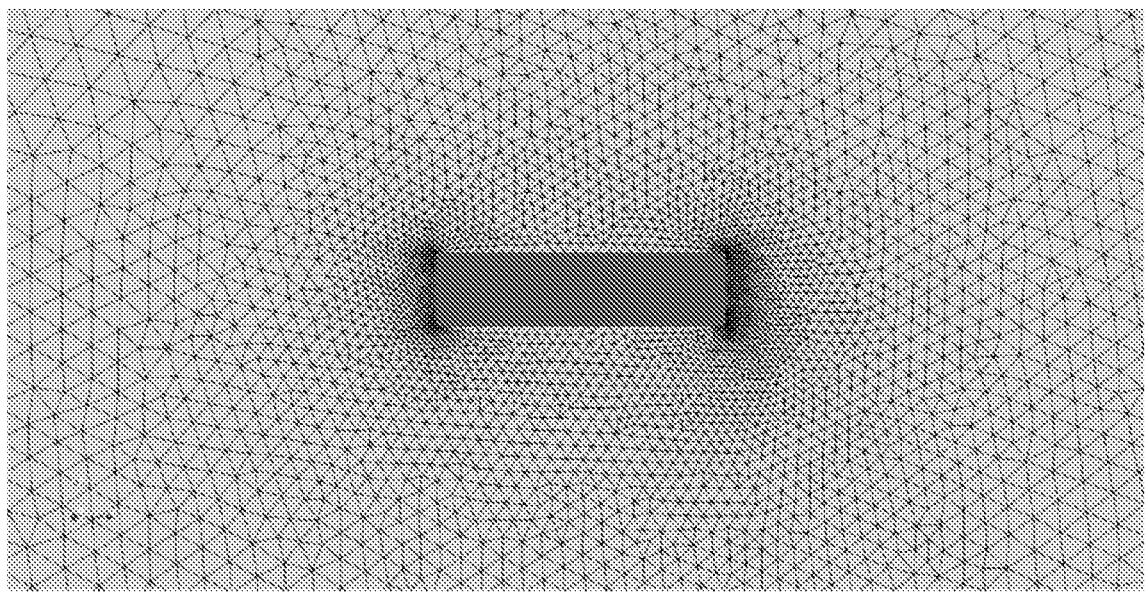
FIG. 18 illustrates an example of meshed domain showing reference geometry.
Figure 19:
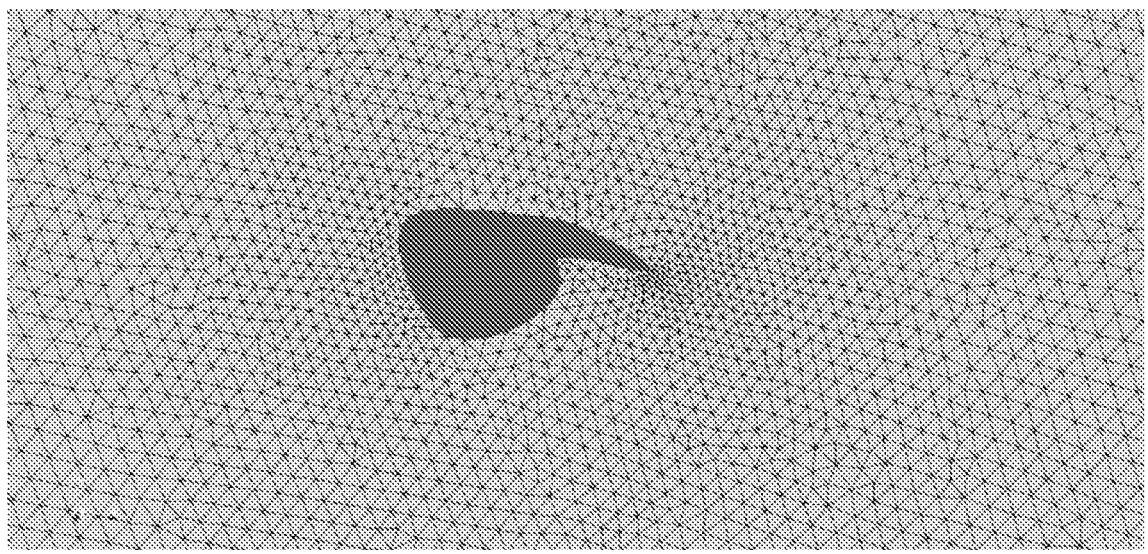
FIG. 19 illustrates an example of body-fitted mesh variation during a learning process.
Figure 20:
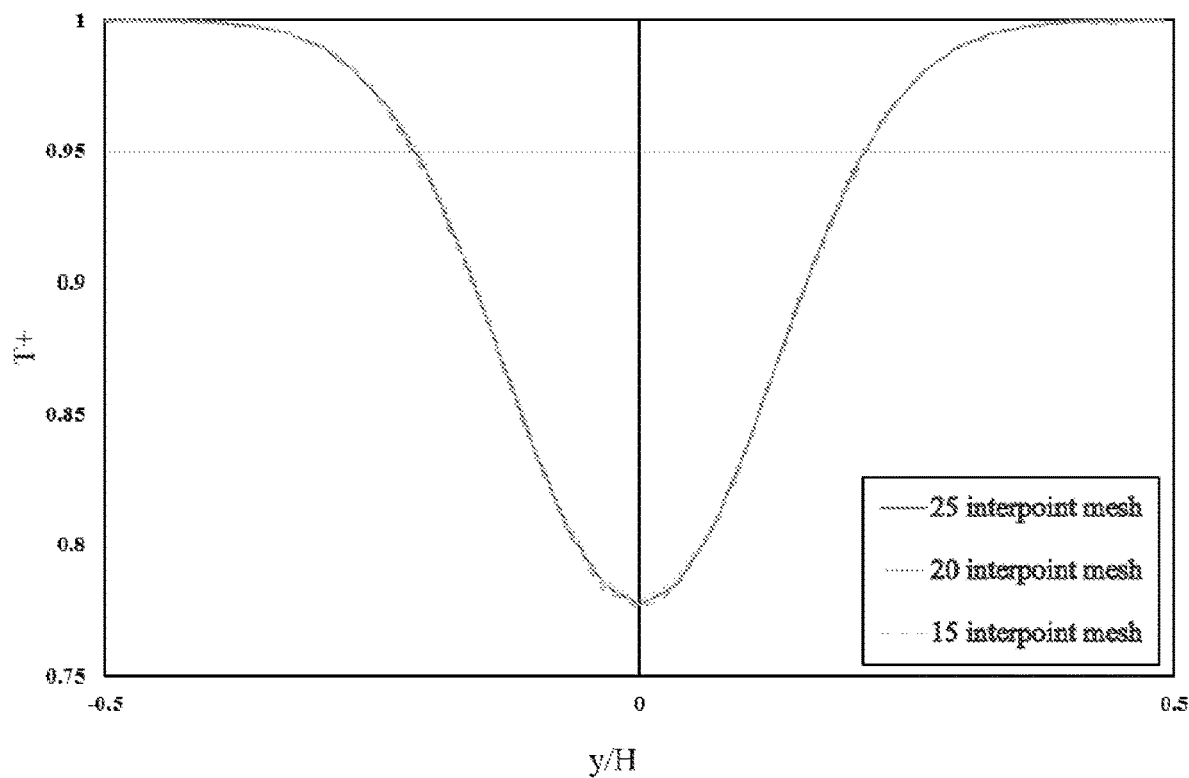
FIG. 20 illustrates an example chart of averaged dimensionless temperature profile at an outlet.

Reference design and an arbitrary shape design are shown in FIGS. 18 and 19, respectively. Body-fitted mesh generation used in the iterative training process is seen in FIG. 19. Since the number of mesh is changing in each episode through adapted body-fitted mesh, mesh independency could not be performed using number of meshes. Instead, the example experiments used a clipping approach between minimum number of meshes between control points and minimum mesh size on the curve constructed between control points. This approach results in number of unstructured grid between 10000 to 18000 based on the number of control points chosen for optimization and constructed geometry in each iteration. FIG. 20 shows the dimensionless temperature $T^+$ at the outflow using different number of meshes for the reference shape with five control points. This figure shows that with minimum number of 15 meshes between control points, consistent results can be obtained.

Figure 28:
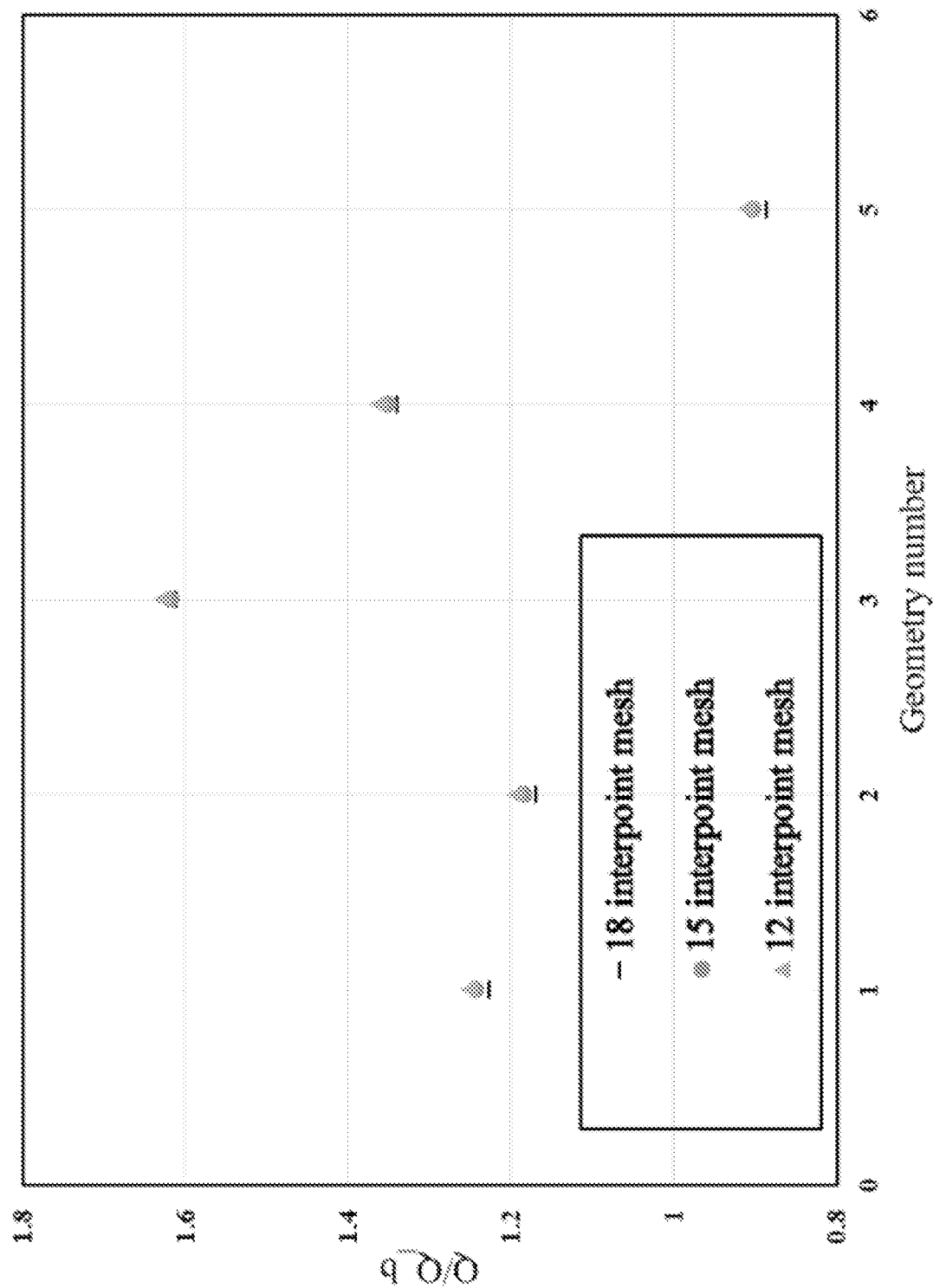
FIG. 28 illustrates a chart of an example of mesh heuristics based on minimum cell numbers between points.

In cases of multiple shapes, meshes can be constructed between shapes with small cells on their boundaries; which result in high number of meshes. Implementation in this way can result in a number of grids between, for example, 22,000 and 30,000; which depends on the size and shape of the constructed geometry. FIG. 28 illustrates an example of the mesh heuristics based on the minimum cell numbers between the points. It can be seen that after considering minimum of 12 cells between the points, amounts of heat transfer remain consistent.

Figure 29:
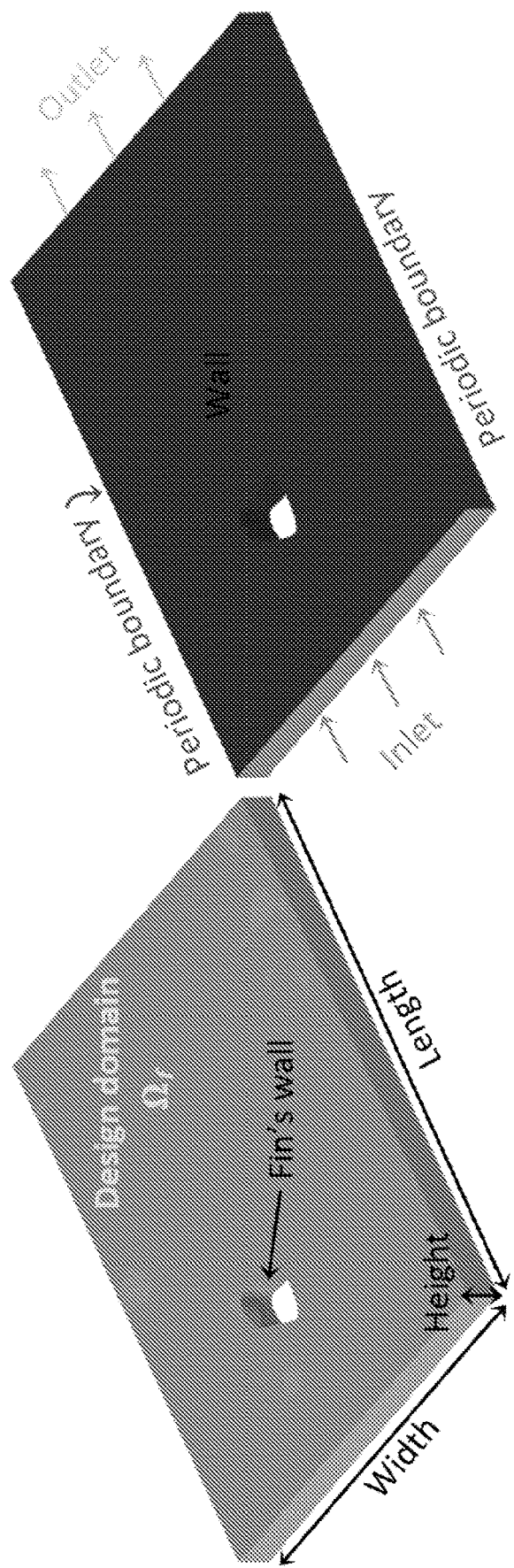
FIG. 29 illustrates an example three-dimensional (3D) design space showing geometrical parameters (left-side) and boundary conditions (right-side)

The example experiments validated the accuracy of numerical results that were conducted in FEniCS and compared them with ANSYS Fluent software using the modeled geometry shown in FIG. 29. The model was also meshed. Note that incompressible air with constant properties has been considered as working fluid. Since the Reynolds number is less than 200, the laminar flow regime was considered for conducting numerical simulations. The same boundary condition shown in FIG. 1 and TABLE 4 was utilized for two simulations.

TABLE 4

| Parameters | Values |
| --- | --- |
| Length (cm) | 8 |
| Width (cm) | 6 |
| Height (cm) | 0.5 |
| Avg. inlet velocity (m/s) | 0.2 |

TABLE 4-continued

| Parameters | Values |
| --- | --- |
| Inlet Temperature (K) | 300 |
| Wall temperature (K) | 450 |
| Outlet pressure (Pa) | 0 |

Figure 30:
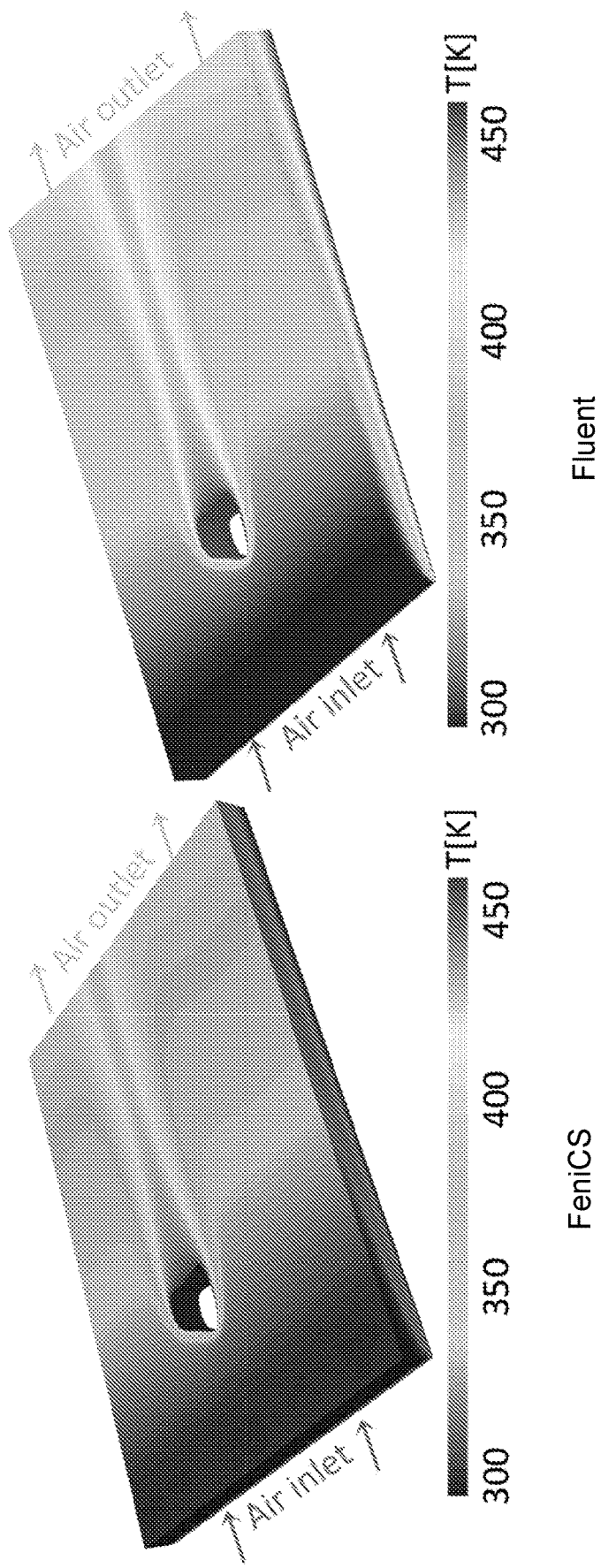
FIG. 30 illustrates an example cross-sectional view of temperature contours for FeniCS (left-side) and Fluent (right-side)

TABLE 5 compares FEniCS and Fluent numerical results. The results indicate that the two softwares provide almost the same pressure drop and heat transfer values with a difference of less than 1%. Additionally, FIG. 30 illustrates the cross-sectional view of three-dimensional temperature contours for FEniCS and Fluent software.

TABLE 5

| | Pressure drop (Pa) | Heat transfer (W) |
| --- | --- | --- |
| FEniCS | 0.0210368 | 8.46819 |
| Fluent | 0.0212167 | 8.53163 |
| Difference (%) | 0.85 | 0.74 |

Figure 31:
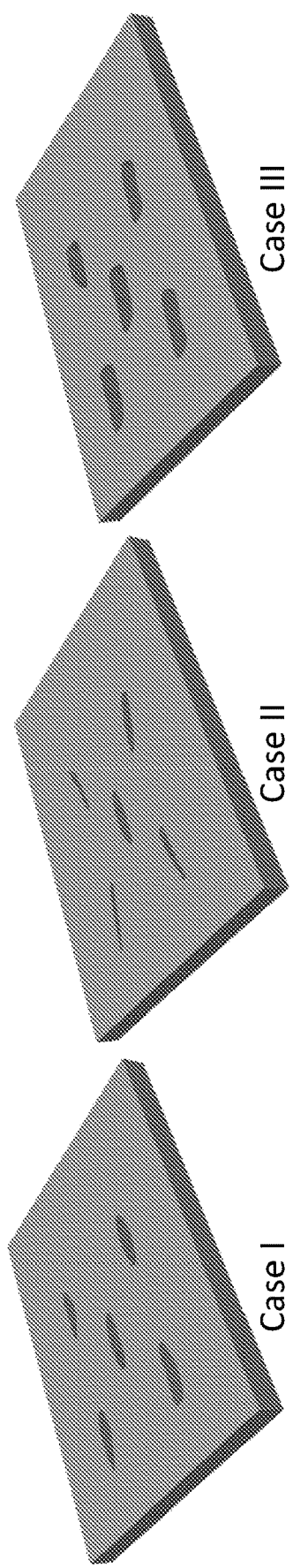
FIG. 31 illustrates thermo-hydraulic comparison for three different example cases with various fin shapes.

In practical applications, cooling devices can utilize multi-fin to increase cooling performance. Therefore, after the validation of the developed FEniCS code with Fluent software, the code can be extended to multi-fin cases. The thermo-hydraulic performance of three multi-fin cases with different fin shapes was compared. FIG. 31 shows three different considered cases in which each case uses five fins. The effect of important parameters in the accuracy of numerical simulation (including final time, time-step, and mesh size) was conducted for the considered three multi-fin cases.

Depending on the air velocity and geometrical dimensions, the simulation reached a steady condition at the outlet after a specific time. After reaching a steady condition, continuing simulation only increased run-time with no changes in the results. Therefore, it was essential to find a proper final time in order to decrease simulation run-time with maintaining high accuracy. Therefore, three simulations for different cases have been conducted with a final time of 1.5 s.

Figure 32:
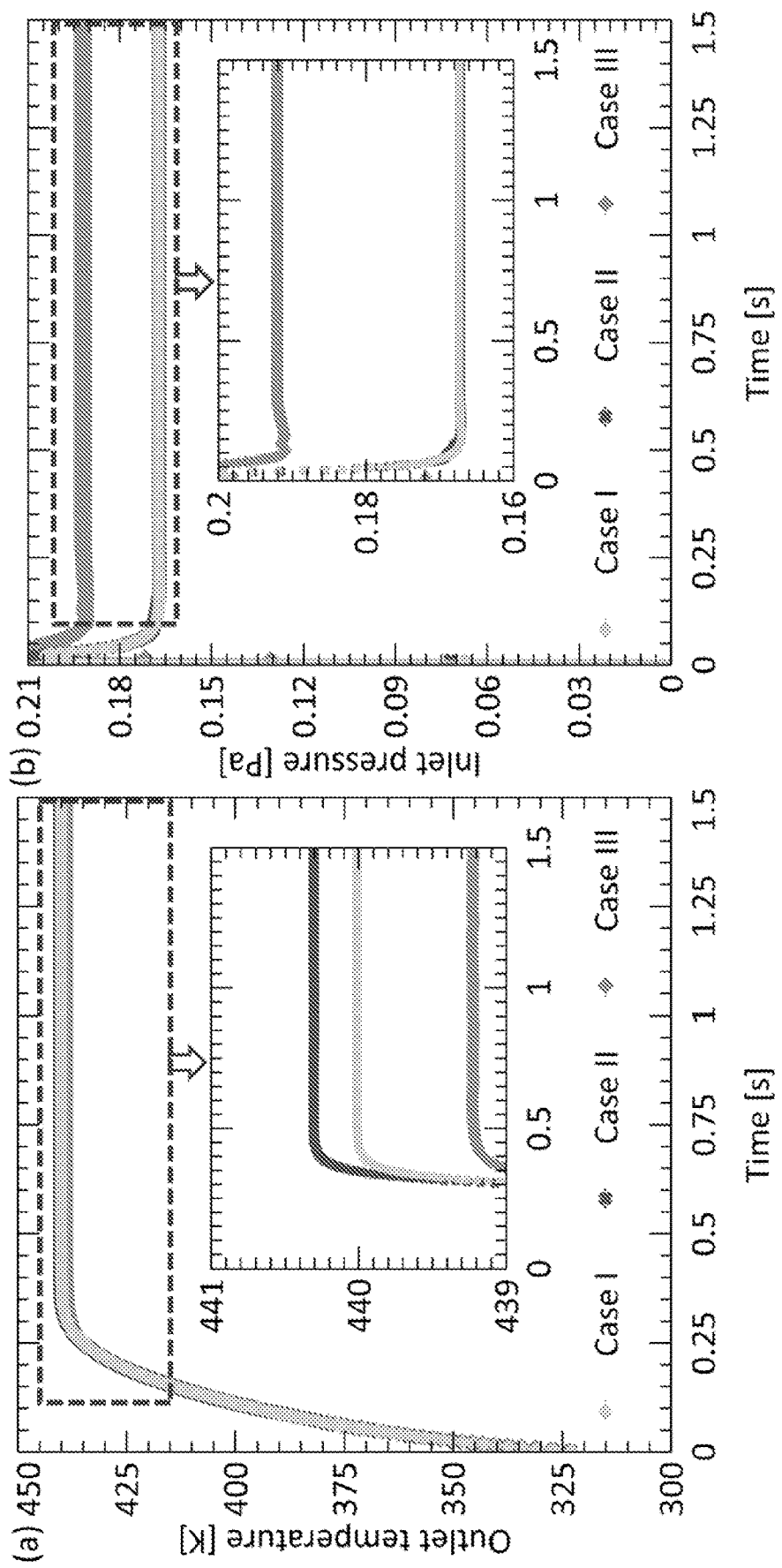
FIG. 32 illustrates an example of outlet temperature and inlet pressure variation as a function of time for the three considered cases of FIG. 31.

FIG. 32 illustrates outlet temperature and inlet pressure variation as a function of time for the three considered cases. As shown, the temperature outlet for different cases reached a steady condition after 0.4 s. Also, the numerical results showed inlet pressure reached a constant value after 0.25 s. Thus, the conducted simulations illustrate various fin configurations reach a steady condition after 0.4 s. Therefore, 0.5 s is considered the optimum final time which minimizes the simulation run-time with no accuracy sacrifice. The average value of the last 10% of computation (i.e., from 0.45 to 0.5 s) is utilized for heat transfer and pressure drop determinations.

In an unsteady simulation, time-step plays a major role in simulation run-time and accuracy of the results. Small time-steps lead to higher computation costs while large time-steps provide inaccurate results. In the example experiments, Courant-Friedrichs-Lewy condition (i.e., CFL) was utilized to determine the proper time-step depending on the mesh size. CFL is a dimensionless value representing the time that a fluid particle stays in one cell of the mesh; in which:

$$CFL = \vec{u} \cdot \frac{\Delta t}{h}$$

where $\Delta t$ and $h$ are time-step and minimum cell size.

Depending on the fluid velocity and mesh element size, fluid particles remained in a cell unit for two consecutive time-step if the CFL number was small. On the other hand, for a large CFL number, a fluid particle passes from several mesh elements in two consecutive time-steps, resulting in low accuracy. Thus, a wide range of CFL numbers (i.e., from 0.5 to 1.5) was considered to explore the effect of the Courant number on the accuracy of the three-dimensional simulation results.

Figure 33:
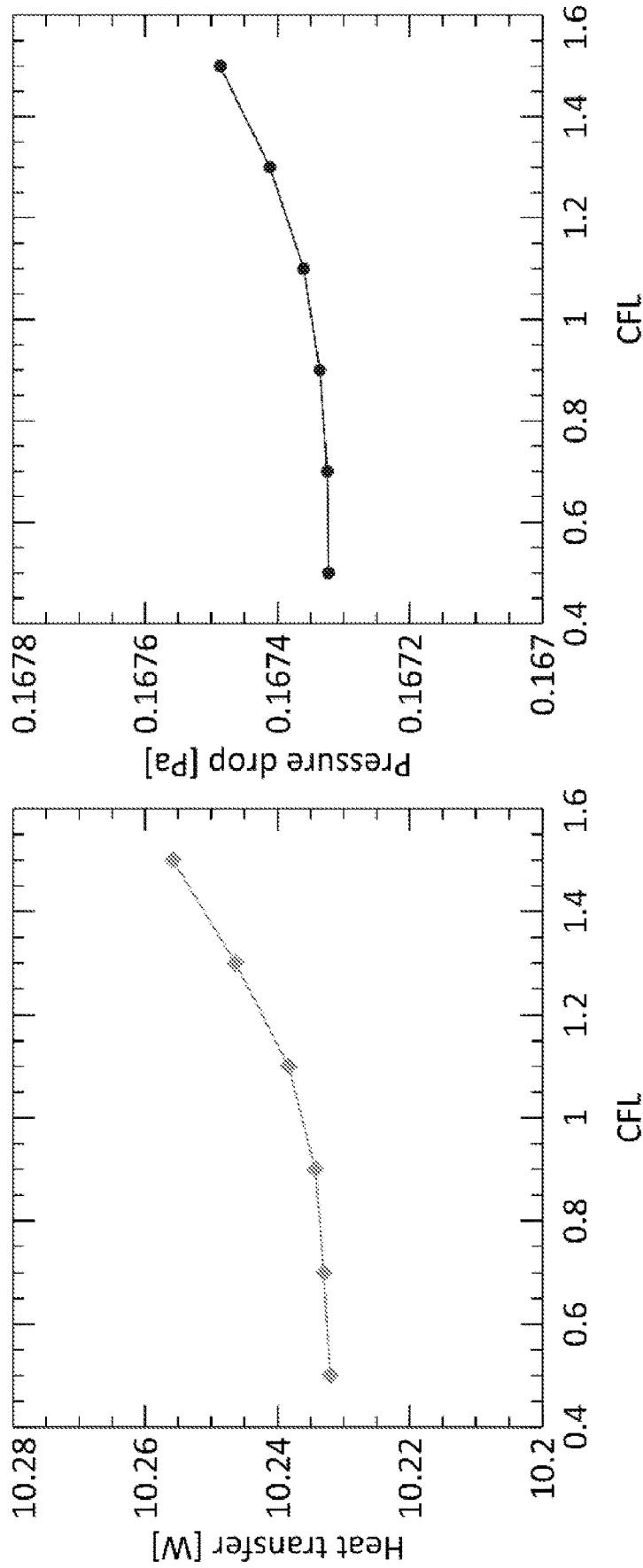
FIG. 33 illustrates an example of the effect of CFL number on heat transfer and pressure drop for case I in FIG. 31.

FIG. 33 shows the effect of CFL number on heat transfer and pressure drop of case I. As shown, heat transfer and pressure drop values are approaching a constant value by decreasing the Courant number. The conducted simulations illustrated a Courant number of 0.5 can provide high-accuracy results with reasonable computation cost.

Figure 34:
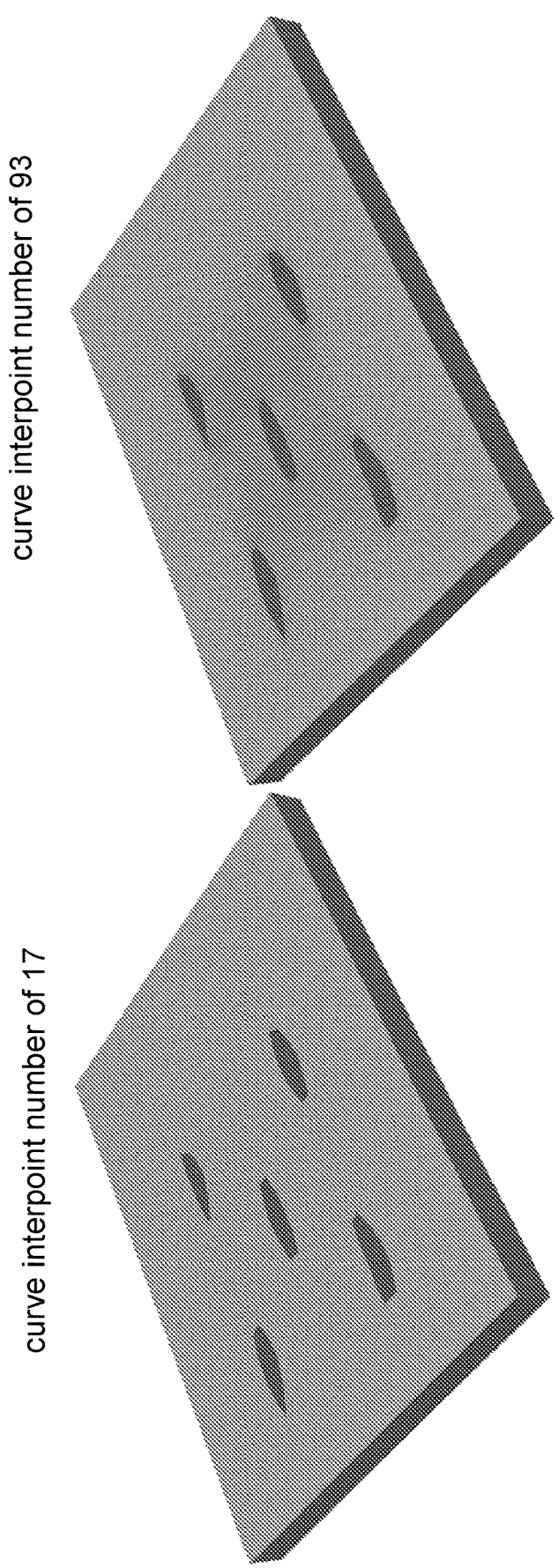
FIG. 34 illustrates an example of a fin's shape for case I in FIG. 31 for two different curve interpoint numbers.

In creating a fin shape utilizing the Bézier curve, the number of interpoints can be determined. FIG. 34 illustrates the fin's shape of case I for two different curve interpoint numbers. In the left-side fin shape, each fin's curve is created utilizing 17 interpoints, leading to a course fin shape with sharp corners. Increasing the number of interpoints provides a smoother curve shape. In the right-side fin shape, the generated Bézier curve provides a smoother fin shape if the number of interpoints was increased to 93. It is worth mentioning that the overall shape of the fins depends on the number of interpoints. However, this sensitivity is reduced by increasing the number of interpoints.

Figure 35:
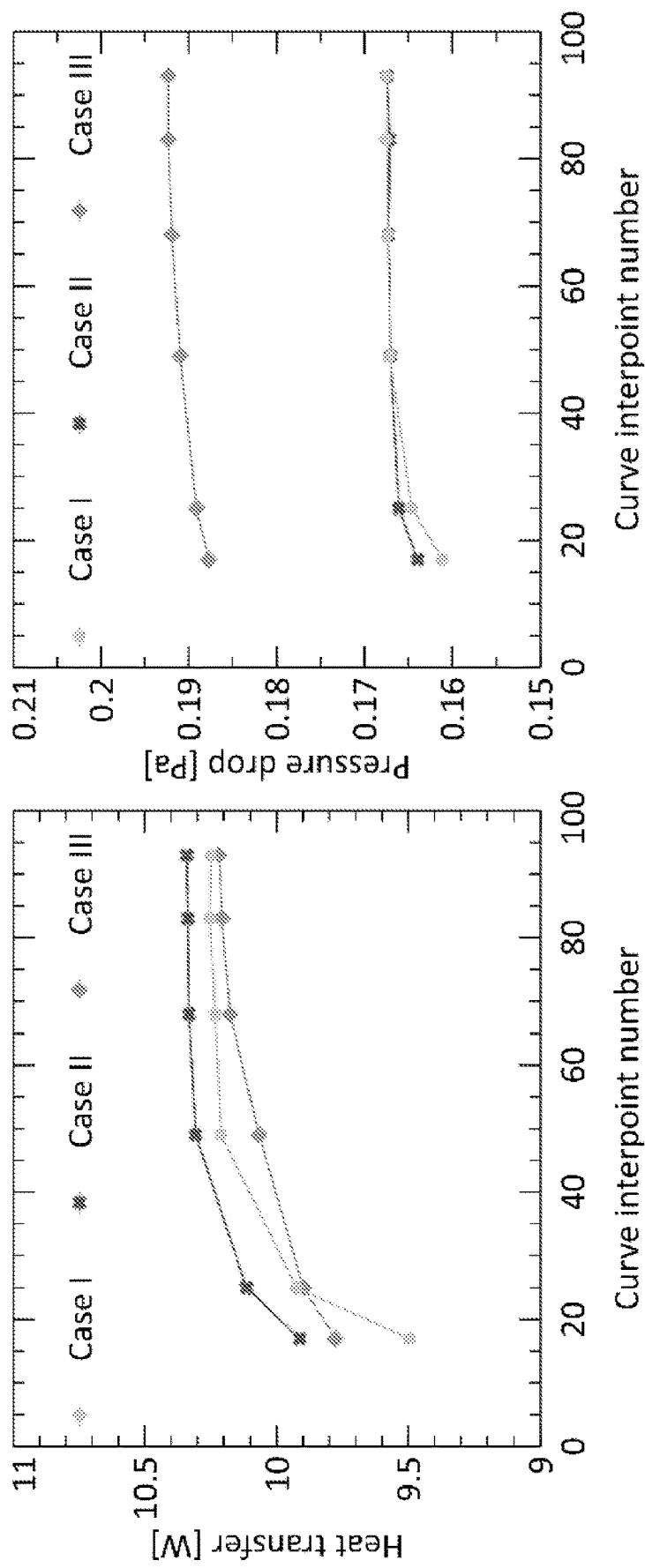
FIG. 35 illustrates an example of the effect of curve interpoint number on heat transfer (left-side) and pressure drop (right-side) for the three considered cases in FIG. 31.

The effect of curve interpoint number on the thermo-hydraulic performance of three considered cases is shown in FIG. 35. By increasing the number of interpoints, heat transfer and pressure drop for all cases reach a constant value. The conducted CFD simulations show that increasing the number of interpoints higher than 68 leads to constant heat transfer and pressure drop values.

Figure 36:
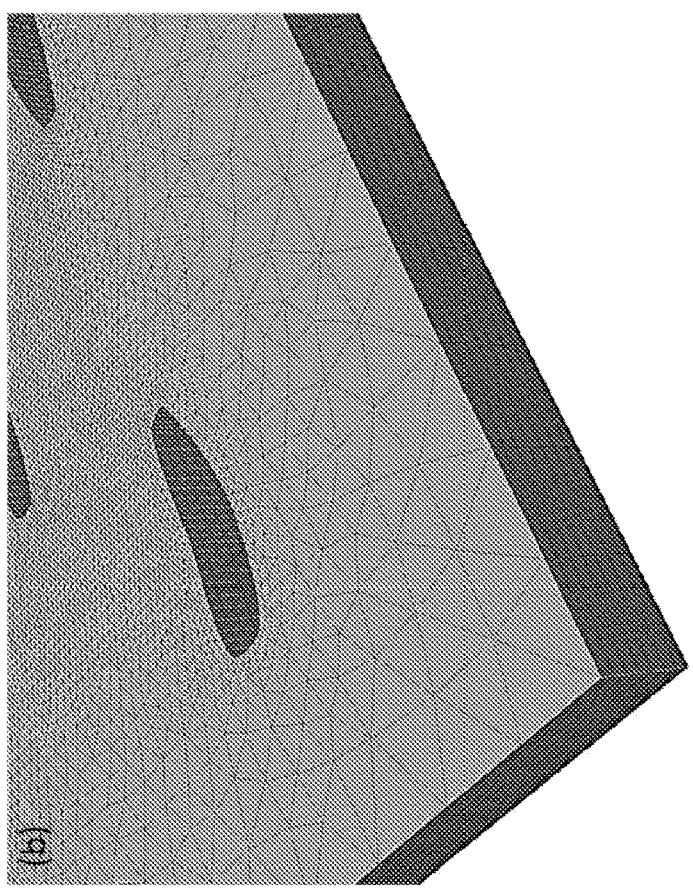
FIG. 36 illustrates an example of the number of mesh layers in the z-direction being 2 layers (left-side) and 7 layers (right-side)
Figure 36:
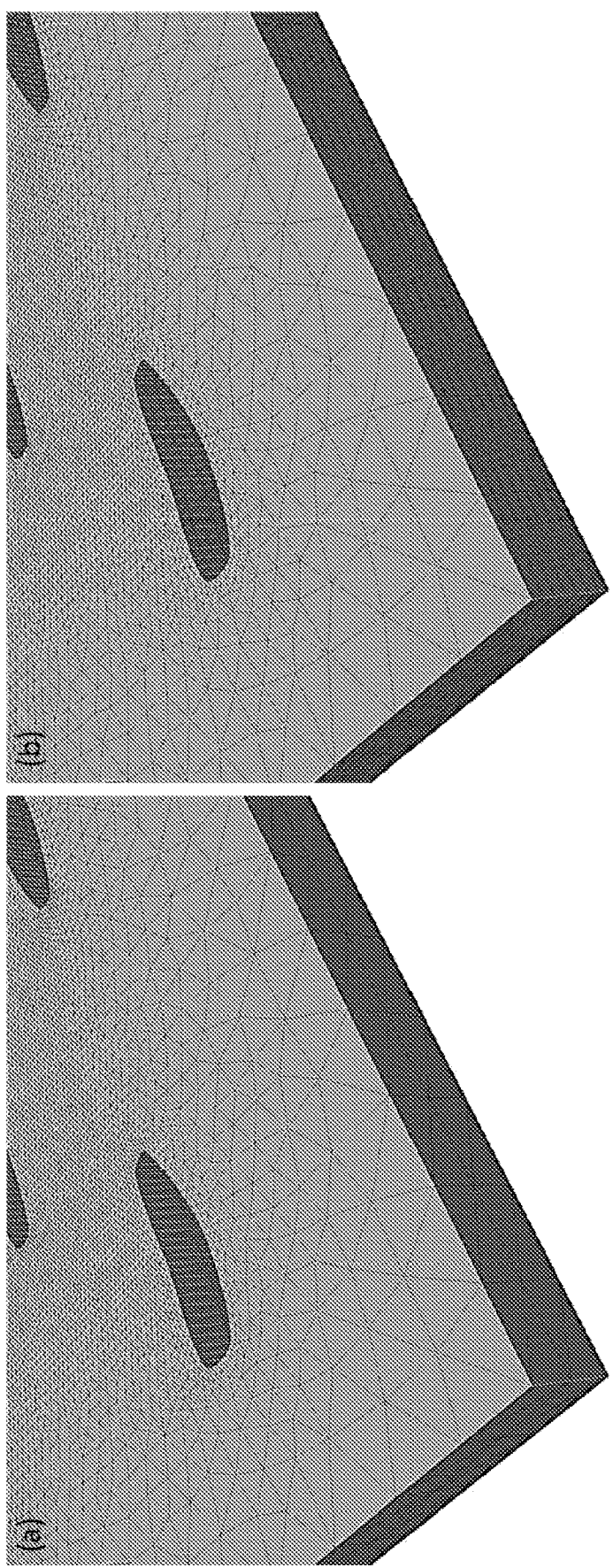

The number of mesh layers in the z-direction is another parameter for simulation run-time and accuracy. FIG. 36 illustrates case I for two different mesh layers of 2 and 7. As the height of the channel is 0.5 mm, the height of each mesh layer is 0.25 and 0.07 mm for 2 and 7 mesh layers, respectively. The high number of mesh layers leads to higher computation costs and more accurate results.

Figure 37:
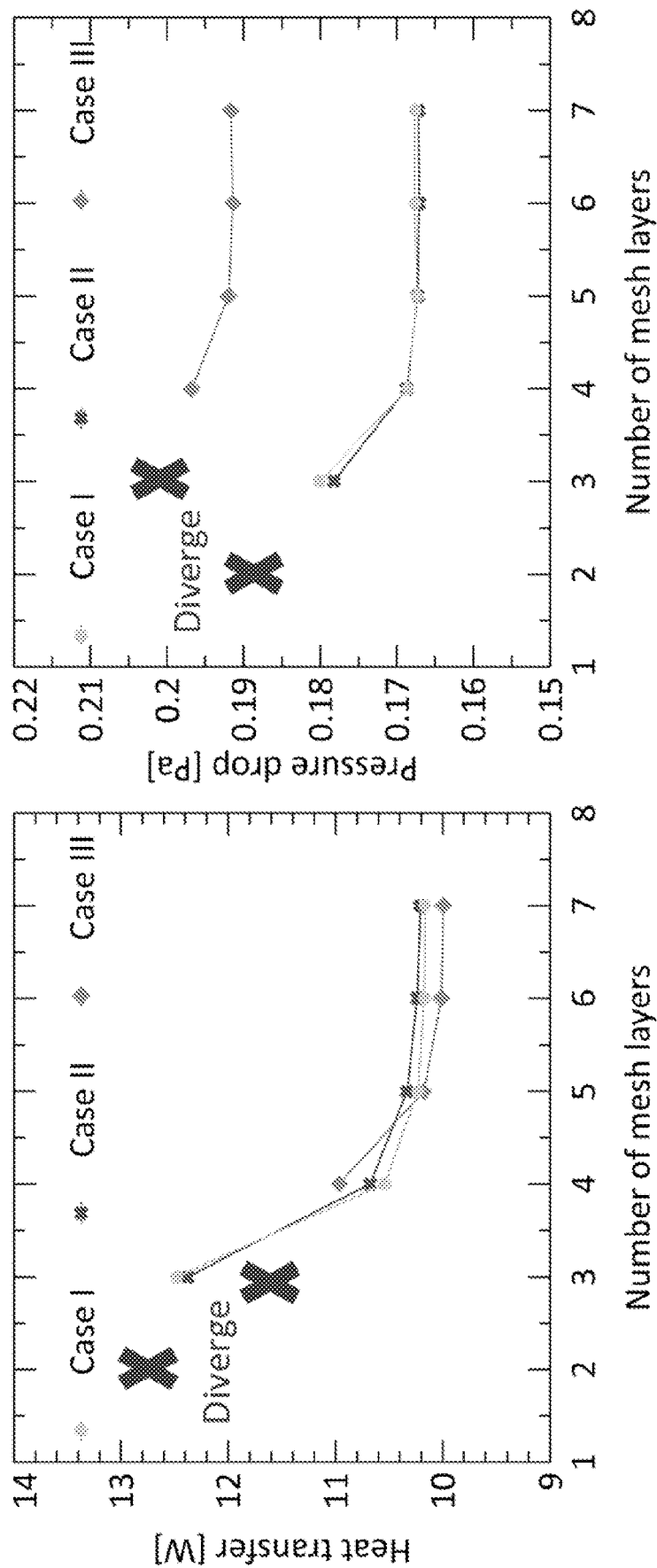
FIG. 37 illustrates an example of the effect of mesh layers on heat transfer (left-side) and pressure drop (right-side) for the three considered cases in FIG. 31.

FIG. 37 illustrates the effect of mesh layers on heat transfer and pressure drop of the three considered cases. As shown, the numerical simulations fail to converge for a low number of mesh layers. Increasing the number of mesh layers can solve the divergence problem; however, the number of mesh layers should be about 6 to ensure heat transfer and pressure drop reach a constant value. The results show that further increasing the number of mesh layers generally does not have an impact on heat transfer and pressure drop while it increases simulation run-time.

Figure 38:
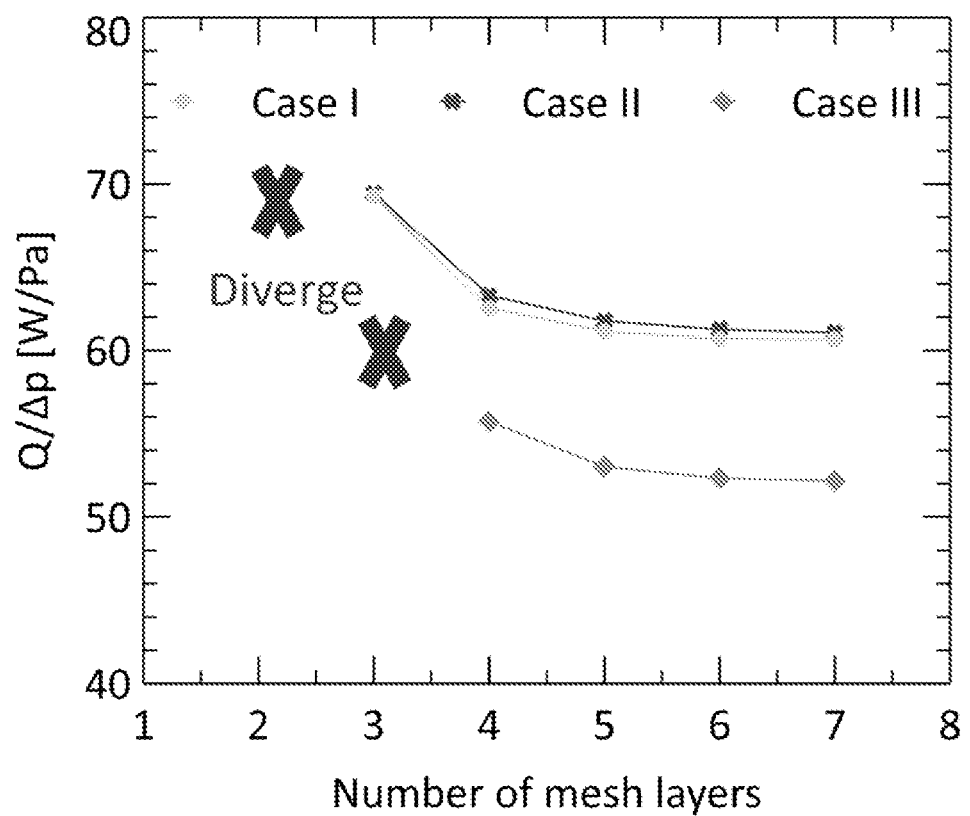
FIG. 38 illustrates an example of comparing the thermo-hydraulic performance of the three considered cases in FIG. 31.

Additionally, FIG. 38 compares the thermo-hydraulic performance of the three considered cases. The ratio of heat transfer over pressure drop is considered as comparing parameter to evaluate the thermo-hydraulic performance of different cases. Numerical simulations showcase III provides the lowest thermo-hydraulic performance compared with cases I and II. The results indicate that case III offers 52.2 W/Pa while case I and II owing to utilizing more aerodynamic-shape fins provide 60.7 and 61.1 W/Pa (i.e., 16.3 and 17.1% improvement), respectively.

Figure 39:
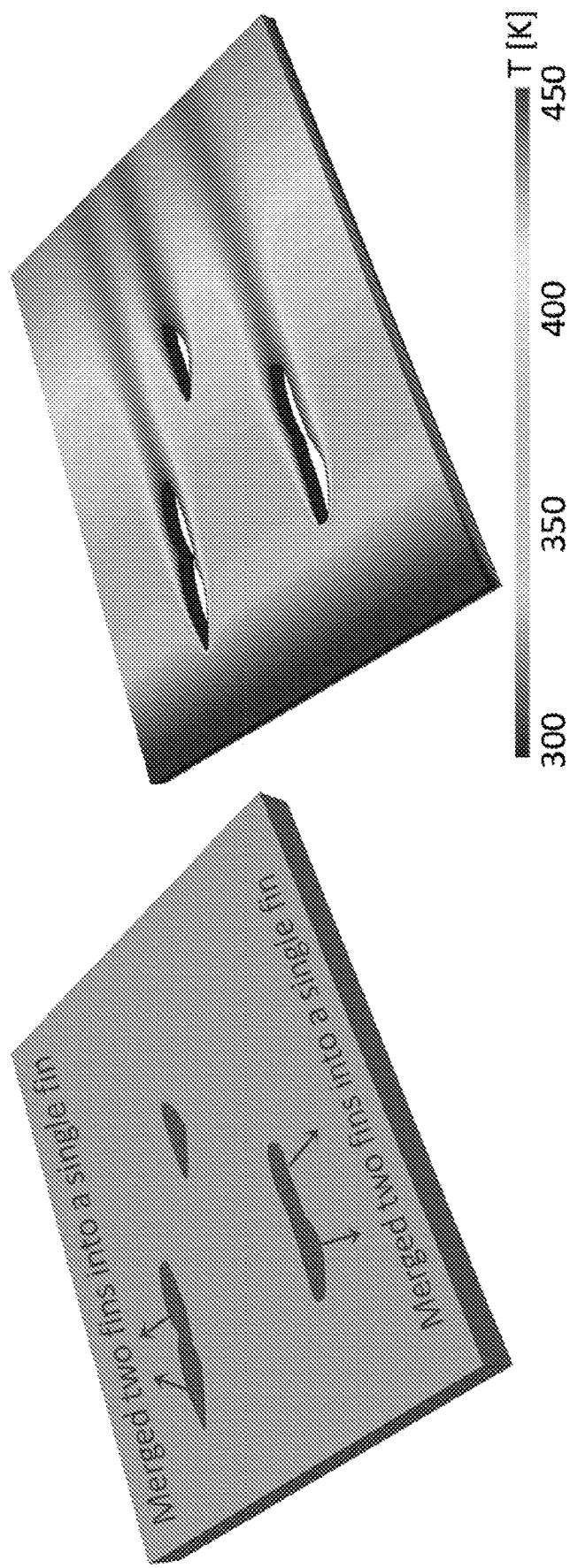
FIG. 39 illustrates an example model (left-side) and example temperature contour (right-side) of a multi-fin configuration in which two fins merge and provide a larger fin.

During optimization, there is a possibility that fins merge into each other to potentially improve the performance of the cooling device. Therefore, several fins have been allowed to merge and produce a larger fin. FIG. 39 illustrates a model (left-side) and temperature contour (right-side) of a multi-fin configuration in which two fins merge and provide a larger fin. In the conducted numerical simulation, the number of curve interpoints and mesh layers are 68 and 6, respectively. The conducted CFD simulation showed the current codes can successfully simulate potential cases in which several fins might merge into each other during optimization.

Figure 21:
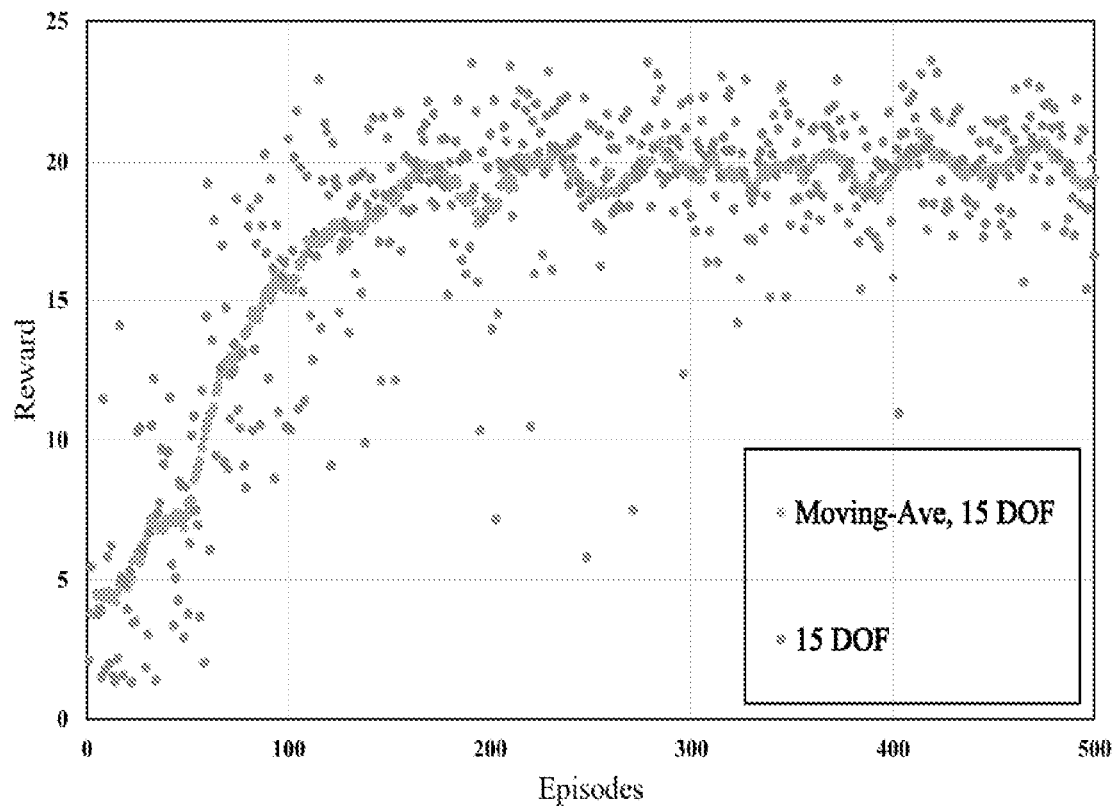
FIG. 21 illustrates an example chart of a learning curve (instant and moving average) for shape with 15 degrees of freedom (DOF)
Figure 22:
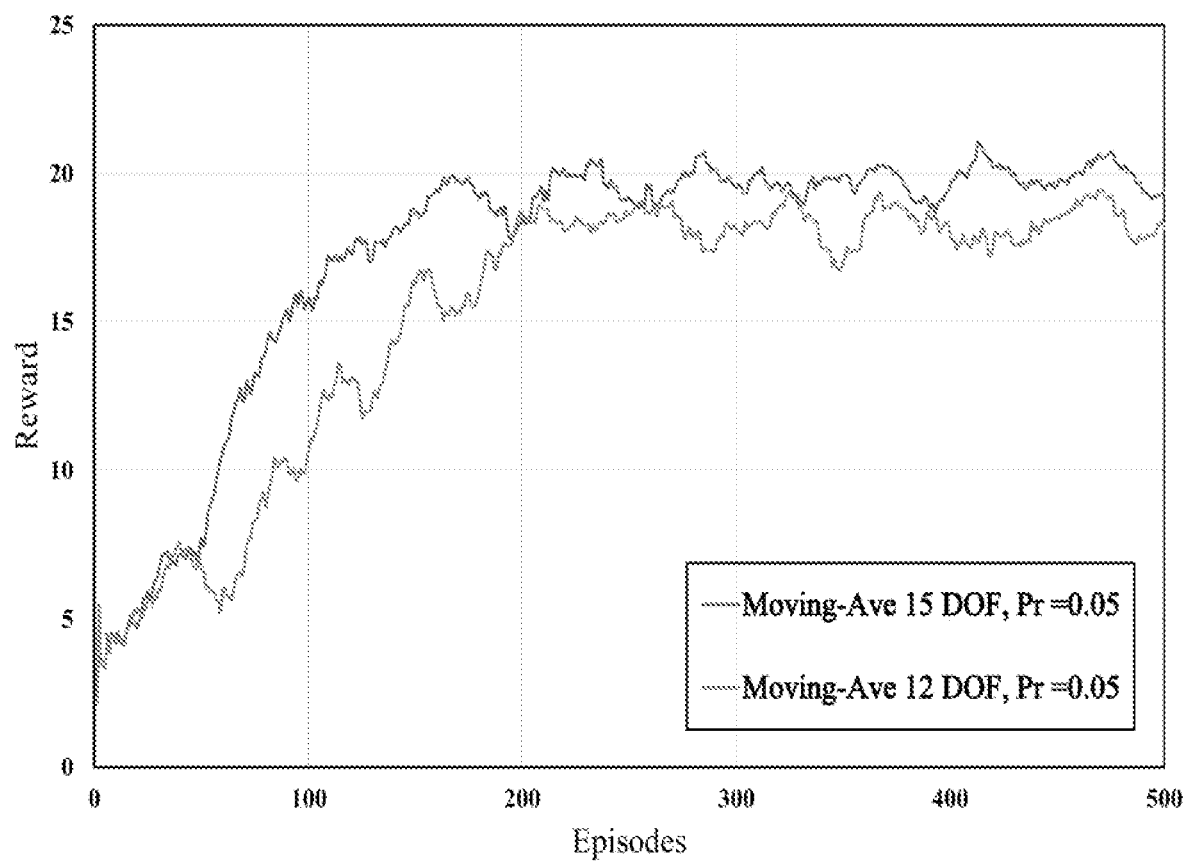
FIG. 22 illustrates an example chart of a learning curve comparison for shapes with 12 and 15 DOF.

FIG. 21 shows rewards for each single iteration along with the moving averaged value of 20 neighboring data points for the case of the shape with 15 degrees of freedom at Reynolds number equal to 100 and Prandtl number equal to 0.05. FIG. 22 shows the moving average reward for different DOF. It can bee seen that providing the setting with higher DOF, increases the reward of the RL algorithm since the agent is able to explore more variation in shape and receive more rewards. Higher reward is equivalent to reduced cost of the pumping power and improved performance which is desired for many HVAC devices. However, higher DOF is accompanied by higher computational cost particularly when extended to 3D space.

Figure 23:
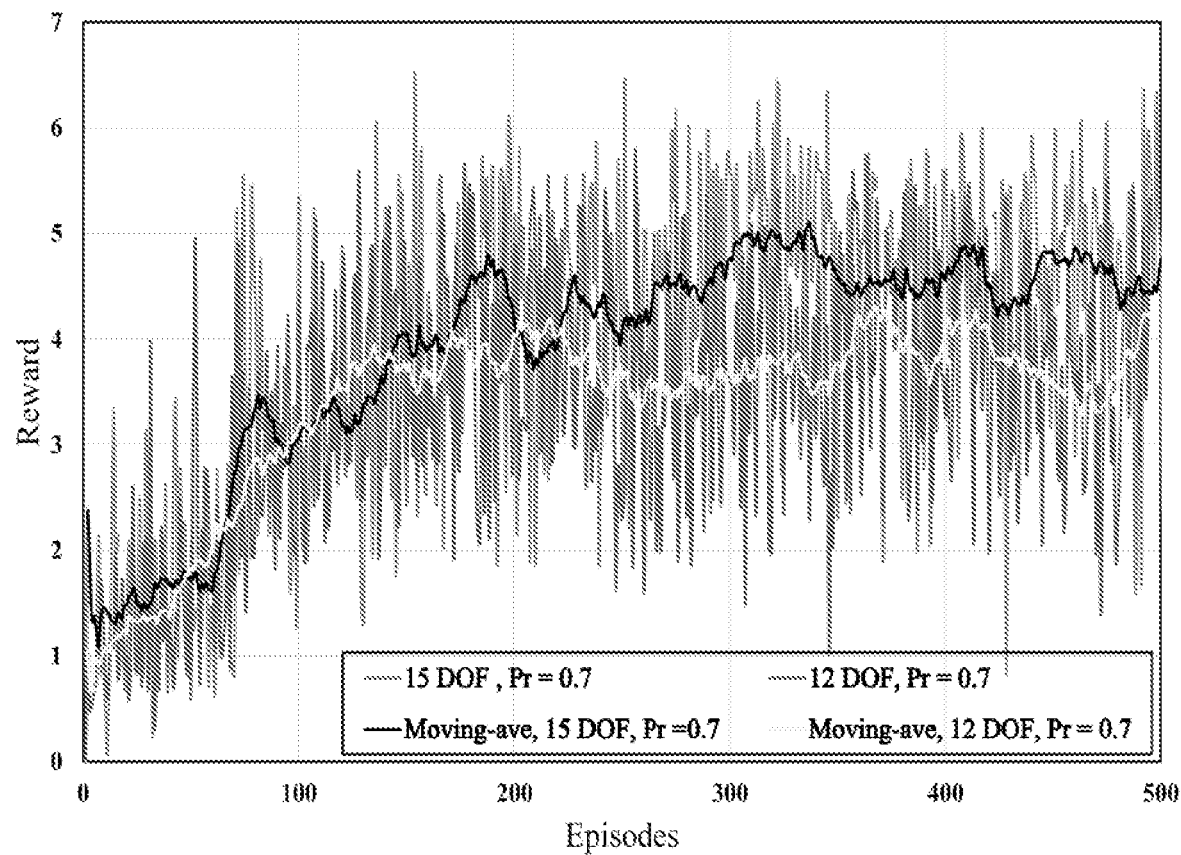
FIG. 23 illustrates an example chart of another learning curve comparison for shapes with 12 and 15 DOF.
Figure 24:
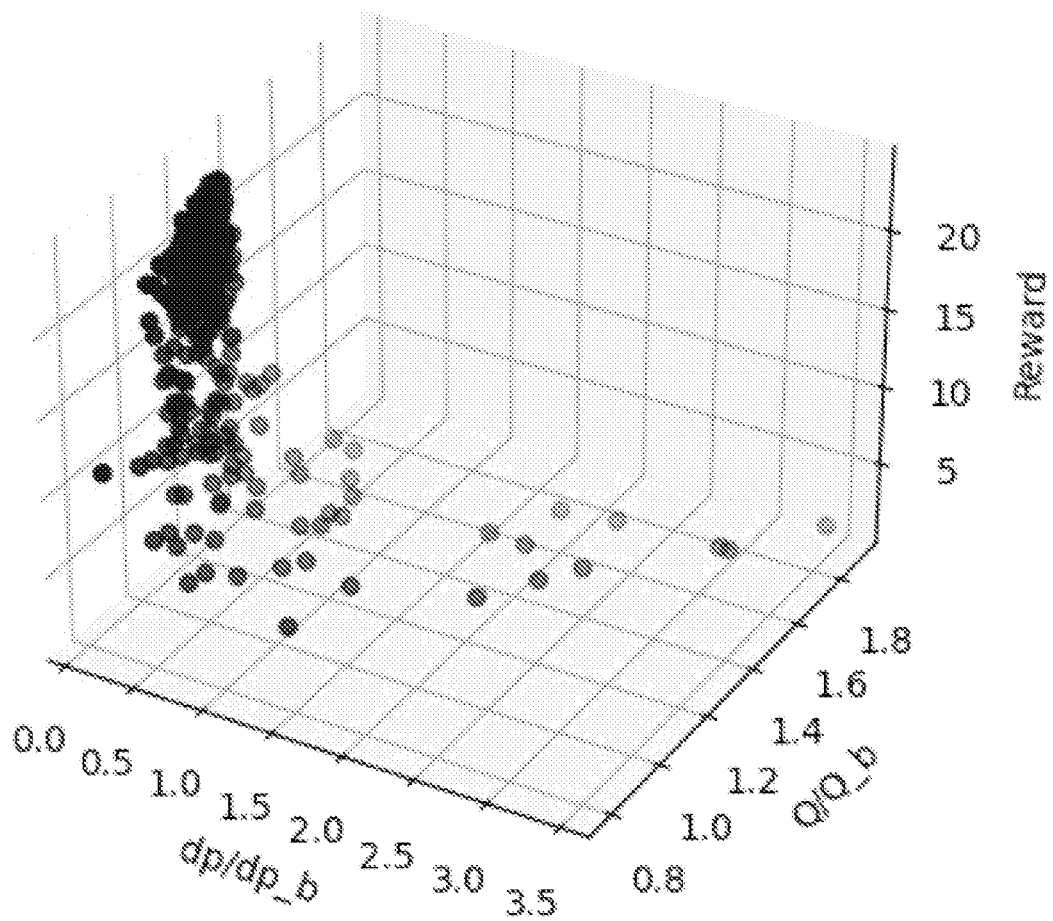
FIG. 24 illustrates an example chart of reward history as a function of pressure drop and heat transfer.

FIG. 23 shows the learning curve at RE=100 and Pr=0.7. It can be seen in FIG. 23 that the reward value is pertinent to the fluid flow properties like Pr and RE number since the reward values are different from FIG. 21. According to Equation (15), the value of the reward is computed by heat transfer and pressure drop that can change by Prandtl number. Topologies reach a performance plateau based on the degree of freedom given to the shapes. FIG. 24 illustrates the reward history along with the pressure drop and heat transfer for RE=100 and Pr=0.05. It can be inferred that the agent receives higher reward by decreasing the pressure drop compared to increasing the heat transfer according to the reward definition. This, however, could change based on the application.

Figure 40:
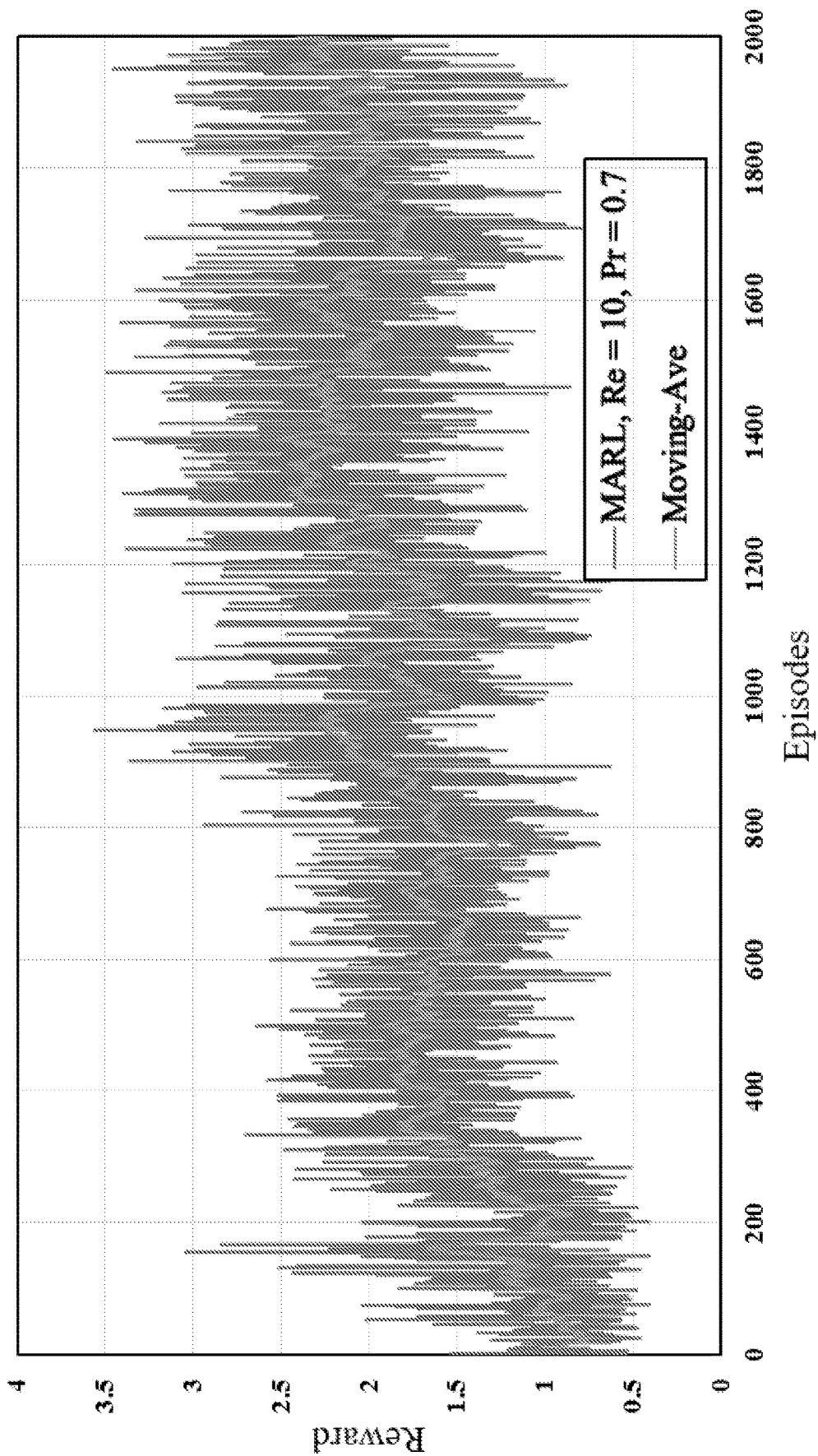
FIG. 40 shows instantaneous and moving averaged reward history during training of a multi-agent reinforcement learning (MARL) framework in example experiments.

FIG. 40 shows instantaneous and moving averaged reward history during training of a multi-agent reinforcement learning (MARL) framework, in the example experiments. Both instantaneous and moving averaged rewards are shown in FIG. 40. As described herein, it was seen that the reward of the single shape with 15 DOF reaches a plateau after less than 300 episodes of training. A MARL framework with five agents has a large action space. However, in the example experiments, after less than 2000 episodes and almost two hours of training, well-performing design with increased performance are generated (parallel environments were used in this study). Therefore, experience seen by the agent is larger than the episode in FIG. 40.

Figure 25:
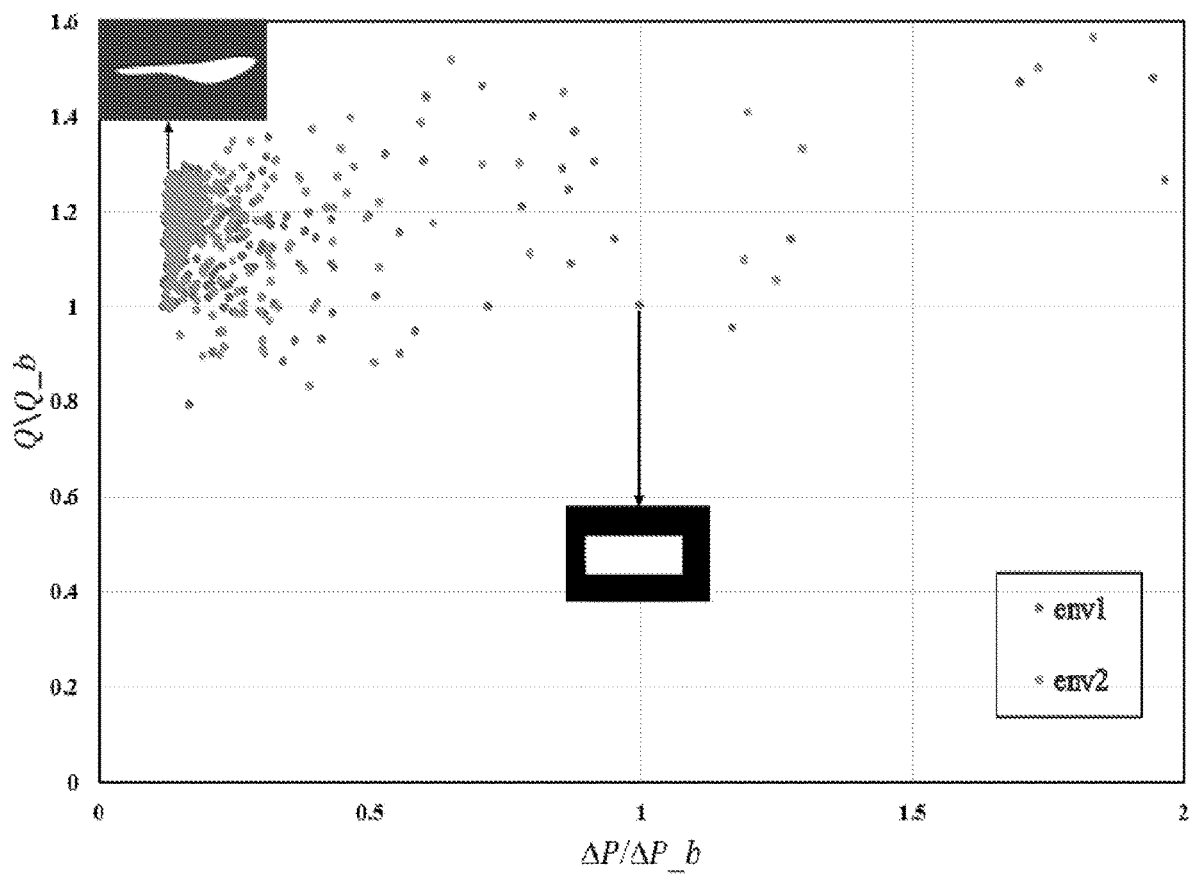
FIG. 25 illustrates an example chart of dimensionless heat transfer and pressure drop with respect to a reference geometry for 15 DOF.
Figure 26A:
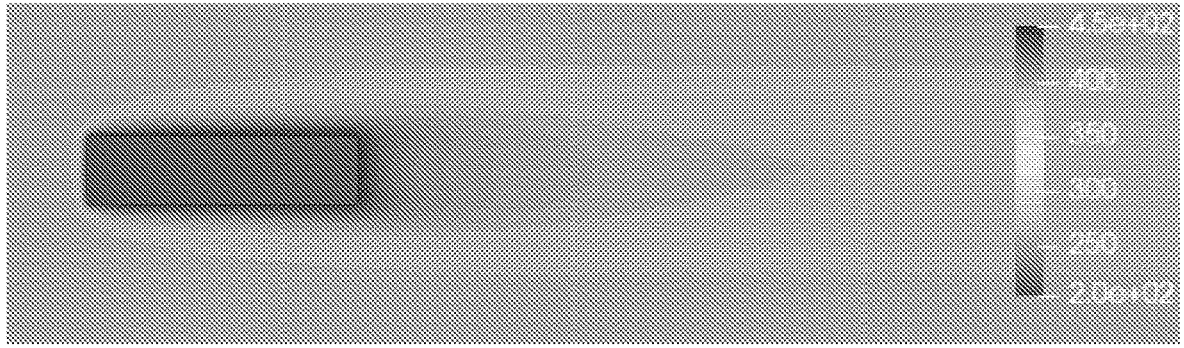
FIG. 26A illustrates an example of temperature distribution for a reference geometry.
Figure 26B:
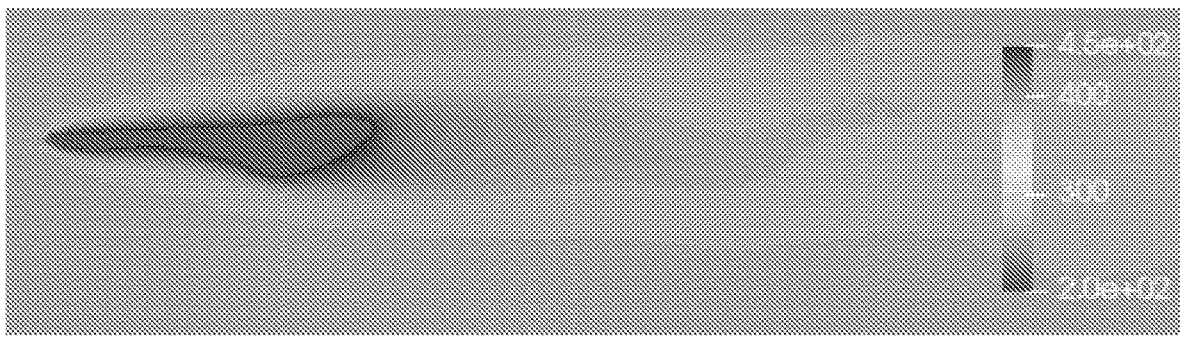
FIG. 26B illustrates an example of temperature distribution for one of the best performing shapes.

FIG. 25 shows the dimensionless heat transfer and pressure drop with respect to the reference geometry for shapes over 500 episodes in two different parallel environments. These results are related to the shapes with 15 DOF at RE=100 and Pr=0.05. As the same random seed is used in the different environments, shapes and performances stay close. One of the optimized shapes with higher reward value and reference shape are shown in the FIG. 25. FIGS. 26A and 26B also show temperature distribution for one of the best performing designs (FIG. 26B) and the reference geometry (FIG. 26A).

Figure 41B:
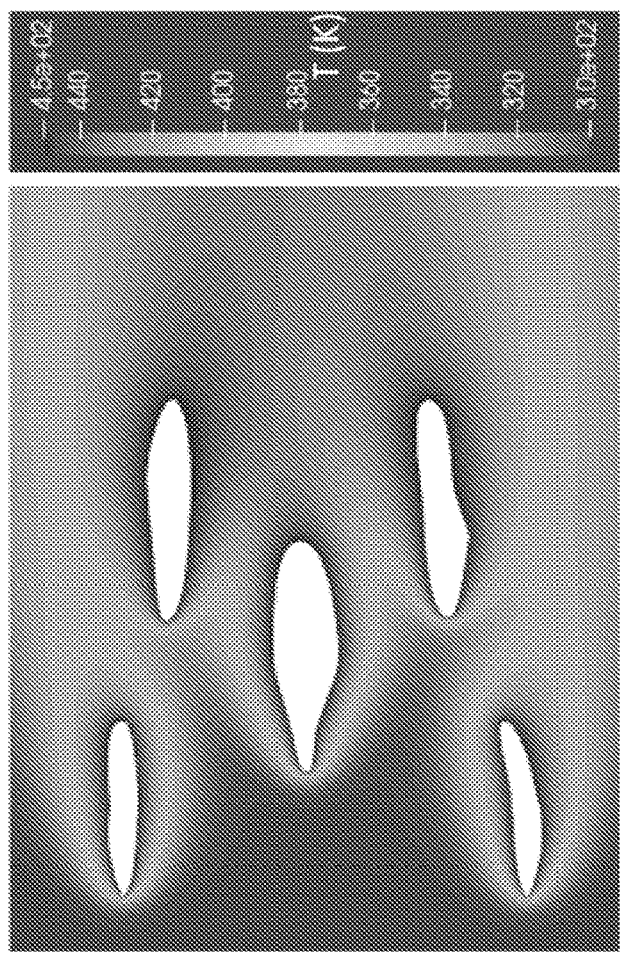
FIG. 41B illustrates a temperature profile for a well-performing design, using the multi-agent framework of FIG. 40.
Figure 41A:
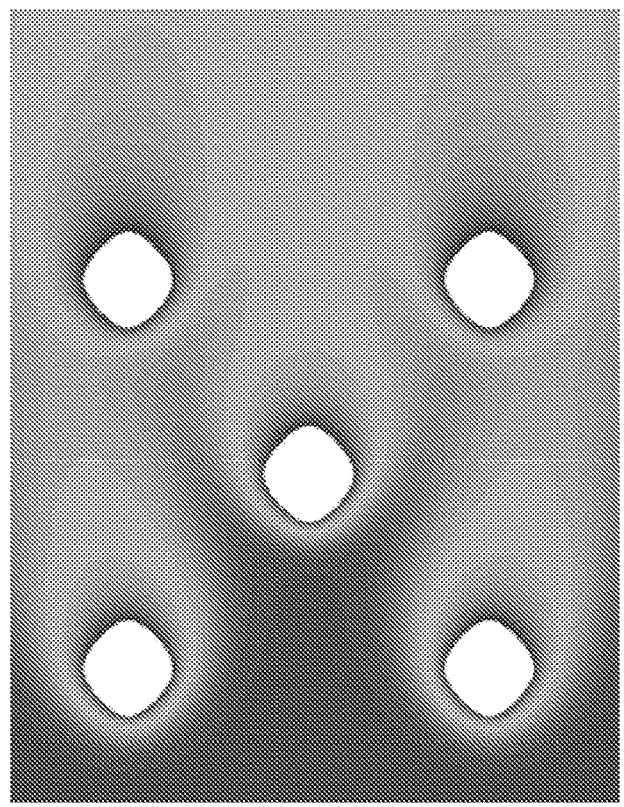
FIG. 41A illustrates a temperature profile for a reference geometry.

FIG. 41A illustrates a temperature profile for a reference geometry, and FIG. 41B illustrates a temperature profile for a well-performing design using the multi-agent framework. FIGS. 41A and 41B show the design for the MARL framework at Re=10, and Pr=0.7. It can be seen starting from a reference geometry, agents find the policy to optimize the shapes. However, agents fail to establish symmetry in geometry while the physics of the problem is symmetric since each agent acts independently.

Figure 42:
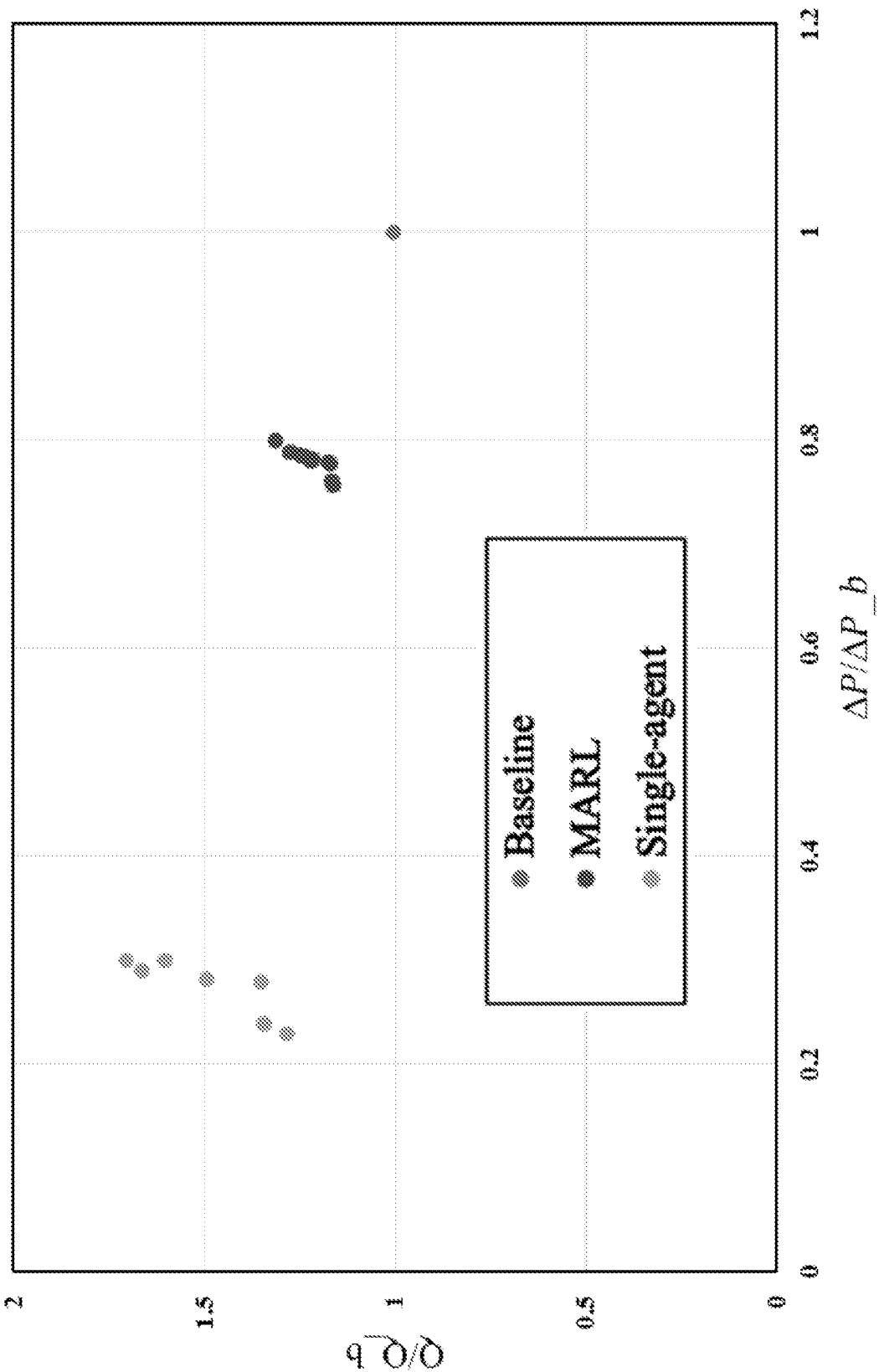
FIG. 42 is a chart illustrating an example of dimensionless heat transfer and pressure drop with respect to a reference geometry for designs using MARL and single-agent frameworks.

FIG. 42 is a chart illustrating dimensionless heat transfer and pressure drop with respect to the reference geometry for well-performing designs in both frameworks. Heat transfer is affected by fluid flow properties such as the Prandtl number (Pr) and Reynolds number (Re). Lower Re and higher Pr numbers in MARL case result in lower heat transfer per shape. Multiple shapes also impose higher pressure drop across the domain. In this way, FIG. 42 shows pareto front of dimensionless heat transfer and pressure drop with respect to the reference geometry for the single-agent and MARL framework.

In TABLE 6, examples of PPO Hyperparameters used for shape optimization framework.

TABLE 6

| Hyperparameter | Value |
| --- | --- |
| Learning rate | 1-2.5 × $10^{-3}$ |
| Hidden layers | 3 |
| Connection | Dense |
| Clipping ratio $\epsilon$ | 0.2 |
| Nodes hidden layers | 256 |
| Activation function hidden layers | ReLU |
| Activation function output layer | Linear |
| Optimizer | Adam |
| Adam stepsize | 1 × $10^{-3}$ |
| Discount factor $\gamma$ | 0.99 |
| GAE parameter ($\lambda$) | 0.95 |
| Batch size (N) | 50 |

With respect to Equation (3) and Equation (5), in order to solve the PDEs, space and time need to be discretized. The procedure for convection diffusion equation is provided herein; whereby the same approach is valid for Navier-Stokes equation, except for time discretization which BDF2 is sued to enhance the stability and convergence during shape variation. To solve equations with a finite element approach characterized by a variational formulation, a weak form of equations discretized in the domain space is required. The weak form of equations is obtained by defining a space of test functions; each term of the PDE is multiplied by any arbitrary function as a member of this space.

Equation (16) is multiplied by an arbitrary function $v \in \mathcal{V}$:

$$\frac{\partial T}{\partial t} = \nabla \cdot (k_f \nabla T) - \rho c_p (u \cdot \nabla T) \quad (16)$$

$$\frac{\partial T}{\partial t} v = \nabla \cdot (k_f \nabla T) v - \rho c_p (u \cdot \nabla T) v \quad (17)$$

$$\mathcal{V} = \{v(x) \mid x \in \Omega, v(x) \in \mathcal{H}^1(\Omega), \text{ and } v(x) = 0 \text{ on } \Gamma\} \quad (18)$$

In which the $\mathcal{H}^1$ denotes the Sobolev space of the domain $\Omega$. The solution of the PDE belongs to a trial function space, which is similarly defined as:

$$S_t = \left\{ T(x, t) \mid x \in \Omega, t > 0, T(x, t) \in \mathcal{H}^1(\Omega), \text{ and } \frac{\partial T}{\partial n} = 0 \text{ on } \Gamma \right\} \quad (19)$$

The order of all derivative terms should be reduced to one, so integration is performed over the whole domain:

$$\int_\Omega \frac{\partial T}{\partial t} v d\omega = \int_\Omega \nabla \cdot (k_f \nabla T) v d\omega - \int_\Omega \rho c_p (u \cdot \nabla T) v d\omega \quad (20)$$

To reduce the order of derivation in the diffusion term, it can be split using the integration by part technique:

$$\int_\Omega \nabla \cdot (k_f \nabla T) v d\omega = f_\Omega \nabla \cdot [v(k_f \nabla T)] d\omega - f_\Omega (\nabla v) \cdot (k_f \nabla T) d\Omega \qquad (21)$$

For which, the Green's divergence theory can be applied and the second-order term can be converted to a surface integral:

$$\int_\Omega \nabla \cdot [v(k_f \nabla T)] d\omega = \int_\Gamma k_f v \frac{\partial T}{\partial n} d\gamma = 0 \qquad (22)$$

Applying BDF1 scheme for temporal discretization:

$$\frac{\partial T}{\partial t} = \frac{T - T^n}{\Delta t} \qquad (23)$$

where $T^n$ denotes the value of the temperature in the previous time step.

$$\int_\Omega \frac{T - T^n}{\Delta t} v d\omega = -\int_\Omega k_f \nabla T \cdot \nabla v d\omega - \int_\Omega \rho c_p (u \cdot \nabla T) v d\omega \qquad (24)$$

Re-ordering Equation (24) yields Equation (25), which is the weak form of Equation (16). This weak form can be implemented directly in the FEniCS solver.

$$f_\Omega T v d\omega + f_\Omega \Delta t k_f \nabla T \cdot \nabla v d\omega + f_\Omega \Delta t \rho c_p (u \cdot \nabla T) v d\omega = f_\Omega T^n v d\omega \qquad (25)$$

In embodiments of the present disclosure, the geometry module 126 can use deep reinforcement learning for thermal shape optimization using BREP. A parametric geometry represented by composite Bézier curve is used for design space exploration to reduce the dimensionality of the thermofluid shape optimization problem. In some cases, a parallel computing architecture can be implemented for the CFD solver to provide data for deep learning. An interacting framework consisting of parallel heat transfer simulation solver, deep learning, and reinforcement learning is provided. In a particular case, starting from a rectangle reference geometry, the reinforcement learning agent is able to reduce the pressure drop by 60 percent while increasing the heat transfer by more than 30 percent without any enforcement. While the rectangle geometry is presented as a reference, it is understood that any suitable initial geometry can be used. The robustness of the embodiments was demonstrated in different Reynolds and Prandtl numbers. The present method was determined to be superior to voxel and pixel approaches based on fin shape optimization, since it alleviates the curse of dimensionality. The present embodiments keep a neat boundary using BREP throughout the optimization. Maintaining a clear boundary provides higher flexibility in terms of implementing boundary conditions and can use different working fluid. Using geometric deep learning can be used to speed up optimization, empowering function approximator in the deep RL algorithm.

In further cases, other learning algorithms can be used, for example, SplineCNN or other fast graph learning algorithms. Such algorithms can be used to increase the number of control points and extend the optimization problem into 3D space.

While the present embodiments are described with respect to a heat exchanger, the present embodiments can be used for other examples and applications as appropriate.

Although the invention has been described with reference to certain specific embodiments, various modifications thereof will be apparent to those skilled in the art without departing from the spirit and scope of the invention as outlined in the claims appended hereto.

The invention claimed is:

1. A computer-implemented method for heat exchanger design in the manufacture of a heat exchanger, the heat exchanger design comprising boundary representation of one or more shapes that form the manufactured heat exchanger, the method comprising:
   receiving initialized control points that set a curve or composite curve, the curve or composite curve define a geometric shape for the one or more shapes of the heat exchanger, the control points located within a design space;
   performing iteratively:
      parametrizing the design space with a parametric function using the curve or composite curve set by the control points to define surface boundary conditions;
      determining heat transfer and pressure drop of the heat exchanger design defined by the control points using the parameterized design space;
      determining whether the heat transfer, pressure drop, or both, meet one or more predetermined conditions;
      where the one or more predetermined conditions are met, performing no further iterations;
      where the one or more predetermined conditions are not met, determining an updated policy that maximizes a cumulative reward toward maximized heat transfer and minimized pressure drop, the updated policy determined by performing deep reinforcement learning, an agent of the deep reinforcement learning taking the control points and the determined heat transfer and pressure drop as input, and determining updated control points using the updated policy;
   determining the one or more shapes, from the updated control points, that form the heat exchanger design; and
   outputting the heat exchanger design to manufacture the one or more shapes comprising the heat exchanger.

2. The method of claim 1, wherein the composite curve comprises a composite Bézier curve.

3. The method of claim 1, wherein the heat transfer and pressure drop are determined using average values for heat transfer and pressure drop calculated using computational fluid dynamics (CFD).

4. The method of claim 1, wherein the heat transfer and pressure drop are determined using a trained convolutional neural network, the training dataset for the convolutional neural network comprises images obtained during an early stage of optimization using a computation fluid dynamics environment.

5. The method of claim 4, wherein the convolutional neural network comprises an Xception network.

6. The method of claim 1, wherein the reinforcement learning comprises Proximal Policy Optimization (PPO).

7. The method of claim 6, wherein the Proximal Policy Optimization comprises PPO-Clip.

8. The method of claim 6, wherein the one or more shapes comprise a plurality of shapes, wherein the Proximal Policy Optimization comprises Multi-Agent Proximal Policy Optimization, and wherein each agent in the Multi-Agent Proximal Policy Optimization determines the updated policy for one of the plurality of shapes in the design space.

9. The method of claim 1, wherein the one or more predetermined conditions comprise a specified pressure drop, a value for heat transfer effectiveness, specified number of iterations, or a combination thereof.

10. The method of claim 1, wherein determining the updated policy comprises using an Adam optimizer.

11. A system for heat exchanger design in the manufacture of a heat exchanger, the heat exchanger design comprising boundary representation of one or more shapes that form the manufactured heat exchanger, the system comprising one or more processors and data storage comprising instructions for the one or more processors to execute:
- an input module to receive initialized control points that set a curve or composite curve, the curve or composite curve define a geometric shape for the one or more shapes of the heat exchanger, the control points located within a design space;
- a parameterization module to parametrize the design space with a parametric function using the curve or composite curve set by the control points to define surface boundary conditions;
- a geometry module to determine heat transfer and pressure drop of the heat exchanger design defined by the control points using the parameterized design space, determine whether the heat transfer, pressure drop, or both, meet one or more predetermined conditions, to perform no further iterations where the one or more predetermined conditions are met, to determine an updated policy that maximizes a cumulative reward toward maximized heat transfer and minimized pressure drop, where the one or more predetermined conditions are not met, the updated policy determined by performing deep reinforcement learning, an agent of the deep reinforcement learning taking the control points and the determined heat transfer and pressure drop as input, and determining updated control points using the updated policy, and to determine the one or more shapes, from the updated control points, that form the heat exchanger design; and
- an output module to output the heat exchanger design to manufacture the one or more shapes comprising the heat exchanger.

12. The system of claim 11, wherein the composite curve comprises a composite Bézier curve.

13. The system of claim 11, wherein the heat transfer and pressure drop are determined using average values for heat transfer and pressure drop calculated using computational fluid dynamics (CFD).

14. The system of claim 11, wherein the heat transfer and pressure drop are determined using a trained convolutional neural network, the training dataset for the convolutional neural network comprises images obtained during an early stage of optimization using a computation fluid dynamics environment.

15. The system of claim 14, wherein the convolutional neural network comprises an Xception network.

16. The system of claim 11, wherein the reinforcement learning comprises Proximal Policy Optimization (PPO).

17. The system of claim 16, wherein the Proximal Policy Optimization comprises PPO-Clip.

18. The system of claim 16, wherein the one or more shapes comprise a plurality of shapes, wherein the Proximal Policy Optimization comprises Multi-Agent Proximal Policy Optimization, and wherein each agent in the Multi-Agent Proximal Policy Optimization determines the updated policy for one of the plurality of shapes in the design space.

19. The system of claim 11, wherein the one or more predetermined conditions comprise a specified pressure drop, a value for heat transfer effectiveness, specified number of iterations, or a combination thereof.

20. The system of claim 11, wherein determining the updated policy comprises using an Adam optimizer.

* * * * *